US012008952B2

(12) United States Patent
Yang et al.

(10) Patent No.: US 12,008,952 B2
(45) Date of Patent: Jun. 11, 2024

(54) PIXEL, DISPLAY DEVICE INCLUDING PIXEL, AND PIXEL DRIVING METHOD

(71) Applicant: Samsung Display Co., LTD., Yongin-si (KR)

(72) Inventors: Jin-Wook Yang, Yongin-si (KR); Yu-Chol Kim, Yongin-si (KR); Donggyu Lee, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/224,452

(22) Filed: Jul. 20, 2023

(65) Prior Publication Data

US 2024/0112622 A1 Apr. 4, 2024

(30) Foreign Application Priority Data

Sep. 30, 2022 (KR) ........................ 10-2022-0125694

(51) Int. Cl.
*G09G 3/32* (2016.01)

(52) U.S. Cl.
CPC ....... *G09G 3/32* (2013.01); *G09G 2310/0216* (2013.01); *G09G 2310/0267* (2013.01); *G09G 2330/028* (2013.01)

(58) Field of Classification Search
None
See application file for complete search history.

(56) References Cited

U.S. PATENT DOCUMENTS 11,263,976 B2 3/2022 Yang et al.
11,380,254 B2 7/2022 Kim et al.
11,386,844 B2 7/2022 Jeon et al.
2013/0093800 A1* 4/2013 Shim .................... G09G 3/3233 345/690
2018/0247591 A1 8/2018 Kim et al.
2021/0201759 A1 7/2021 Cho et al.
2022/0028333 A1* 1/2022 Jeong .................. G09G 3/3233
(Continued)

FOREIGN PATENT DOCUMENTS

KR 1020200042074 A 4/2020
KR 1020210019635 A 2/2021
(Continued)

*Primary Examiner* — Stephen T. Reed
(74) *Attorney, Agent, or Firm* — CANTOR COLBURN LLP

(57) ABSTRACT

A pixel includes: a light-emitting element including an anode and a cathode, a first transistor including a first and a second electrode and a gate electrode connected with a first node, a third transistor connected between the second electrode of the first transistor and the first node and including a gate electrode connected with a first scan line, a sixth transistor connected between the second electrode of the first transistor and the anode and including a gate electrode connected with a first emission line, and a seventh transistor connected between the anode and an initialization voltage line and including a gate electrode connected with a second scan line. During an initialization period, the third, sixth, and seventh transistors are turned on such that an initialization voltage from the initialization voltage line is transferred to the gate electrode of the first transistor.

29 Claims, 76 Drawing Sheets

(56) References Cited

U.S. PATENT DOCUMENTS

| | | | | |
|---|---|---|---|---|
| 2022/0044634 | A1* | 2/2022 | Ka | G09G 3/3258 |
| 2022/0173189 | A1 | 6/2022 | Kim et al. | |
| 2022/0180811 | A1 | 6/2022 | Kim et al. | |
| 2022/0246087 | A1 | 8/2022 | Kim et al. | |

FOREIGN PATENT DOCUMENTS

| | | | |
|---|---|---|---|
| KR | 1020210083918 | A | 7/2021 |
| KR | 1020210100785 | A | 8/2021 |
| KR | 1020220018119 | A | 2/2022 |

* cited by examiner

PIXEL, DISPLAY DEVICE INCLUDING PIXEL, AND PIXEL DRIVING METHOD

This application claims priority to Korean Patent Application No. 10-2022-0125694, filed on Sep. 30, 2022, and all the benefits accruing therefrom under 35 U.S.C. § 119, the content of which in its entirety is herein incorporated by reference.

BACKGROUND

Embodiments of the present disclosure described herein relate to a display device including a pixel.

An electronic device, which provide images to users, such as a smartphone, a digital camera, a notebook computer, a navigation system, a monitor, and a smart television includes a display device for displaying the images. The display device generates an image and provides the users with the generated image through a display screen.

The display device includes a plurality of pixels and driving circuits (e.g., a scan driving circuit, a data driving circuit, and an emission driving circuit) for controlling the plurality of pixels. Each of the plurality of pixels includes a display element and a pixel circuit controlling the display element. The driving circuit of the pixel may include a plurality of transistors organically connected.

Nowadays, to improve the quality of image, there is a growing need for a display device capable of operating at various operating frequencies.

SUMMARY

Embodiments of the present disclosure provide a pixel capable of operating at various driving frequencies, a display device including the pixel, and a pixel driving method of the display device.

According to an embodiment, a pixel includes: a light-emitting element that includes an anode and a cathode, a first transistor that includes a first electrode, a second electrode, and a gate electrode connected with a first node, a third transistor that is connected between the second electrode of the first transistor and the first node and includes a gate electrode connected with a first scan line, a sixth transistor that is connected between the second electrode of the first transistor and the anode of the light-emitting element and includes a gate electrode connected with a first emission line, and a seventh transistor that is connected between the anode of the light-emitting element and an initialization voltage line and includes a gate electrode connected with a second scan line. During an initialization period, the third, sixth, and seventh transistors are turned on such that an initialization voltage from the initialization voltage line is transferred to the gate electrode of the first transistor.

In an embodiment, during the initialization period, a first scan signal provided to the first scan line, a second scan signal provided to the second scan line, and a first emission signal provided to the first emission line may be at an active level.

In an embodiment, the pixel may further include an eighth transistor that is connected between a first driving voltage line and the first electrode of the first transistor and includes a gate electrode connected with a second emission line, a fifth transistor that is connected between the first electrode of the first transistor and a second node and includes a gate electrode connected with the first scan line, and a first capacitor that is connected between the first node and the second node.

In an embodiment, during a compensation period, the eighth transistor and the fifth transistor may be turned on such that a first driving voltage is transferred from the first driving voltage line to the second node.

In an embodiment, during the compensation period, the third transistor and the eighth transistor may be turned on such that the first driving voltage is transferred to the first node through the eighth transistor, the first transistor, and the third transistor.

In an embodiment, during the compensation period, a first scan signal provided to the first scan line and a second emission signal provided to the second emission line may be at an active level.

In an embodiment, the initialization period and the compensation period may be repeated in turn plural times.

In an embodiment, the pixel may further include a second transistor that is connected between a data line and the second node and includes a gate electrode connected with a third scan line.

In an embodiment, the pixel may further include a fourth transistor that is connected between the first electrode of the first transistor and a bias voltage line and includes a gate electrode connected with a fourth scan line.

In an embodiment, the pixel may further include an eighth transistor that is connected between a first driving voltage line and the first electrode of the first transistor and includes a gate electrode connected with a second emission line, a fifteenth transistor that is connected between the first driving voltage line and a second node and includes a gate electrode connected with the first scan line, and a first capacitor that is connected between the first node and the second node.

In an embodiment, during a compensation period, the fifteenth transistor may be turned on such that a first driving voltage from the first driving voltage line is transferred to the second node.

In an embodiment, the pixel may further include an eighth transistor that is connected between a first driving voltage line and the first electrode of the first transistor and includes a gate electrode connected with a second emission line, and a first capacitor that is connected between the first node and a second node.

In an embodiment, the pixel may further include a fifth transistor that is connected between the first electrode of the first transistor and the second node and includes a gate electrode connected with a fifth scan line The first transistor may be an N-type transistor, and the fifth transistor may be an N-type transistor.

In an embodiment, the pixel may further include a second transistor that is connected between a data line and the first electrode of the first transistor and includes a gate electrode connected with a third scan line, and a ninth transistor that is connected between a bias voltage line and the first electrode of the first transistor and includes a gate electrode connected with a fourth scan line.

In an embodiment, the pixel may further include a fifth transistor that is connected between the first electrode of the first transistor and the second node and includes a gate electrode connected with the first scan line.

In an embodiment, the pixel may further include a second transistor that is connected between a data line and a third node and includes a gate electrode connected with a third scan line, and a tenth transistor that is connected between the second node and the third node and includes a gate electrode connected with a fifth scan line. The second transistor may be a P-type transistor, and the tenth transistor may be an N-type transistor.

In an embodiment, the pixel may further include an eleventh transistor that is connected between the first node and a fourth node and includes a gate electrode connected with a fifth scan line, and a fourth transistor that is connected between the fourth node and a first initialization voltage line and includes a gate electrode connected with a sixth scan line. The eleventh transistor may be an N-type transistor, and the fourth transistor may be a P-type transistor.

In an embodiment, the pixel may further include a fourth transistor that is connected between the first node and the first initialization voltage line and includes a gate electrode connected with the sixth scan line. The third transistor may be an N-type transistor, and the fourth transistor may be an N-type transistor.

In an embodiment, the pixel may further include a twenty-fifth transistor that is connected between the third node and a reference voltage line and includes a gate electrode connected with the first scan line. Each of the first transistor and the sixth transistor may be a P-type transistor, and each of the third transistor and the twenty-fifth transistor may be an N-type transistor.

In an embodiment, the pixel may further include a first capacitor that is connected between the first node and a second node, a second transistor that is connected between a data line and a third node and includes a gate electrode connected with a third scan line, a tenth transistor that is connected between the second node and the third node and includes a gate electrode connected with a fifth scan line, and a twenty-fifth transistor that is connected between the third node and a reference voltage line and includes a gate electrode connected with the first scan line. Each of the first transistor and the second transistor may be a P-type transistor, and each of the tenth transistor and the twenty-fifth transistor may be an N-type transistor.

In an embodiment, the pixel may further include a second transistor that is connected between a data line and the first electrode of the first transistor and includes a gate electrode connected with a third scan line.

In an embodiment, the pixel may further include a second transistor that is connected between a data line and a third node and includes a gate electrode connected with a third scan line, a tenth transistor that is connected between the second node and the third node and includes a gate electrode connected with a fifth scan line, a fifth transistor that is connected between the first electrode of the first transistor and the third node and includes a gate electrode connected with the first scan line, an eleventh transistor that is connected between the first node and a fourth node and includes a gate electrode connected with the fifth scan line, and a fourth transistor that is connected between the fourth node and a first initialization voltage line and includes a gate electrode connected with a sixth scan line. Each of the second transistor and the fourth transistor may be P-type transistor, and each of the tenth transistor and the eleventh transistor may be an N-type transistor.

According to an embodiment, a display device includes: a display panel that includes a pixel connected with a plurality of scan lines, a plurality of emission lines, and a data line, a scan driving circuit that drives the plurality of scan lines in response to a scan control signal, a driving controller that outputs the scan control signal, and a voltage generator that generates a first driving voltage and an initialization voltage. The pixel may include a light-emitting element that includes an anode and a cathode, a first transistor that includes a first electrode, a second electrode, and a gate electrode connected with a first node, a third transistor that is connected between the second electrode of the first transistor and the first node and includes a gate electrode connected with a first scan line, a sixth transistor that is connected between the second electrode of the first transistor and the anode of the light-emitting element and includes a gate electrode connected with a first emission line, and a seventh transistor that is connected between the anode of the light-emitting element and an initialization voltage line and includes a gate electrode connected with a second scan line. During an initialization period, the third, sixth, and seventh transistors may be turned on such that the initialization voltage from the initialization voltage line is transferred to the gate electrode of the first transistor.

In an embodiment, the display device may further include a fifth transistor that is connected between the first electrode of the first transistor and a second node and includes a gate electrode connected with the first scan line, and a first capacitor that is connected between the first node and the second node.

In an embodiment, the first transistor may be a P-type transistor, and each of the third transistor and the fifth transistor may be an N-type transistor.

According to an embodiment, a method of driving a pixel which includes a first transistor including a first electrode, a second electrode, and a gate electrode and a capacitor connected between a first node and a second node may include an initialization step in which a third transistor, a seventh transistor, and a sixth transistor are turned on by a first scan signal, a second scan signal, and a first emission signal being at an active level, respectively, such that an initialization voltage is transferred to the gate electrode of the first transistor, and a compensation step in which a fifth transistor is turned on by a certain scan signal of the active level such that a first driving voltage is transferred to the second node.

In an embodiment, the third transistor, the sixth transistor, and the seventh transistor may be connected sequentially in series between the gate electrode of the first transistor and an initialization voltage line through which the initialization voltage is transferred. The initialization step may include: providing the first scan signal of the active level to a gate electrode of the third transistor, providing the first emission signal of the active level to a gate electrode of the sixth transistor, and providing the second scan signal of the active level to a gate electrode of the seventh transistor.

In an embodiment, the certain scan signal may include the first scan signal, and the compensation step may include providing the first scan signal of the active level to a gate electrode of the fifth transistor.

In an embodiment, the certain scan signal may include a fifth scan signal, and the compensation step may include providing the fifth scan signal of the active level to a gate electrode of the fifth transistor.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
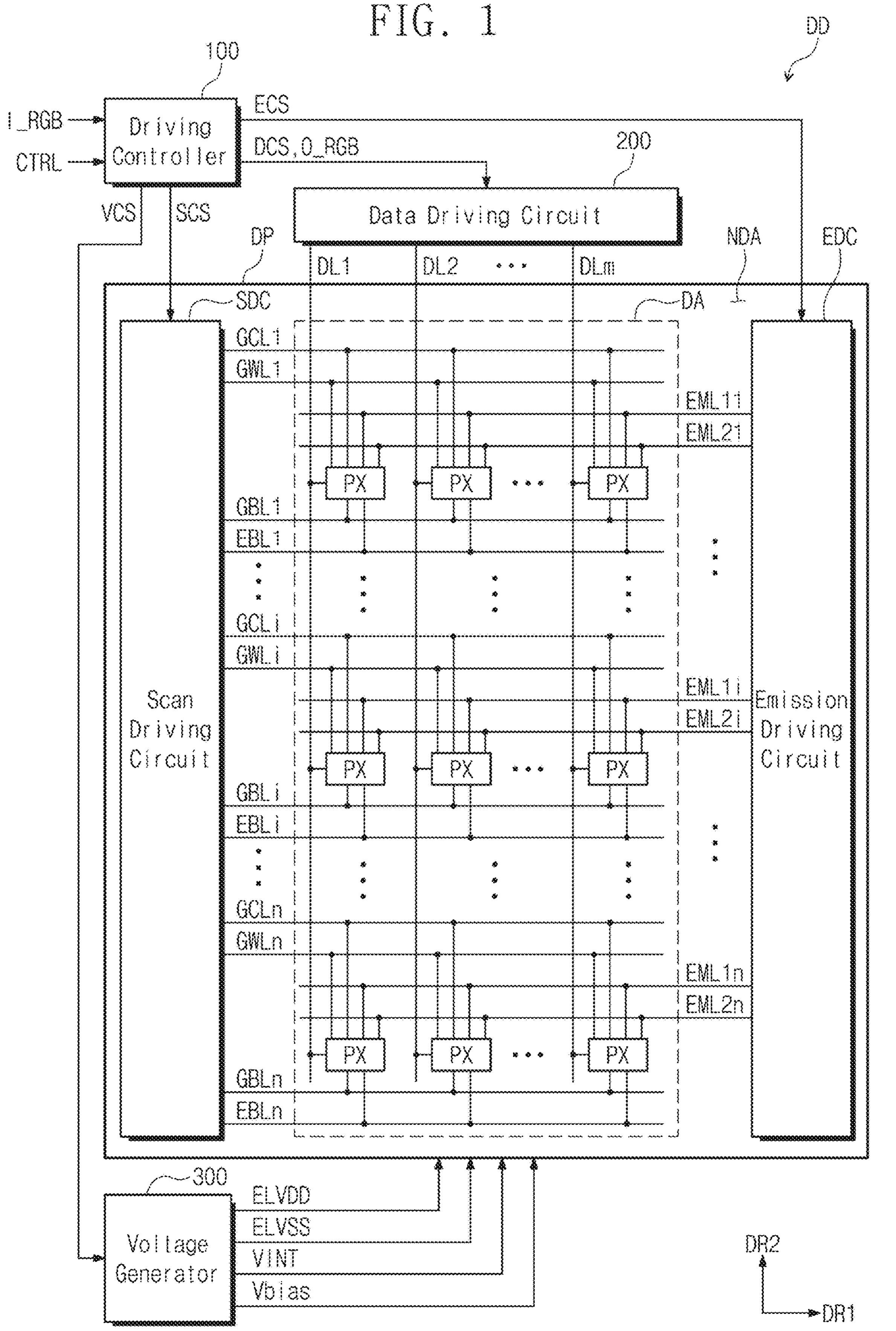
FIG. 1 is a block diagram of a display device, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter through a third intervening component.

Like reference numerals refer to like components. In addition, in drawings, thicknesses, proportions, and dimensions of components may be exaggerated to describe the technical features effectively. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations of the associated listed items.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The singular forms are intended to include the plural forms unless the context clearly indicates otherwise.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to accompanying drawings.

FIG. 1 is a block diagram of a display device according to an embodiment of the present disclosure.

Referring to FIG. 1, a display device DD includes a display panel DP, a driving controller 100, a data driving circuit 200, a voltage generator 300, a scan driving circuit SDC, and an emission driving circuit EDC.

The driving controller 100 receives an input image signal I_RGB and a control signal CTRL. The driving controller 100 generates an output image signal O_RGB obtained by converting a data format of the input image signal I_RGB so as to be appropriate for the display panel DP. The driving controller 100 outputs a scan control signal SCS, a data control signal DCS, an emission control signal ECS, and a voltage control signal VCS.

The data driving circuit 200 receives the data control signal DCS and the output image signal O_RGB from the driving controller 100. The data driving circuit 200 converts the output image signal O_RGB into data signals and then outputs the data signals to a plurality of data lines DL1 to DLm to be described later. The data signals refer to analog voltages corresponding to a grayscale value of the output image signal O_RGB.

The voltage generator 300 generates voltages for an operation of the display panel DP. In an embodiment, the voltage generator 300 generates a first driving voltage ELVDD, a second driving voltage ELVSS, an initialization voltage VINT, and a bias voltage Vbias.

The display panel DP includes scan lines GCL1 to GCLn, GWL1 to GWLn, GBL1 to GBLn, and EBL1 to EBLn, emission lines EML11 to EML1*n* and EML21 to EML2*n*, the data lines DL1 to DLm, and pixels PX. The scan driving circuit SDC and the emission driving circuit EDC may be disposed in the display panel DP.

In an embodiment, the pixels PX may be arranged in a display area DA, and the scan driving circuit SDC and the emission driving circuit EDC may be arranged in a non-display area NDA.

In an embodiment, the scan driving circuit SDC is disposed on a first side of the non-display area NDA of the display panel DP. The scan lines GCL1 to GCLn, GWL1 to GWLn, GBL1 to GBLn, and EBL1 to EBLn extend from the scan driving circuit SDC in a first direction DR1.

The emission driving circuit EDC is disposed on a second side of the non-display area NDA of the display panel DP. The emission lines EML11 to EML1*n* and EML21 to EML2*n* extend from the emission driving circuit EDC in a direction facing away from the first direction DR1.

The scan lines GCL1 to GCLn, GWL1 to GWLn, GBL1 to GBLn, and EBL1 to EBLn and the emission lines EML11 to EML1*n* and EML21 to EML2*n* are arranged to be spaced from each other in a second direction DR2. The data lines DL1 to DLm extend from the data driving circuit 200 in a direction facing away from the second direction DR2 and are arranged to be spaced from each other in the first direction DR1.

In the example illustrated in FIG. 1, the scan driving circuit SDC and the emission driving circuit EDC are arranged to face each other, with the pixels PX interposed therebetween. However, the present disclosure is not limited thereto. For example, the scan driving circuit SDC and the emission driving circuit EDC may be disposed adjacent to each other at the first side or the second side of the display panel DP. In an embodiment, the scan driving circuit SDC and the emission driving circuit EDC may be implemented with one circuit.

Each of the plurality of pixels PX may be electrically connected with four of the scan lines GCL1 to GCLn, GWL1 to GWLn, GBL1 to GBLn, and EBL1 to EBLn and two of the emission lines EML11 to EML1*n* and EML21 to EML2*n*. For example, as illustrated in FIG. 1, the pixels PX in the first row may be connected with the scan lines GCL1, GWL1, GBL1, and EBL1 and the emission lines EML11 and EML21. In addition, the pixels PX in the i-th row may be connected with the scan lines GCLi, GWLi, GBLi, and EBLi and the emission lines EML1*i* and EML2*i*.

Each of the plurality of pixels PX includes a light-emitting element ED (refer to FIG. 2) and a pixel circuit controlling the emission of the light-emitting element ED. The pixel circuit may include one or more transistors and one or more capacitors. The scan driving circuit SDC and the emission driving circuit EDC may include transistors formed through the same process as the transistors in the pixel PX.

Each of the plurality of pixels PX receives the first driving voltage ELVDD, the second driving voltage ELVSS, the initialization voltage VINT, the bias voltage Vbias from the voltage generator 300.

The scan driving circuit SDC receives the scan control signal SCS from the driving controller 100. The scan driving circuit SDC may output scan signals to the scan lines GCL1 to GCLn, GWL1 to GWLn, GBL1 to GBLn, and EBL1 to EBLn in response to the scan control signal SCS.

The emission driving circuit EDC receives the emission control signal ECS from the driving controller 100. The emission driving circuit EDC may output emission signals to the emission lines EML11 to EML1*n* and EML21 to EML2*n* in response to the emission control signal ECS.

The driving controller 100 according to an embodiment of the present disclosure may output the scan control signal SCS for controlling the timing to provide the scan signals to the scan lines GCL1 to GCLn, GWL1 to GWLn, GBL1 to GBLn, and EBL1 to EBLn in response to the control signal CTRL.

The driving controller 100 according to an embodiment of the present disclosure may output the emission control signal ECS for controlling the timing to provide the emission signals to the emission lines EML1*i* and EML2*i* based on the control signal CTRL.

Figure 2:
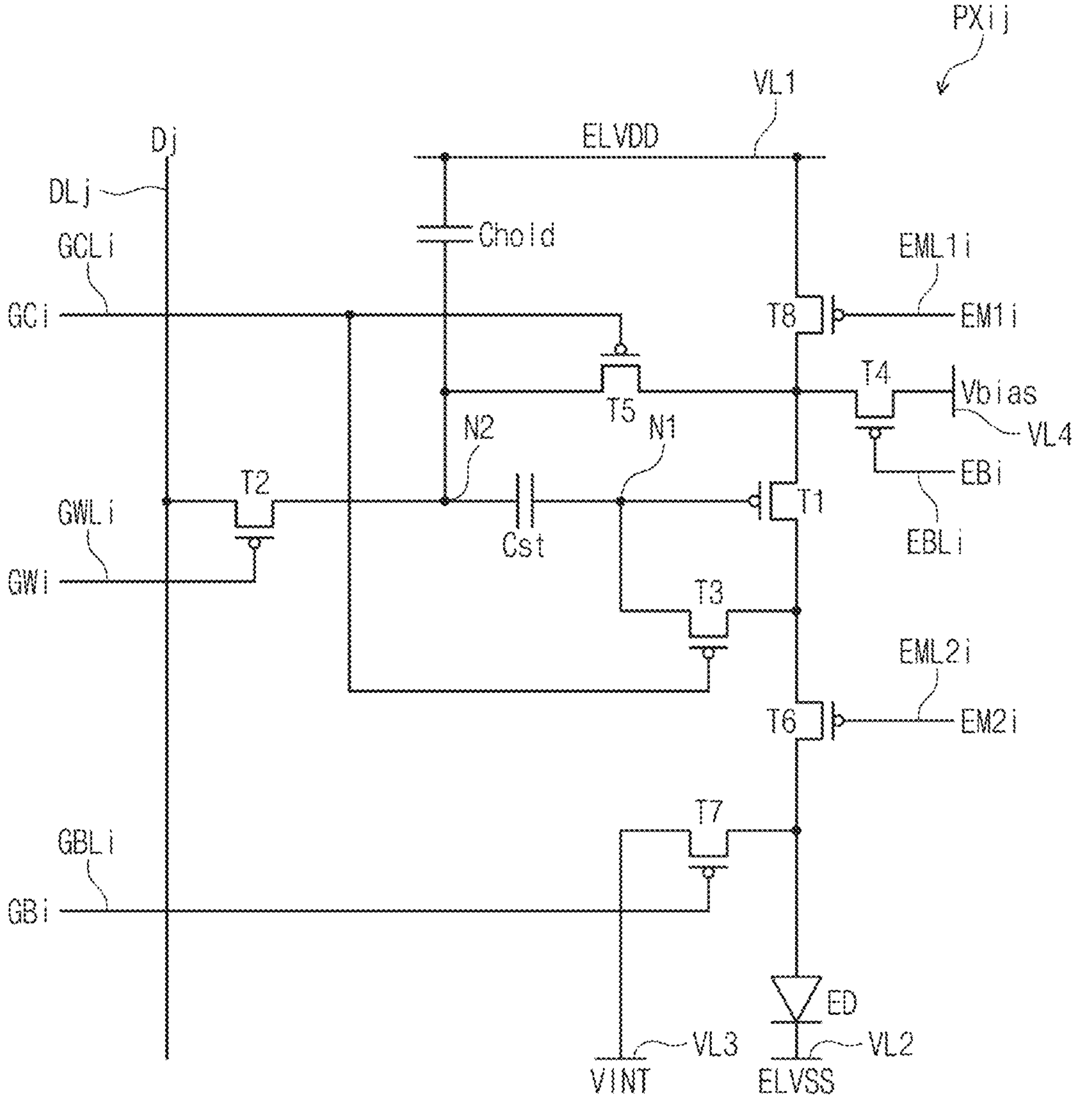
FIG. 2 is a circuit diagram of a pixel according to an embodiment of the present disclosure.

FIG. 2 is a circuit diagram of a pixel according to an embodiment of the present disclosure.

A pixel PXij connected with the j-th data line DLj among the data lines DL1 to DLm (refer to FIG. 1), the i-th scan lines GCLi, GWLi, GBLi, and EBLi among the scan lines GCL1 to GCLn, GWL1 to GWLn, GBL1 to GBLn, and EBL1 to EBLn (refer to FIG. 1), and the i-th emission lines EML1*i* and EML2*i* among the emission lines EML11 to EML1*n* and EML21 to EML2*n* (refer to FIG. 1) is illustrated in FIG. 2 as an example.

Each of the plurality of pixels PX illustrated in FIG. 1 may have the same circuit configuration as the pixel PXij illustrated in FIG. 2.

Referring to FIG. 2, the pixel PXij according to an embodiment includes a pixel circuit and at least one light-emitting element ED. The pixel circuit may include first, second, third, fourth, fifth, sixth, seventh and eighth transistors T1, T2, T3, T4, T5, T6, T7, and T8, a first capacitor Cst, and a second capacitor Chold. The light-emitting element ED may be a light emitting diode. In an embodiment, an example in which one pixel PXij includes one light-emitting element ED will be described.

In an embodiment, each of the first to eighth transistors T1 to T8 is a P-type transistor having a low-temperature polycrystalline silicon ("LTPS") semiconductor layer. However, the present disclosure is not limited thereto. In an embodiment, each of the first to eighth transistors T1 to T8 may be an N-type transistor using an oxide semiconductor as a semiconductor layer. In another embodiment, at least one of the first to eighth transistors T1 to T8 may be an N-type transistor, and the remaining transistors may be P-type transistors. A circuit configuration of a pixel according to the present disclosure is not limited to FIG. 2. The pixel PXij illustrated in FIG. 2 is only an example, and the circuit configuration of the pixel PXij may be changed or modified.

The scan lines GCLi, GWLi, GBLi, and EBLi may transfer scan signals GCi, GWi, GBi, and EBi, respectively, and the emission lines EML1*i* and EML2*i* may transfer emission signals EM1*i* and EM2*i*, respectively. The data line DLj transfers a data signal Dj. The data signal Dj may have a voltage level corresponding to the output image signal O_RGB output from the driving controller 100 (refer to FIG. 1). First to fourth driving voltage lines VL1, VL2, VL3, and VL4 may transfer the first driving voltage ELVDD, the second driving voltage ELVSS, the initialization voltage VINT, and the bias voltage Vbias, respectively. The third driving voltage line VL3 may be an "initialization voltage line" for transferring the initialization voltage VINT. The fourth driving voltage line VL4 may be a "bias voltage line" for transferring the bias voltage Vbias.

The first capacitor Cst is connected between a first node N1 and a second node N2. The second capacitor Chold is connected between the first driving voltage line VL1 and the second node N2.

The first transistor T1 includes a first electrode connected with the first driving voltage line VL1 through the eighth transistor T8, a second electrode connected with an anode of the light-emitting element ED through the sixth transistor T6, and a gate electrode connected with the first node N1.

The second transistor T2 includes a first electrode connected with the data line DLj, a second electrode connected with the second node N2, and a gate electrode connected with the scan line GWLi (in other words, "third scan line"). The second transistor T2 may be turned on depending on the scan signal GWi (in other words, "third scan signal") received through the scan line GWLi and may transfer the data signal Dj transferred from the data line DLj to the second node N2.

The third transistor T3 includes a first electrode connected with the second electrode of the first transistor T1, a second electrode connected with the first node N1, that is, the gate electrode of the first transistor T1, and a gate electrode connected with the scan line GCLi (in other words, "first scan line"). The third transistor T3 may be turned on depending on the scan signal GCi (in other words, "first scan signal") transferred through the scan line GCLi to electrically connect the gate electrode and the second electrode of the first transistor T1.

The fourth transistor T4 includes a first electrode connected with the first electrode of the first transistor T1, a second electrode connected with the fourth driving voltage line VL4, and a gate electrode connected with the scan line EBLi (in other words, "fourth scan line"). The fourth transistor T4 is turned on depending on the scan signal EBi (in other words, "fourth scan signal") transferred through the scan line EBLi to transfer the bias voltage Vbias to the first electrode of the first transistor T1.

The fifth transistor T5 includes a first electrode connected with the first electrode of the first transistor T1, a second electrode connected with the second node N2, and a gate electrode connected with the scan line GCLi. The fifth transistor T5 may be turned on depending on the scan signal GCi transferred through the scan line GCLi to electrically connect the first electrode of the first transistor T1 and the second node N2.

The sixth transistor T6 includes a first electrode connected with the second electrode of the first transistor T1, a second electrode connected with the anode of the light-emitting element ED, and a gate electrode connected with the emission line EML2*i* (in other words, "first emission line"). The sixth transistor T6 may be turned on depending on the emission signal EM2*i* (in other words, "first emission signal") transferred through the emission line EML2*i*.

The seventh transistor T7 includes a first electrode connected with the anode of the light-emitting element ED, a second electrode connected with the third driving voltage line VL3, and a gate electrode connected with the scan line GBLi (in other words, "second scan line"). The seventh transistor T7 may be turned on depending on the scan signal GBi (in other words, "second scan signal") transferred through the scan line GBLi to electrically connect the anode of the light-emitting element ED with the third driving voltage line VL3.

The eighth transistor T8 includes a first electrode connected with the first driving voltage line VL1, a second electrode connected with the first electrode of the first transistor T1, and a gate electrode connected with the emission line EML1*i* (in other words, "second emission line"). The eighth transistor T8 may be turned on depending on the emission signal EM1*i* (in other words, "second emission signal") transferred through the emission line EML1*i*.

When the sixth transistor T6 and the eighth transistor T8 are simultaneously turned on, a current path may be formed between the first driving voltage line VL1 and the light-emitting element ED through the eighth transistor T8, the first transistor T1, and the sixth transistor T6.

The light-emitting element ED includes the anode connected with the second electrode of the sixth transistor T6 and a cathode connected with the second driving voltage line VL2.

An operation of the pixel PXij illustrated in FIG. 2 will be described in detail later.

Figure 3A:
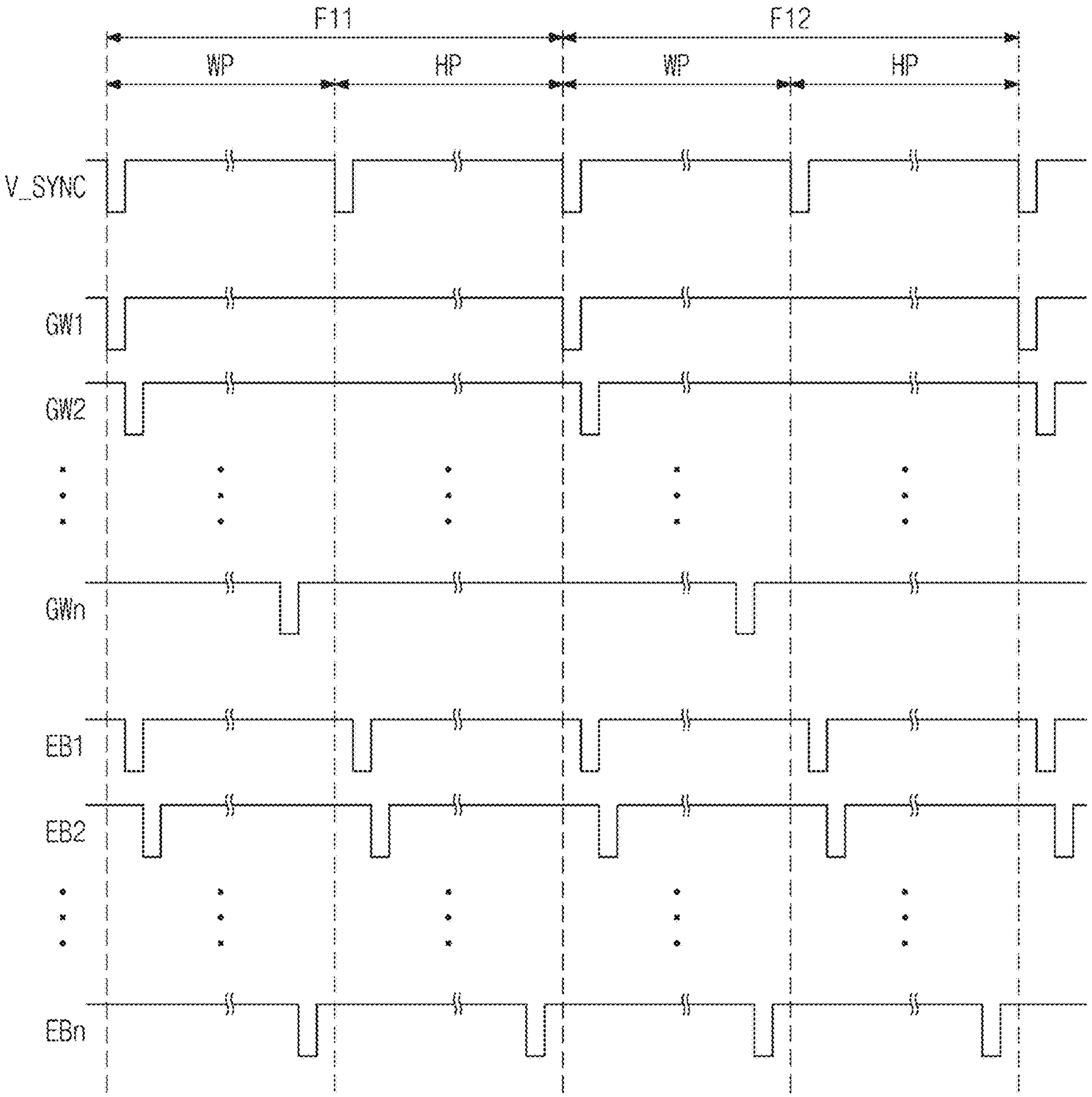
FIGS. 3A and 3B are timing diagrams for describing an operation of a display device.
Figure 3B:
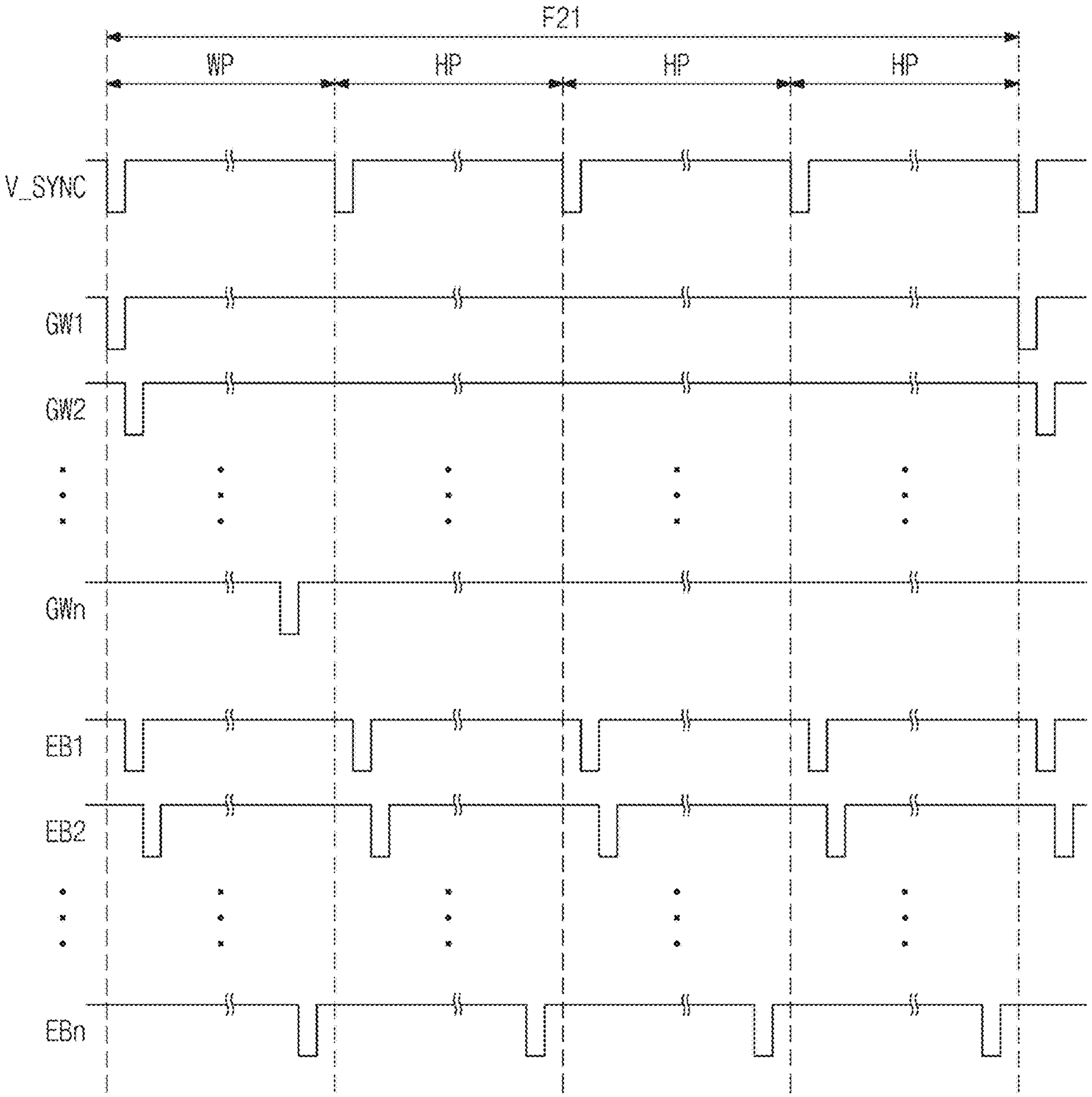

FIGS. 3A and 3B are timing diagrams for describing an operation of a display device.

Referring to FIGS. 1, 2, 3A, and 3B, for convenience of description, an example in which the display device DD operates at a first driving frequency (e.g., 240 Hz) and a second driving frequency (e.g., 120 Hz) will be described below. However, the present disclosure is not limited thereto. The driving frequency of the display device DD may be variously changed. In an embodiment, one of the first driving frequency and the second driving frequency may be selected as an operating frequency of the display device DD. Also, the display device DD may change the operating frequency at any time during an operation without setting the operating frequency to a specific frequency. In an embodiment, the operating frequency of the display device DD may be determined depending on the frequency of the input image signal I_RGB and the control signal CTRL.

The driving controller 100 provides the scan control signal SCS to the scan driving circuit SDC in response to the control signal CTRL. The control signal CTRL may include a synchronization signal V_SYNC. The scan driving circuit SDC may output scan signals GC1 to GCn, GW1 to GWn, GB1 to GBn, and EB1 to EBn having the driving frequency in response to the scan control signal SCS.

FIG. 3A is a timing diagram of a start signal and scan signals when the driving frequency of the display device DD is the first driving frequency (e.g., 240 Hz).

Referring to FIGS. 1 and 3A, when the driving frequency is the first driving frequency (e.g., 240 Hz), each of frames F11 and F12 may include one write period WP and one hold period HP. The synchronization signal V_SYNC may refer to a signal indicating the start of each of the write period WP and the hold period HP.

The scan driving circuit SDC sequentially activates the scan signals GW1 to GWn in the write period WP of each of the frames F11 and F12 to an active level (e.g., a low level) and sequentially activates the scan signals EB1 to EBn to the low level. Although only the scan signals GW1 to GWn and the scan signals EB1 to EBn are illustrated in FIG. 3B, the scan signals GC1 to GCn and GB1 to GBn and the emission signals EM11 to EM1*n* and EM21 to EM2*n* may also be sequentially activated in the write period WP of each of the frames F11 and F12.

The scan driving circuit SDC may maintain the scan signals GW1 to GWn at an inactive level (e.g., a high level) during the hold period HP and may sequentially activate the scan signals EB1 to EBn. Although not illustrated in FIG. 3A, the scan driving circuit SDC may maintain the scan signals GC1 to GCn at the inactive level (e.g., a high level) during the hold period HP like the scan signals GW1 to GWn. The scan driving circuit SDC may sequentially activate the scan signals GB1 to GBn during the hold period HP. The emission driving circuit EDC may sequentially activate the emission signals EM11 to EM1*n* and EM21 to EM2*n* during the hold period HP.

FIG. 3B is a timing diagram of a start signal and scan signals when the driving frequency of the display device DD is the second driving frequency (e.g., 120 Hz).

Referring to FIGS. 1 and 3B, when the driving frequency is the second driving frequency (e.g., 120 Hz), a period (or duration) of a frame F21 may be two times the period of each of the frames F11 and F12 illustrated in FIG. 3A. The frame F21 may include one write period WP and three hold periods HP. The scan driving circuit SDC sequentially activates the scan signals GW1 to GWn to the low level during the write period WP of the frame F21 and sequentially activates the scan signals EB1 to EBn to the low level. Although only the scan signals GW1 to GWn and the scan signals EB1 to EBn are illustrated in FIG. 3B, the scan signals GC1 to GCn and GB1 to GBn and the emission signals EM11 to EM1*n* and EM21 to EM2*n* may also be sequentially activated in the write period WP of the frame F21.

The scan driving circuit SDC may maintain the scan signals GW1 to GWn at the inactive level (e.g., a high level) during the hold period HP and may sequentially activate the scan signals EB1 to EBn. Although not illustrated in FIG. 3B, the scan driving circuit SDC may maintain the scan signals GC1 to GCn at the inactive level (e.g., a high level) during the hold period HP like the scan signals GW1 to GWn. The emission driving circuit EDC may sequentially activate the emission signals EM11 to EM1*n* and EM21 to EM2*n* during the hold period HP.

FIGS. 4A, 5A, 6A, 7A, 8A, 9A, 10A, and 11A are diagrams for describing an operation of a pixel. FIGS. 4B, 5B, 6B, 7B, 8B, 9B, 10B, and 11B are timing diagrams for describing an operation of a pixel.

Operations of the pixel PXij and the display device according to an embodiment will be described with reference to FIGS. 1, 2, and 4A to 11B. In FIGS. 4B, 5B, 6B, 7B, 8B, 9B, and 10B, the write period WP may be the write period WP illustrated in FIGS. 3A and 3B. The hold period HP of FIG. 11B may be the hold period HP illustrated in FIGS. 3A and 3B.

Figure 4A:
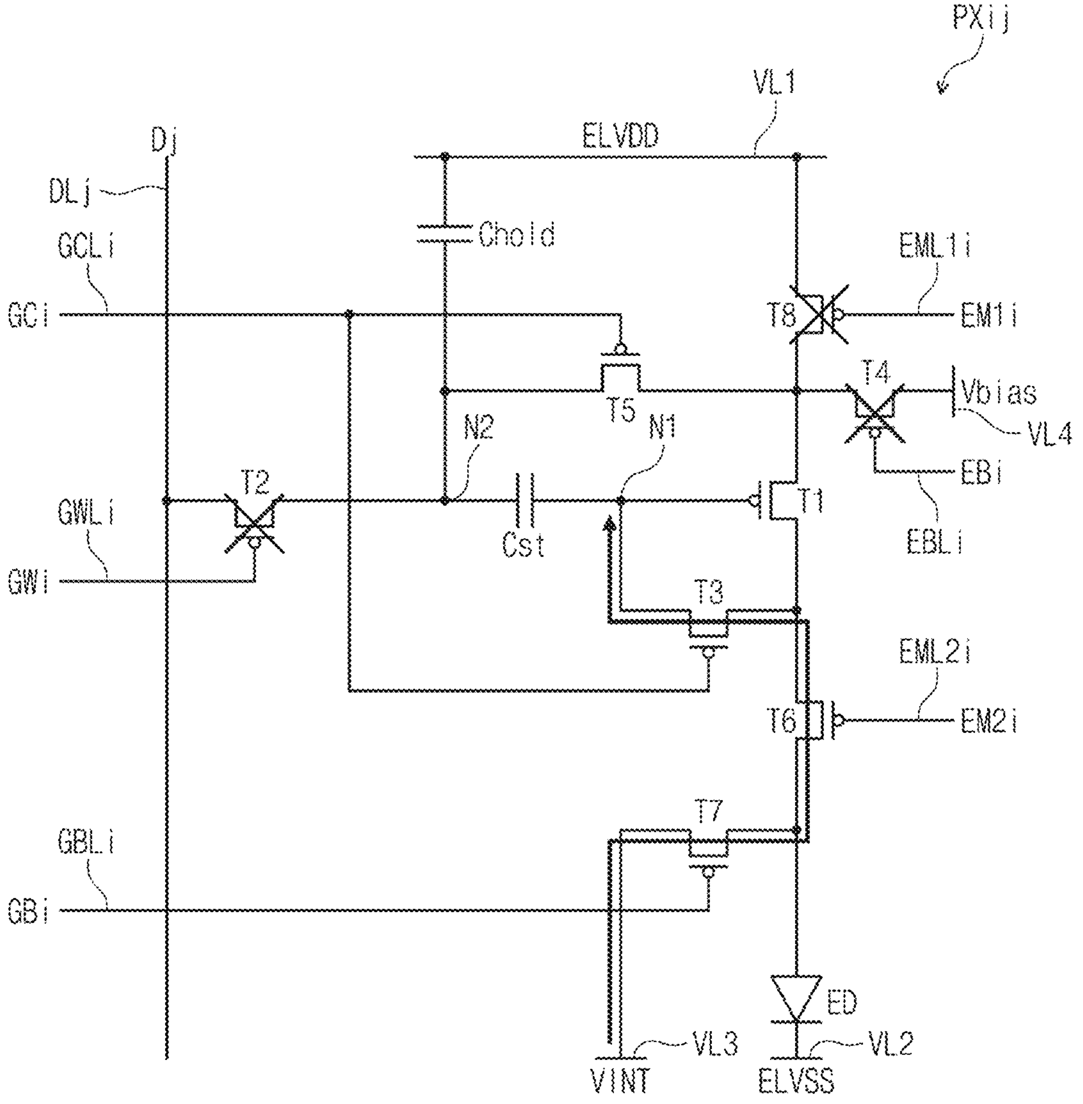
FIGS. 4A, 5A, 6A, 7A, 8A, 9A, 10A, and 11A are diagrams for describing an operation of a pixel.
Figure 4B:
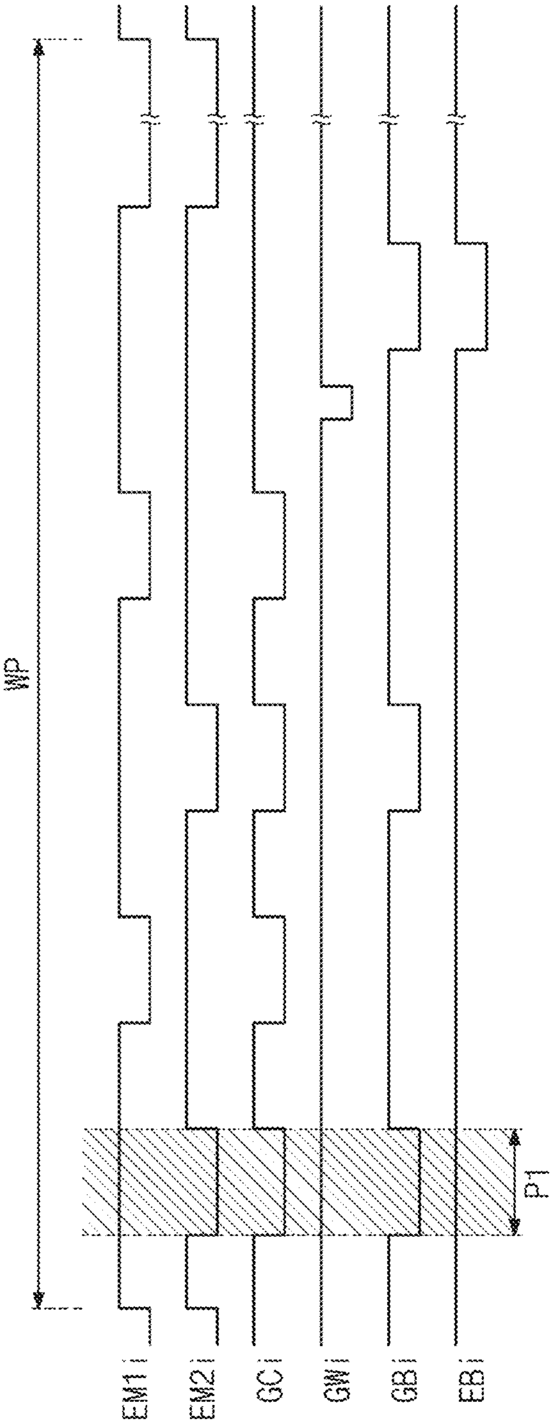
FIGS. 4B, 5B, 6B, 7B, 8B, 9B, 10B, and 11B are timing diagrams for describing an operation of a pixel.

Referring to FIGS. 4A and 4B, during a first period P1 of the write period WP, the scan signals GCi and GBi are at the active level (e.g., a low level), and the scan signals GWi and EBi are at the inactive level (e.g., a high level). Also, during the first period P1, the emission signal EM1*i* is at the inactive level, and the emission signal EM2*i* is at the active level. The third, sixth, and seventh transistors T3, T6, and T7 are turned on in response to the scan signals GCi and GBi and the emission signal EM2*i* being at the active level. As such, during the first period P1, the initialization voltage VINT may be transferred to the first node N1 through the seventh transistor T7, the sixth transistor T6, and the third transistor T3. The first period P1 may be a "first initialization period" in which the first node N1 (i.e., the gate electrode of the first transistor T1) is initialized with the initialization voltage VINT.

Figure 5A:
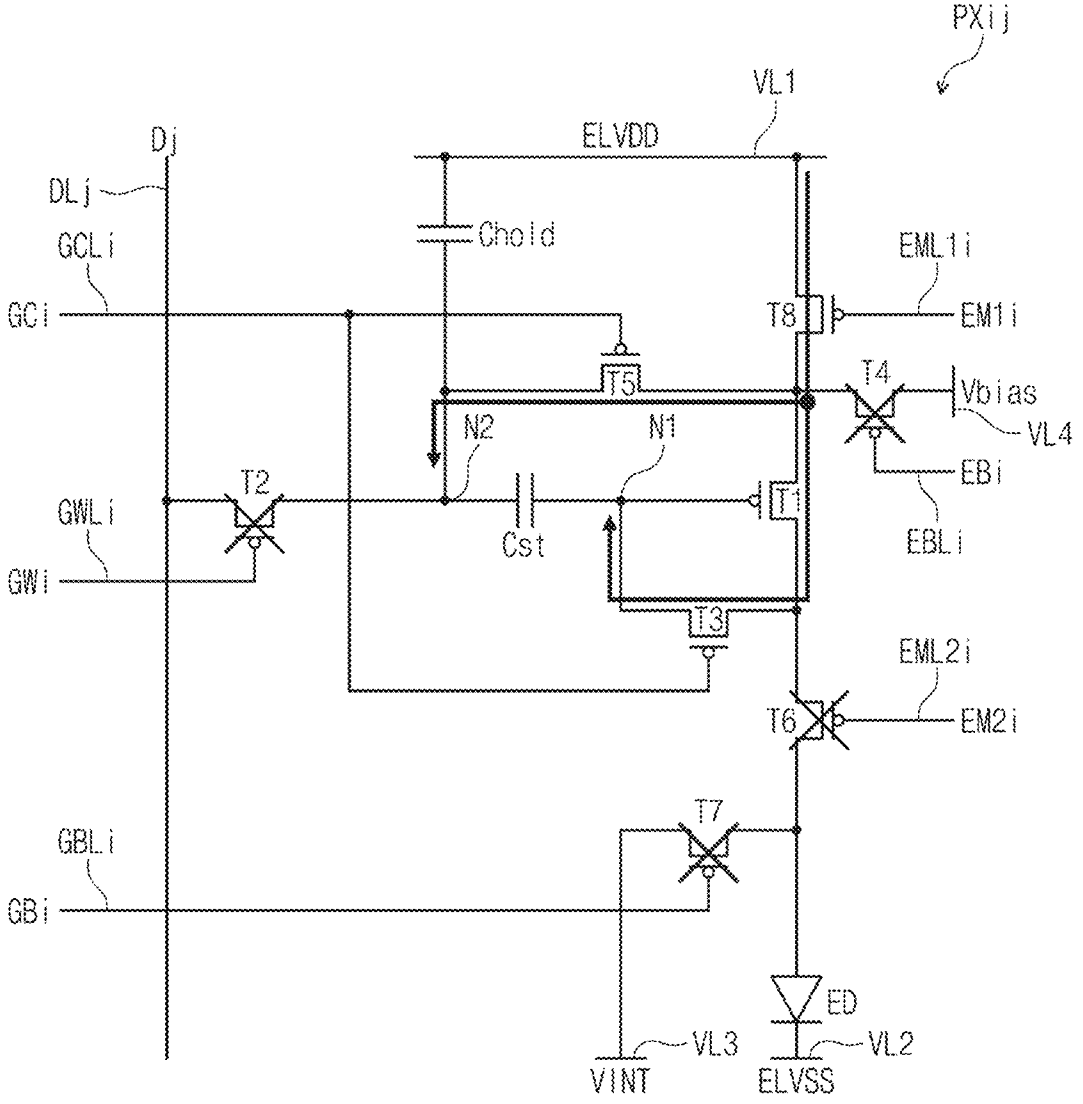
Figure 5B:
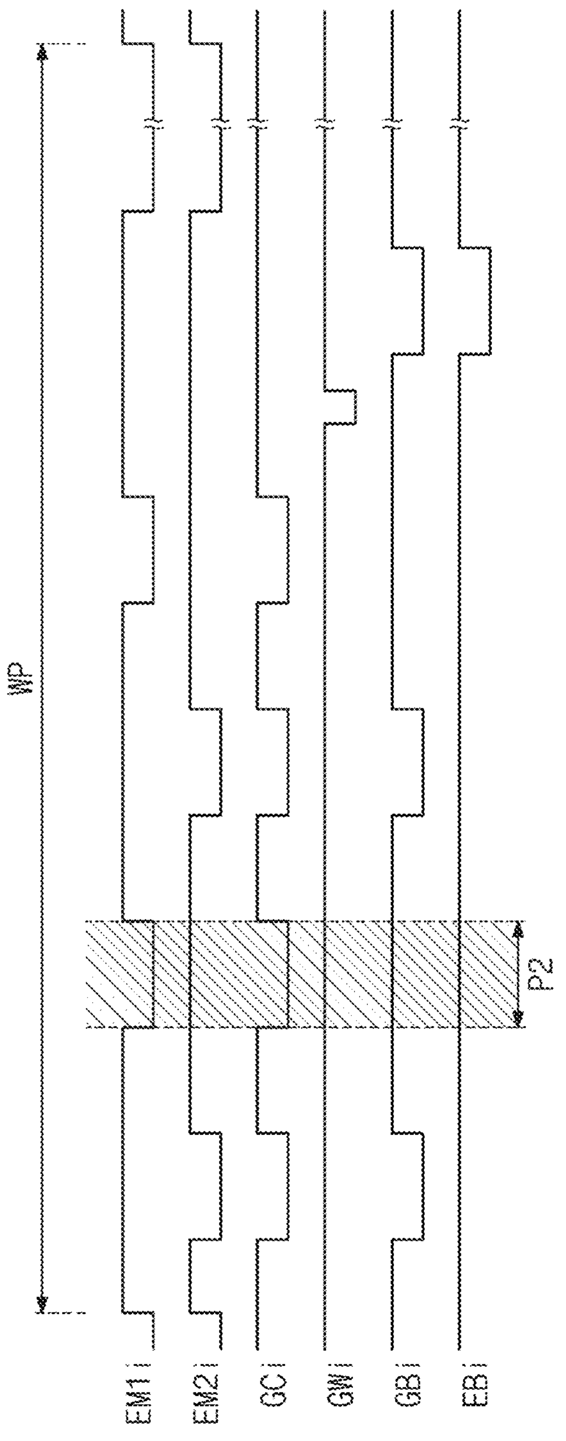

Referring to FIGS. 5A and 5B, during a second period P2 of the write period WP, the scan signal GCi is at the active level (e.g., a low level), and the scan signals GWi, GBi, and EBi are at the inactive level (e.g., a high level). Also, during the second period P2, the emission signal EM1*i* is at the active level, and the emission signal EM2*i* is at the inactive level. The third, fifth, and eighth transistors T3, T5, and T8 are turned on in response to the scan signal GCi and the emission signal EM1*i* being at the active level. As such, during the second period P2, the first driving voltage ELVDD may be transferred to the second node N2 through the eighth transistor T8 and the fifth transistor T5.

Meanwhile, during the second period P2, the first driving voltage ELVDD may be transferred to the first node N1, that is, the gate electrode of the first transistor T1 through the eighth transistor T8, the first transistor T1, and the third transistor T3. The gate electrode of the first transistor T1 may be provided with a voltage "ELVDD−Vth" obtained by subtracting a threshold voltage Vth of the first transistor T1 from the first driving voltage ELVDD.

A voltage of the second node N2 in the first period P1 may correspond to a voltage of the data signal Dj provided to the data line DLj in a previous frame. As the first driving voltage ELVDD is provided through the eighth transistor T8 and the fifth transistor T5 in the second period P2, the voltage of the second node N2 changes from the voltage of the data signal Dj of the previous frame to the first driving voltage ELVDD. A voltage variation of the second node N2, that is, a difference Va between the voltage of the data signal Dj of the previous frame and the first driving voltage ELVDD may be transferred to the first node N1 by the coupling of the first capacitor Cst.

Accordingly, the voltage of the gate electrode of the first transistor T1 may be "ELVDD−Vth+Va". The second period P2 may refer to a "first compensation period" for compensating for the threshold voltage Vth of the first transistor T1.

Figure 6A:
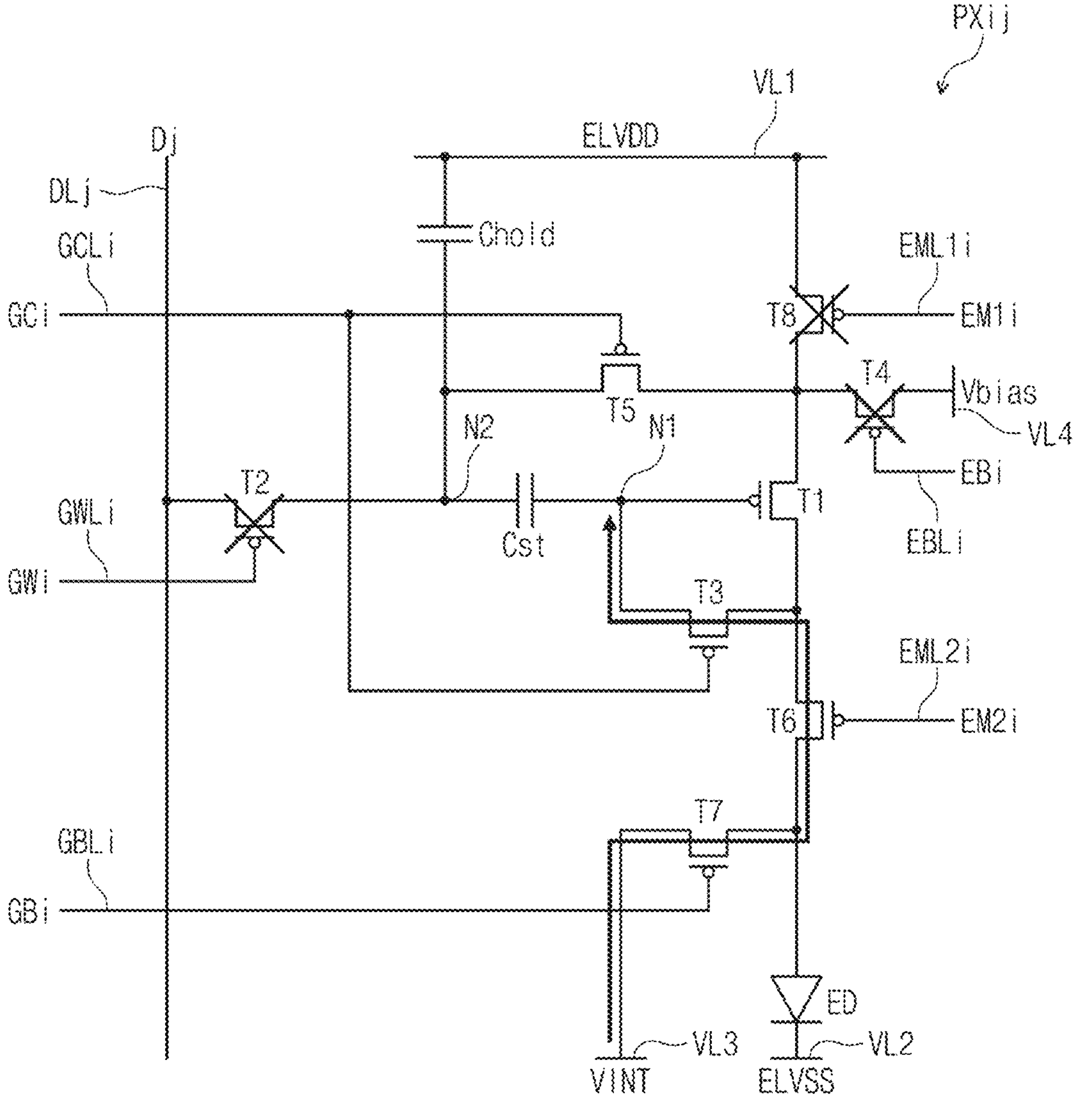
Figure 6B:
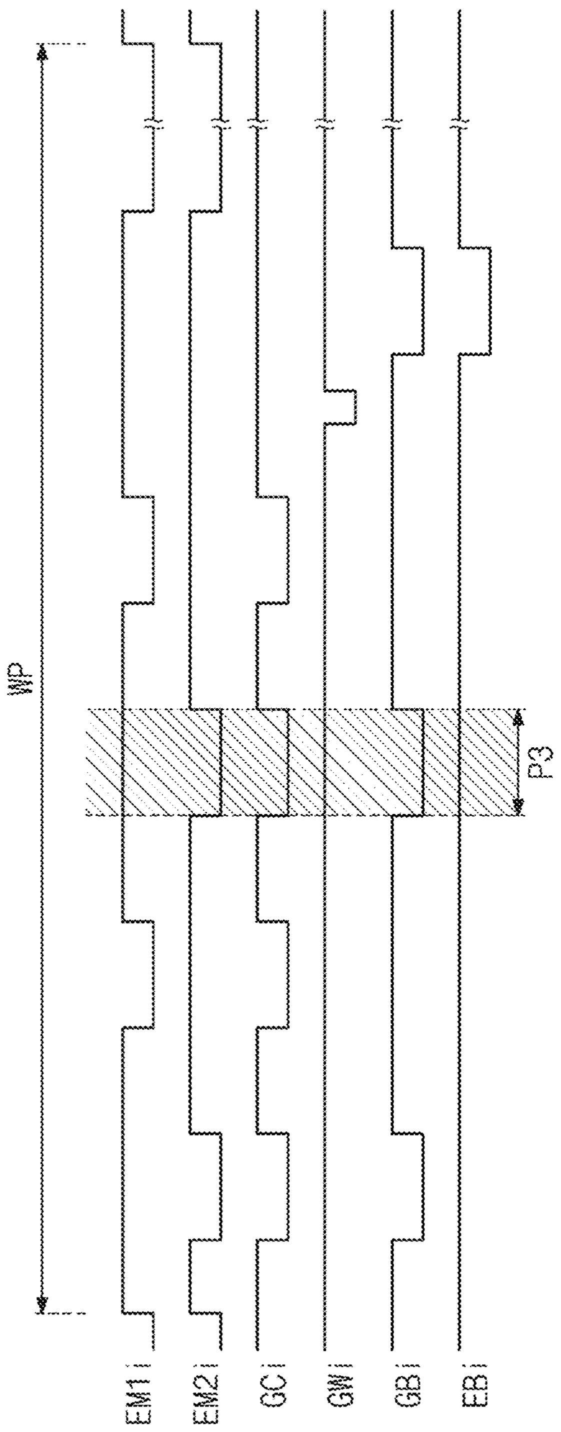

Referring to FIGS. 6A and 6B, during a third period P3 of the write period WP, the scan signals GCi and GBi are at the active level (e.g., a low level), and the scan signals GWi and EBi are at the inactive level (e.g., a high level). Also, during the third period P3, the emission signal EM1*i* is at the inactive level, and the emission signal EM2*i* is at the active level. The third, sixth, and seventh transistors T3, T6, and T7 are turned on in response to the scan signals GCi and GBi and the emission signal EM2*i* being at the active level. As such, during the third period P3, the initialization voltage VINT may be transferred to the first node N1 through the seventh transistor T7, the sixth transistor T6, and the third transistor T3. The third period P3 may be a second initialization period in which the first node N1, that is, the gate electrode of the first transistor T1 is initialized with the initialization voltage VINT.

Figure 7A:
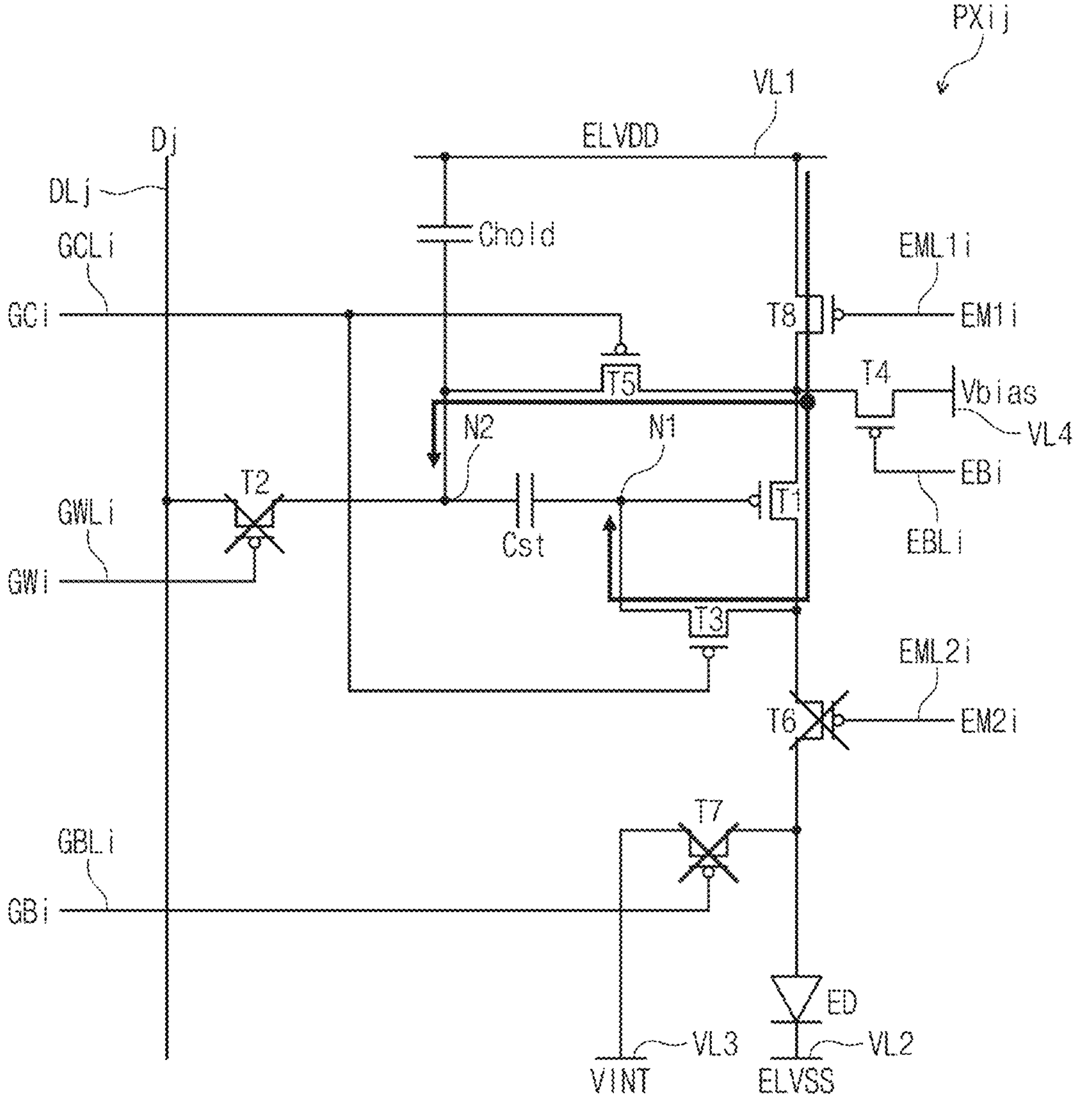
Figure 7B:
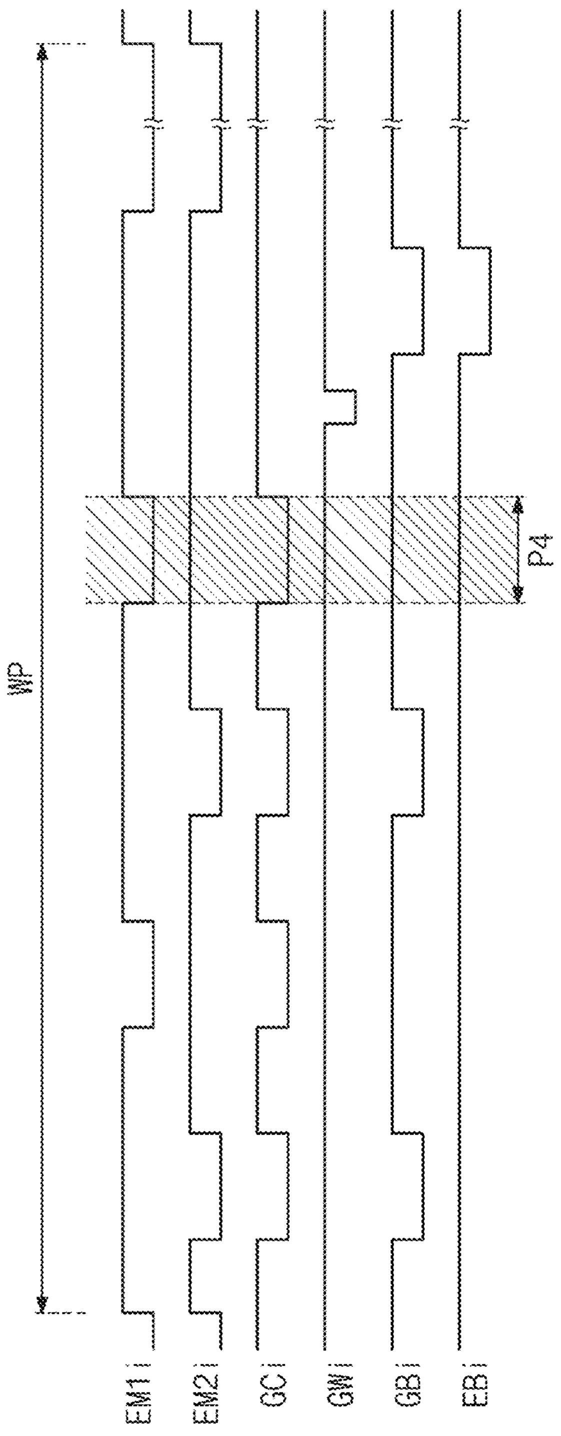

Referring to FIGS. 7A and 7B, during a fourth period P4 of the write period WP, the scan signal GCi is at the active level (e.g., a low level), and the scan signals GWi, GBi, and EBi are at the inactive level (e.g., a high level). Also, during the fourth period P4, the emission signal EM1*i* is at the active level, and the emission signal EM2*i* is at the inactive level. The third, fifth, and eighth transistors T3, T5, and T8 are turned on in response to the scan signal GCi and the emission signal EM1*i* being at the active level. As such, during the fourth period P4, the first driving voltage ELVDD may be transferred to the second node N2 through the eighth transistor T8 and the fifth transistor T5.

Meanwhile, during the fourth period P4, the first driving voltage ELVDD may be transferred to the first node N1, that is, the gate electrode of the first transistor T1 through the eighth transistor T8, the first transistor T1, and the third transistor T3. The voltage of the first node N1 may correspond to a voltage obtained by subtracting the threshold voltage Vth of the first transistor T1 from the first driving voltage ELVDD. That is, in the fourth period P4, the voltage of the first node N1 is "ELVDD−Vth".

The voltage of the second node N2 in the first period P1 corresponds to the voltage of the data signal Dj provided to the data line DLj in the previous frame, but the voltage of the second node N2 corresponds to the first driving voltage ELVDD set in the second period P2. As the first driving voltage ELVDD is provided through the eighth transistor T8 and the fifth transistor T5 in the fourth period P4, the voltage of the second node N2 is maintained at the first driving voltage ELVDD. Accordingly, the voltage of the gate electrode of the first transistor T1 may be "ELVDD−Vth". The fourth period P4 may refer to a "second compensation period" for compensating for the threshold voltage Vth of the first transistor T1.

To prevent the voltage of the second node N2 from being affected by the voltage of the data signal Dj in the previous frame, two initialization operations, that is, the first and third periods P1 and P3 and two compensation operations, that is, the second and fourth periods P2 and P4 are required. In an embodiment, the description is given as the first and third periods P1 and P3 being the initialization period and the second and fourth periods P2 and P4 being a "compensation period" are repeated in turn, but the present disclosure is not limited thereto. In an embodiment, the initialization period and the compensation period may be repeated in turn plural times (e.g., three times).

Figure 8A:
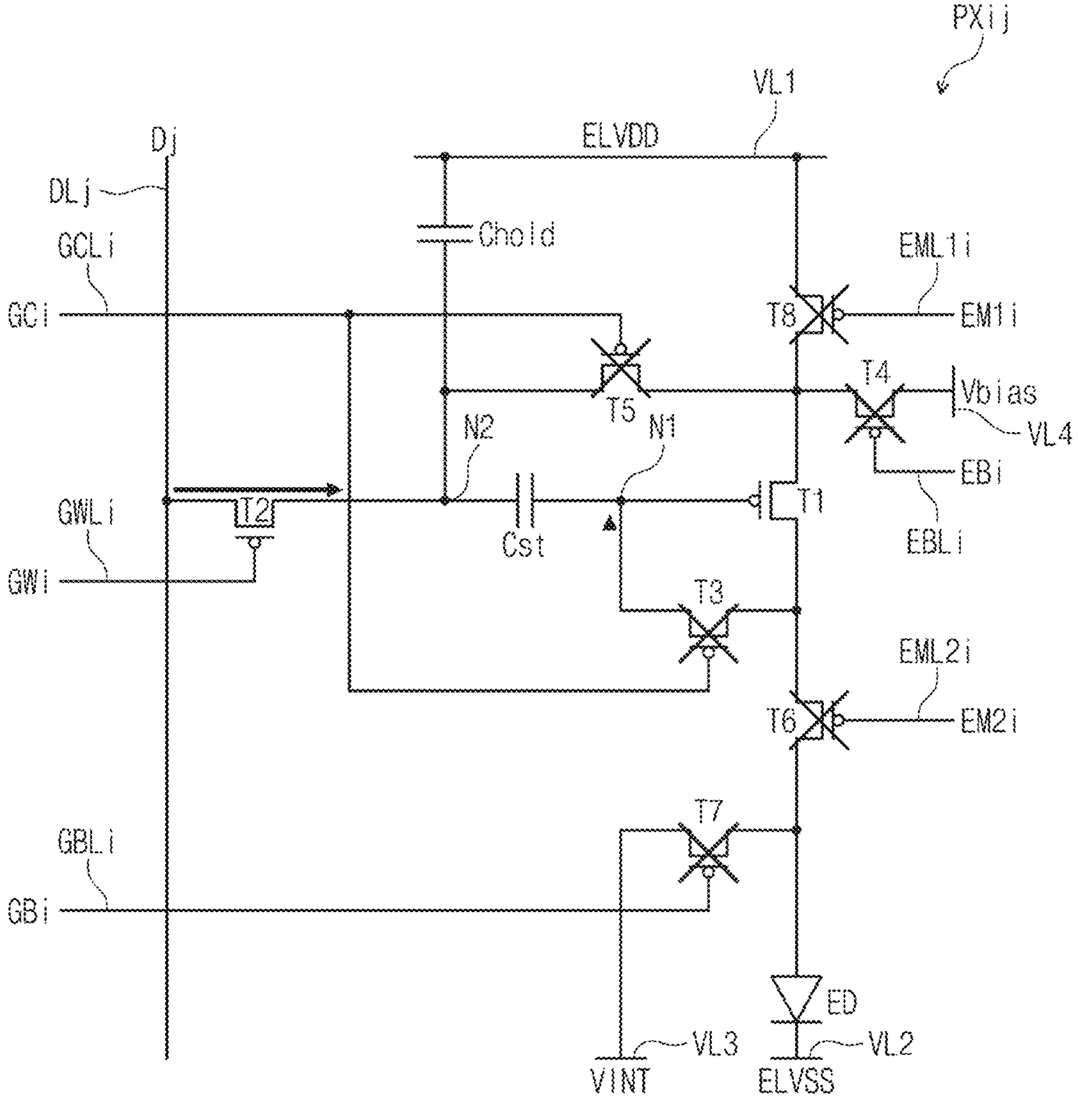
Figure 8B:
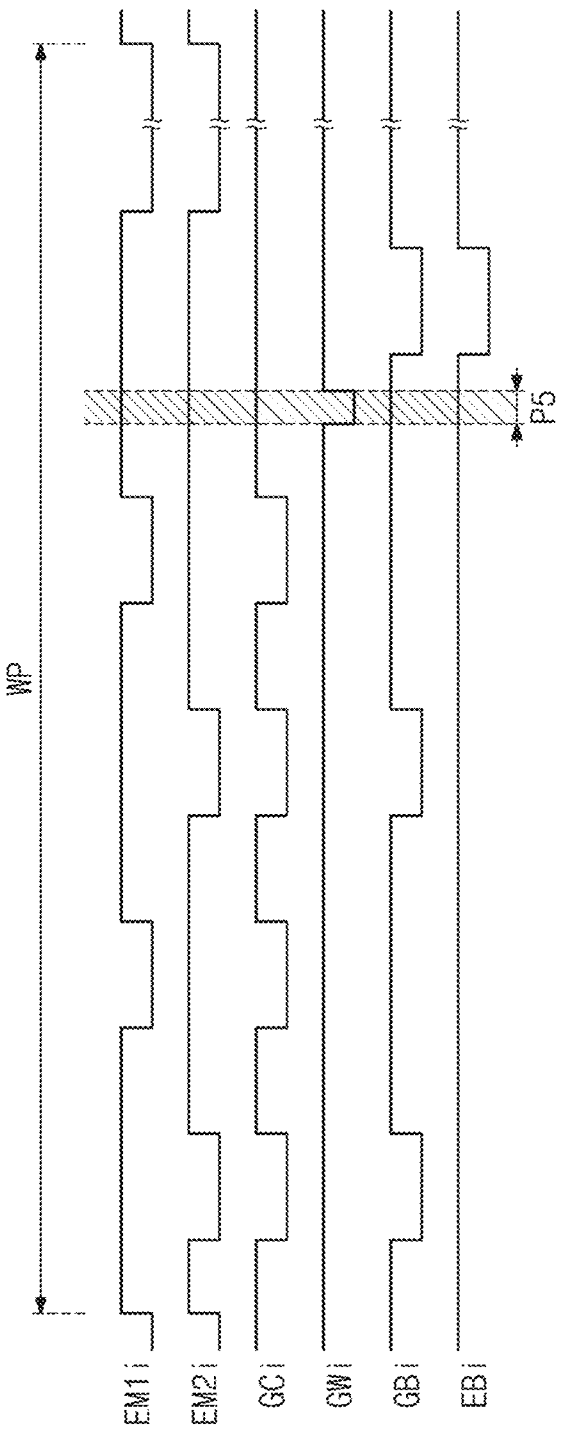

Referring to FIGS. 8A and 8B, during a fifth period P5 of the write period WP, only the scan signal GWi is at the active level. When the second transistor T2 is turned on by the scan signal GWi being at the active level, the data signal Dj from the data line DLj may be transferred to the second node N2.

The voltage of the second node N2 is changed from the first driving voltage ELVDD to the voltage Vdata of the data signal Dj. The voltage variation "Vdata−ELVDD" of the second node N2 may be transferred to the first node N1 by the coupling of the first capacitor Cst.

The voltage of the first node N1 during the fourth period P4 is "ELVDD−Vth", and thus, a voltage of the first node N1, that is, a voltage of the gate electrode of the first transistor T1 in the fifth period P5 becomes "ELVDD−Vth+(Vdata−ELVDD)".

The fifth period P5 may refer to a "data write period" in which a voltage corresponding to the data signal Dj is stored in the first capacitor Cst.

Figure 9A:
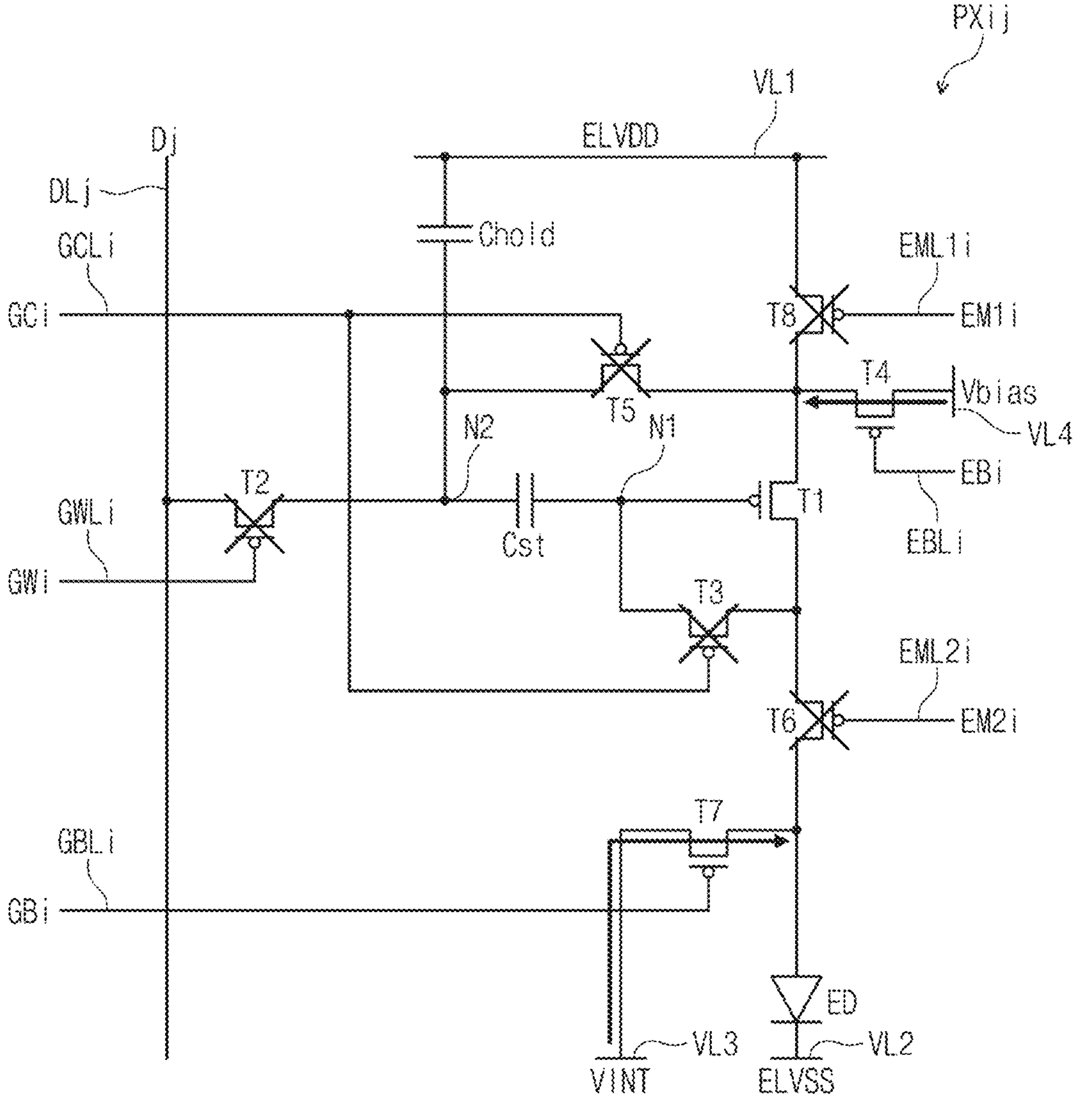
Figure 9B:
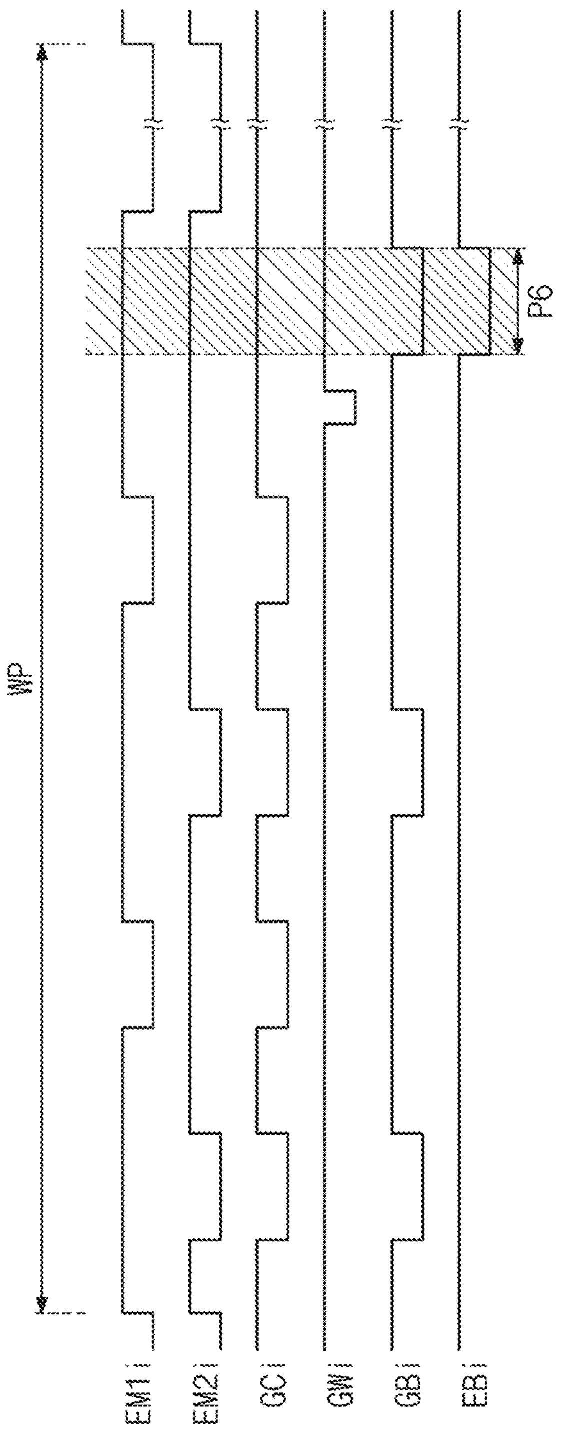

Referring to FIGS. 9A and 9B, during a sixth period P6 of the write period WP, the scan signals GBi and EBi are at the active level, and the scan signals GCi and GWi and the emission signals EM1*i* and EM2*i* are at the inactive level.

The fourth transistor T4 and the seventh transistor T7 may be turned on by the scan signals GBi and EBi being at the active level. The initialization voltage VINT is provided to the anode of the light-emitting element ED through the seventh transistor T7. The bias voltage Vbias is provided to the first electrode of the first transistor T1 through the fourth transistor T4.

The hysteresis effect due to a characteristic change in the threshold voltage Vth of the first transistor T1 may be minimized by providing the bias voltage Vbias to the first electrode of the first transistor T1.

The sixth period P6 may refer to an "anode initialization and bias period" in which the anode of the light-emitting element ED and the first electrode of the first transistor T1 are initialized.

Figure 10A:
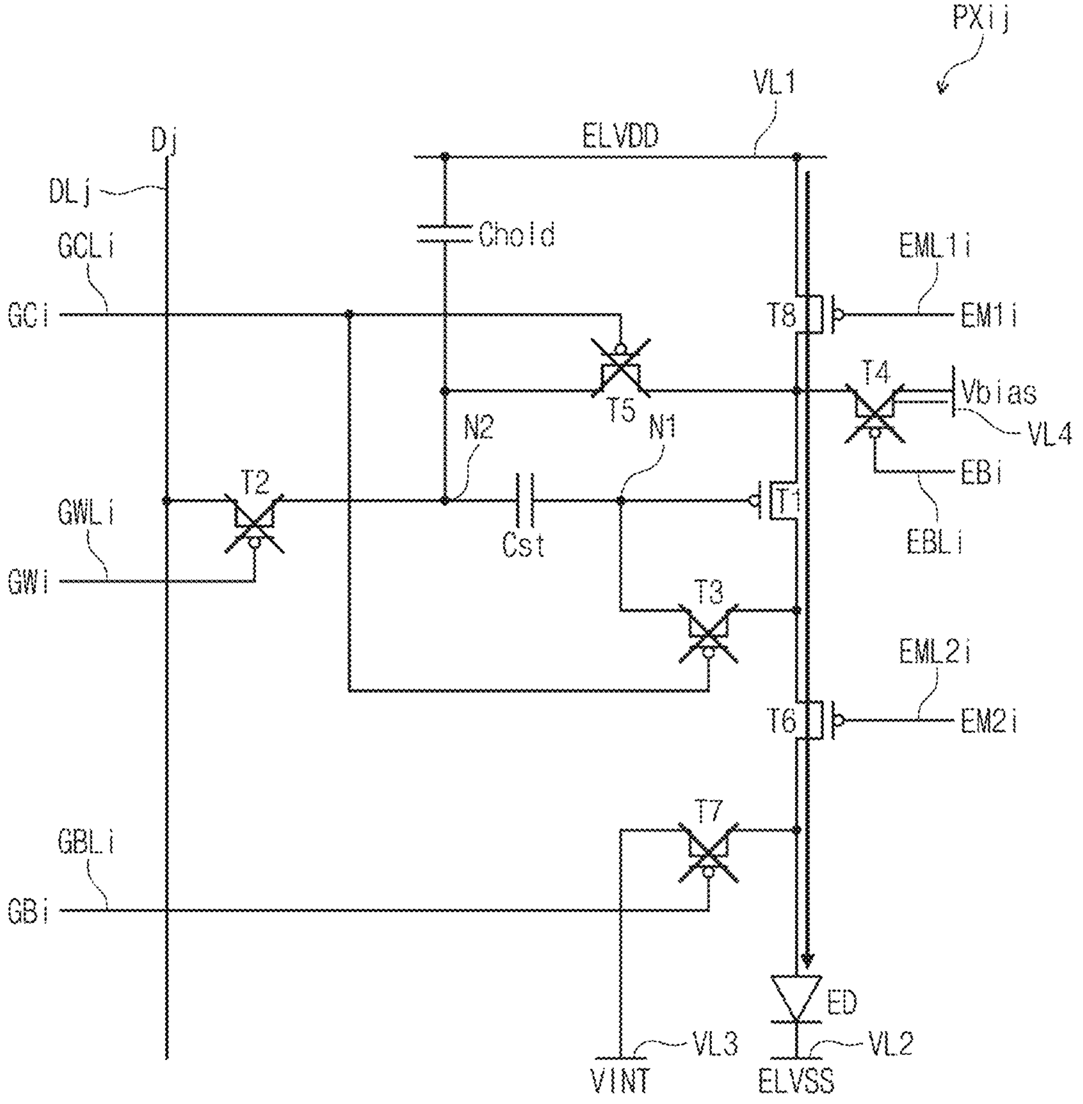
Figure 10B:
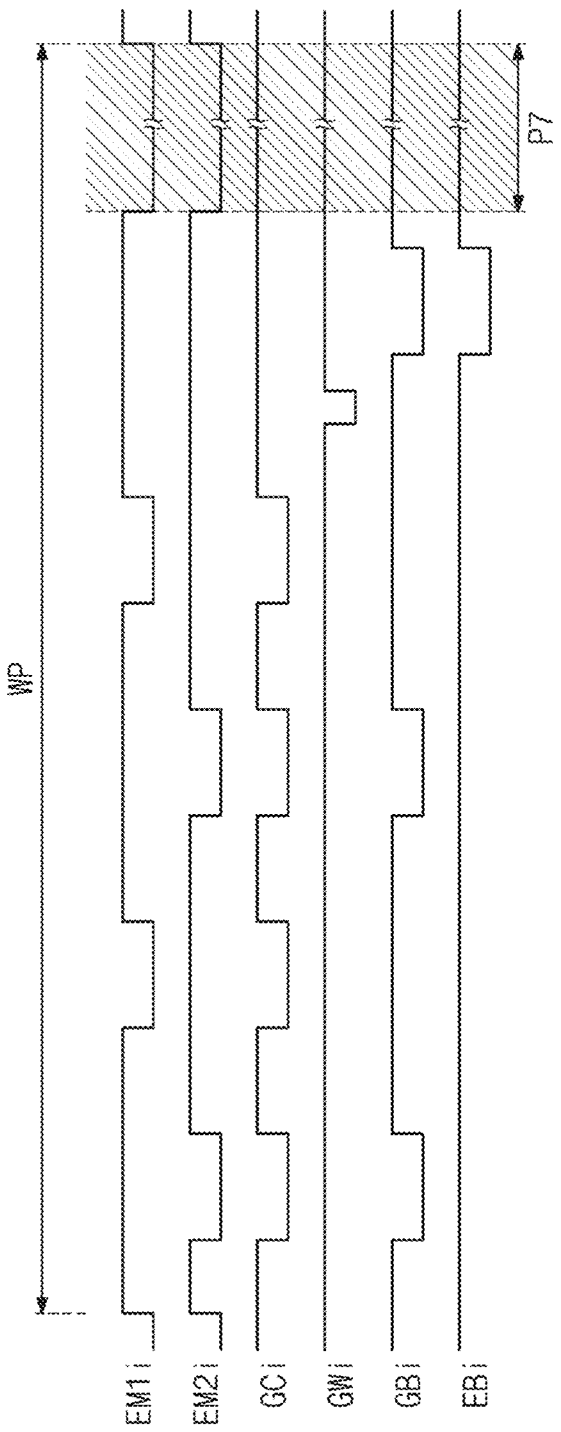

Referring to FIGS. 10A and 10B, during a seventh period P7 of the write period WP, all the scan signals GCi, GWi, GBi, and EBi are at the inactive level, and the emission signals EM1*i* and EM2*i* are at the active level. The sixth transistor T6 and the eighth transistor T8 may be turned on by the emission signals EM1*i* and EM2*i* being at the active level.

When the sixth transistor T6 and the eighth transistor T8 are turned on, a current path may be formed from the first driving voltage line VL1 to the light-emitting element ED through the eighth transistor T8, the first transistor T1, and the sixth transistor T6.

In this case, the amount of current transferred to the light-emitting element ED may be determined depending on a voltage level of the first node N1, that is, the gate electrode of the first transistor T1. As described above, during the fifth period P5, the voltage of the gate electrode of the first transistor T1 is "ELVDD−Vth+(Vdata−ELVDD)".

A current flowing through the first transistor T1 is proportional to "$(Vgs-Vth)^2$" that is the square of a difference between the threshold voltage Vth of the first transistor T1 and a voltage Vgs being a voltage difference between the first electrode and the gate electrode of the first transistor T1.

Because the voltage of the first electrode of the first transistor T1 is the first driving voltage ELVDD and the voltage of the gate electrode of the first transistor T1 is "ELVDD−Vth+(Vdata−ELVDD)", the voltage difference Vgs between the first electrode and the gate electrode of the first transistor T1 is "ELVDD−(ELVDD−Vth+(Vdata−ELVDD))".

Accordingly, a current flowing through the first transistor T1 is proportional to "$((ELVDD-(ELVDD-Vth+(Vdata-ELVDD)))-Vth)^2$". That is, the current flowing through the first transistor T1 is proportional to "(ELVDD—Vdata)".

Accordingly, the influence of the threshold voltage Vth of the first transistor T1 may be removed, and a current proportional to the voltage Vdata of the data signal Dj may be provided to the light-emitting element ED. The seventh period P7 may be an "emission period" in which the light-emitting element ED emits a light.

Figure 11A:
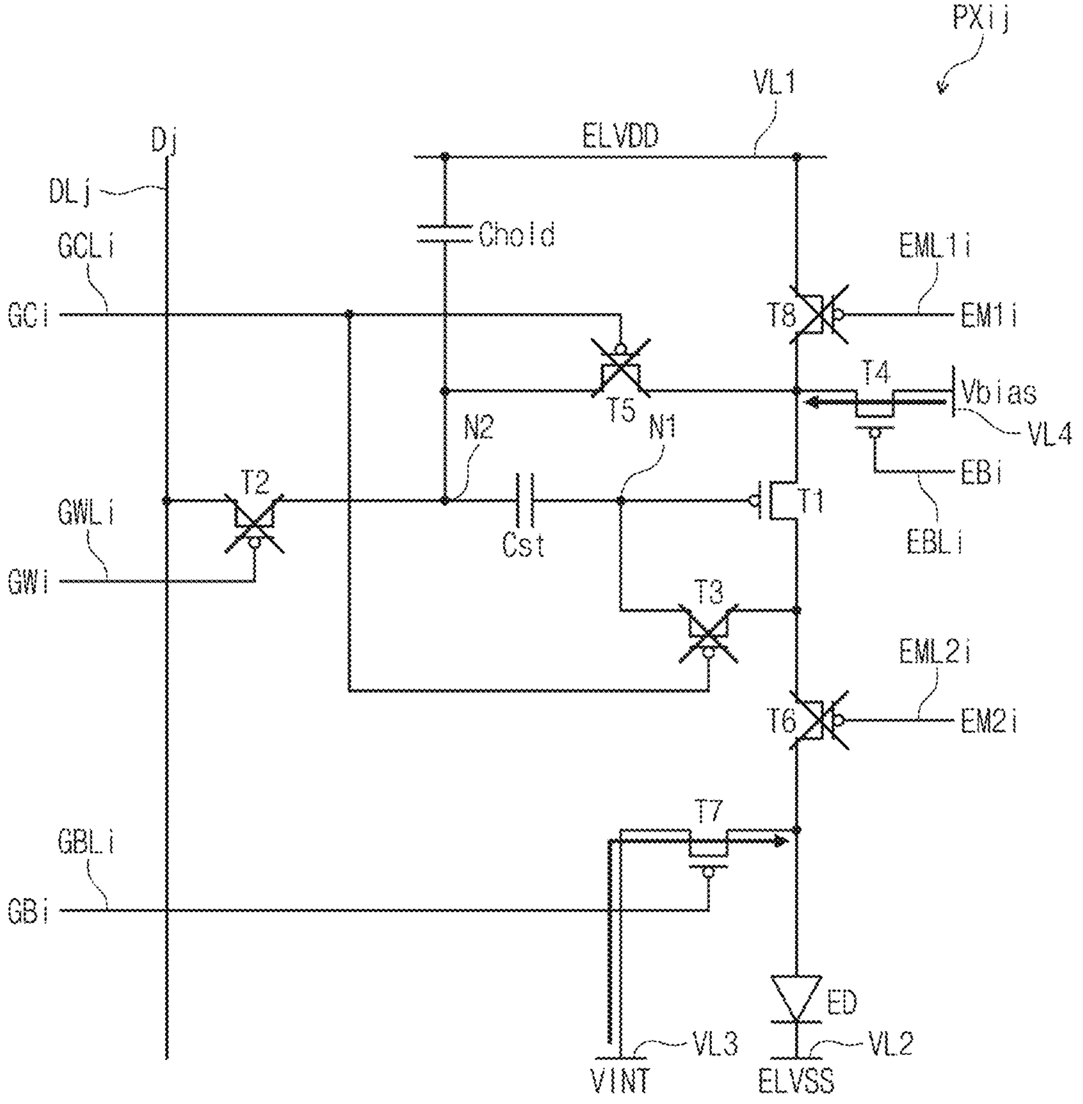
Figure 11B:
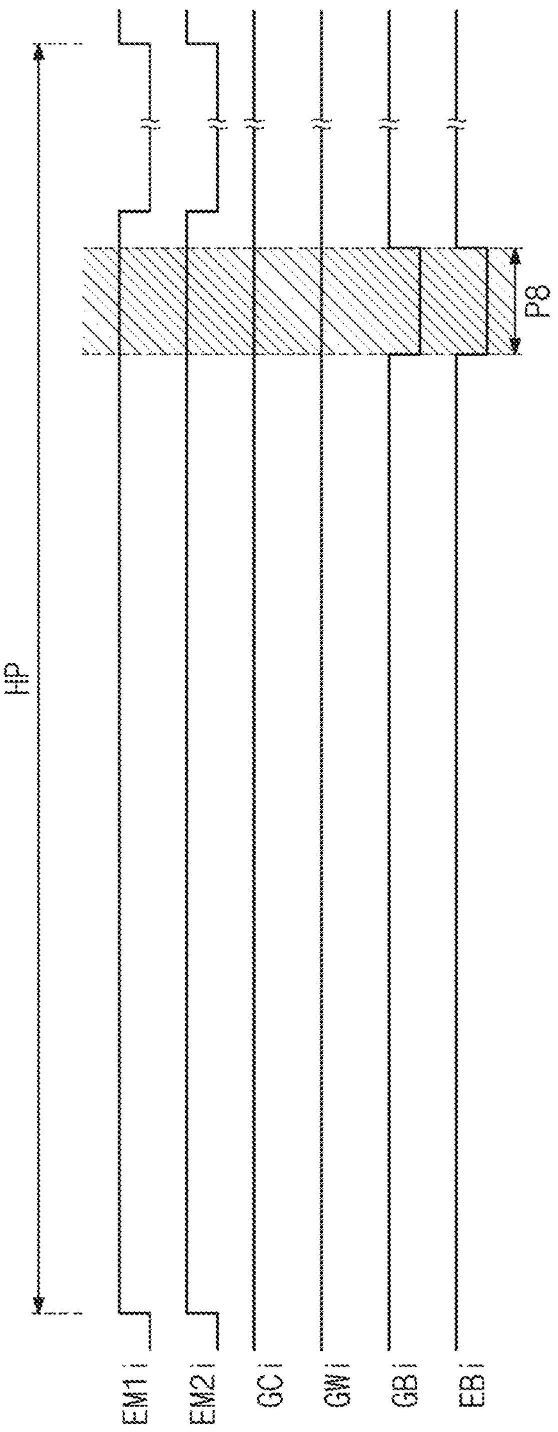

Referring to FIGS. 11A and 11B, during an eighth period P8 of the hold period HP, the scan signals GBi and EBi are at the active level, and the scan signals GCi and GWi and the emission signals EM1*i* and EM2*i* are at the inactive level.

The fourth transistor T4 and the seventh transistor T7 may be turned on by the scan signals GBi and EBi being at the active level. The initialization voltage VINT is provided to the anode of the light-emitting element ED through the seventh transistor T7. The bias voltage Vbias is provided to the first electrode of the first transistor T1 through the fourth transistor T4.

As illustrated in FIG. 3A, when the driving frequency of the display device DD is the first driving frequency, each of the frames F11 and F12 includes one hold period HP.

As illustrated in FIG. 3B, when the driving frequency of the display device DD is the second driving frequency, the frame F21 includes three hold periods HP. Because the data signal Dj may not be provided in the hold periods HP, the characteristic of the threshold voltage Vth of the first transistor T1 may change when the number of hold periods HP in one frame increases. As illustrated in FIGS. 11A and 11B, the hysteresis effect due to a characteristic change in the threshold voltage Vth of the first transistor T1 may be minimized by providing the bias voltage Vbias to the first electrode of the first transistor T1 during the eighth period P8 of the hold period HP.

In an embodiment, the fifth period P5 illustrated in FIG. 8B may correspond to one horizontal period. One horizontal period may refer to a time during which the data signal Dj is provided to the pixels PX belonging to one row of the display panel DP (refer to FIG. 1). Each of the second period P2 illustrated in FIG. 5B and the fourth period P4 illustrated in FIG. 7B, that is, each of the first compensation period and the second compensation period may be longer in time than one horizontal period. Because each of the second period P2 and the fourth period P4 is longer than one horizontal period, it is possible to sufficiently secure a time necessary to compensate for the threshold voltage Vth of the first transistor T1 even though the driving frequency of the display device DD becomes higher.

Figure 12:
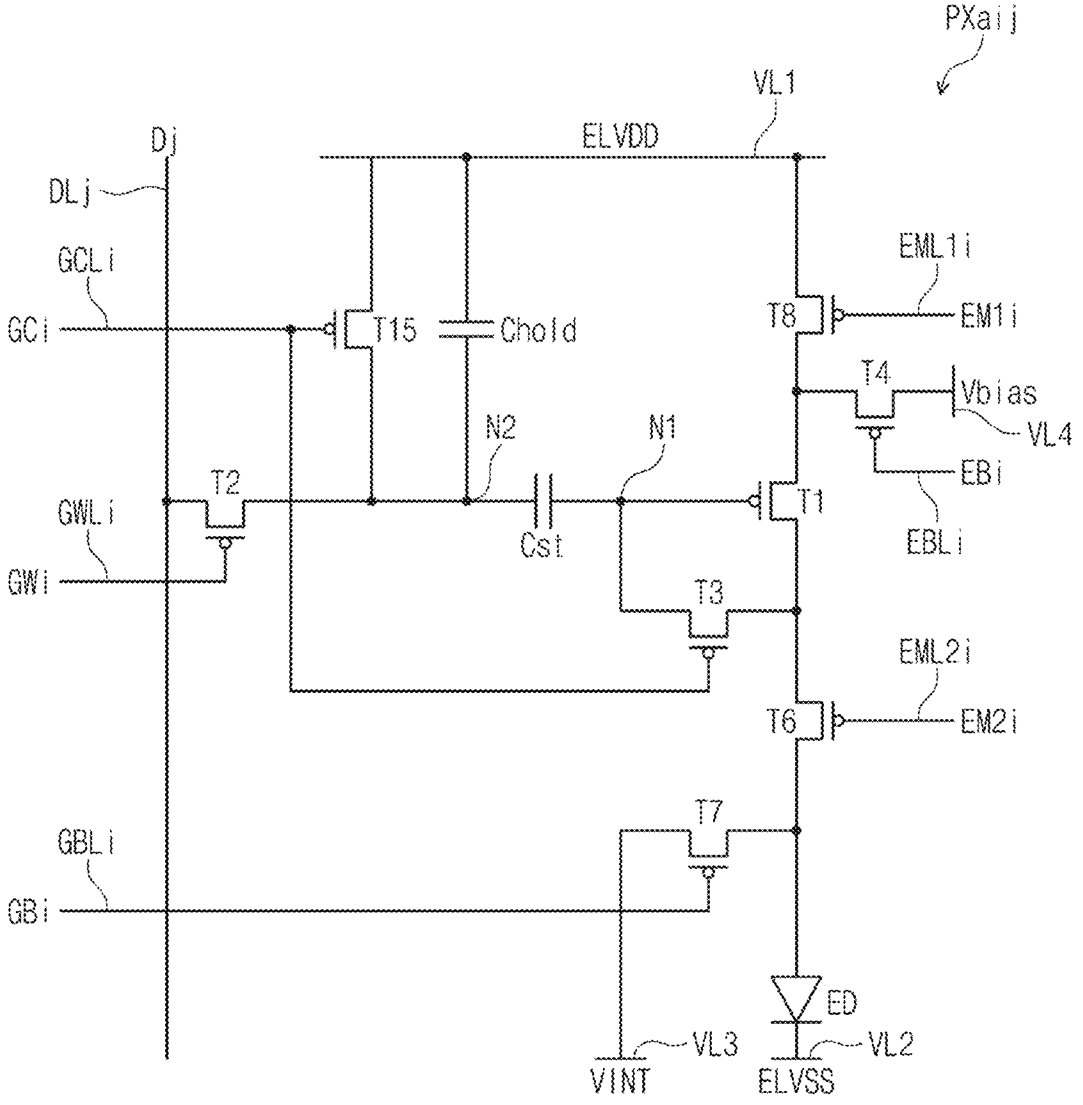
FIG. 12 is a circuit diagram of a pixel according to an embodiment of the present disclosure.

FIG. 12 is a circuit diagram of a pixel according to an embodiment of the present disclosure.

A circuit configuration of a pixel PXaij illustrated in FIG. 12 may be similar to the circuit configuration of the pixel PXij illustrated in FIG. 2. The pixel PXij illustrated in FIG. 2 includes the fifth transistor T5, but the pixel PXaij illustrated in FIG. 12 includes a fifteenth transistor T15 instead of the fifth transistor T5.

Referring to FIG. 12, the pixel PXaij is connected with the j-th data line DLj among the data lines DL1 to DLm (refer to FIG. 1), the i-th scan lines GCLi, GWLi, GBLi, and EBLi among the scan lines GCL1 to GCLn, GWL1 to GWLn, GBL1 to GBLn, and EBL1 to EBLn (refer to FIG. 1), and the i-th emission lines EML1*i* and EML2*i* among the emission lines EML11 to EML1*n* and EML21 to EML2*n* (refer to FIG. 1).

The first, second, third, fourth, sixth, seventh, and eighth transistors T1, T2, T3, T4, T6, T7, and T8 and the first and second capacitors Cst and Chold of the pixel PXaij are substantially the same as the first, second, third, fourth, sixth, seventh, and eighth transistors T1, T2, T3, T4, T6, T7, T8, and the first and second capacitors Cst and Chold of the pixel PXij illustrated in FIG. 2 and thus are marked by the same reference signs. Also, additional description will be omitted to avoid redundancy.

The fifteenth transistor T15 includes a first electrode connected with the first driving voltage line VL1, a second electrode connected with the second node N2, and a gate electrode connected with the scan line GCLi.

FIGS. 13A to 13F are diagrams for describing an operation of a pixel illustrated in FIG. 12.

Operations of the pixel PXaij and the display device according to an embodiment will be described with reference to FIGS. 4B, 5B, 6B, 7B, 8B, 9B, 10B, 11B, and FIGS. 13A to 13F.

Figure 13A:
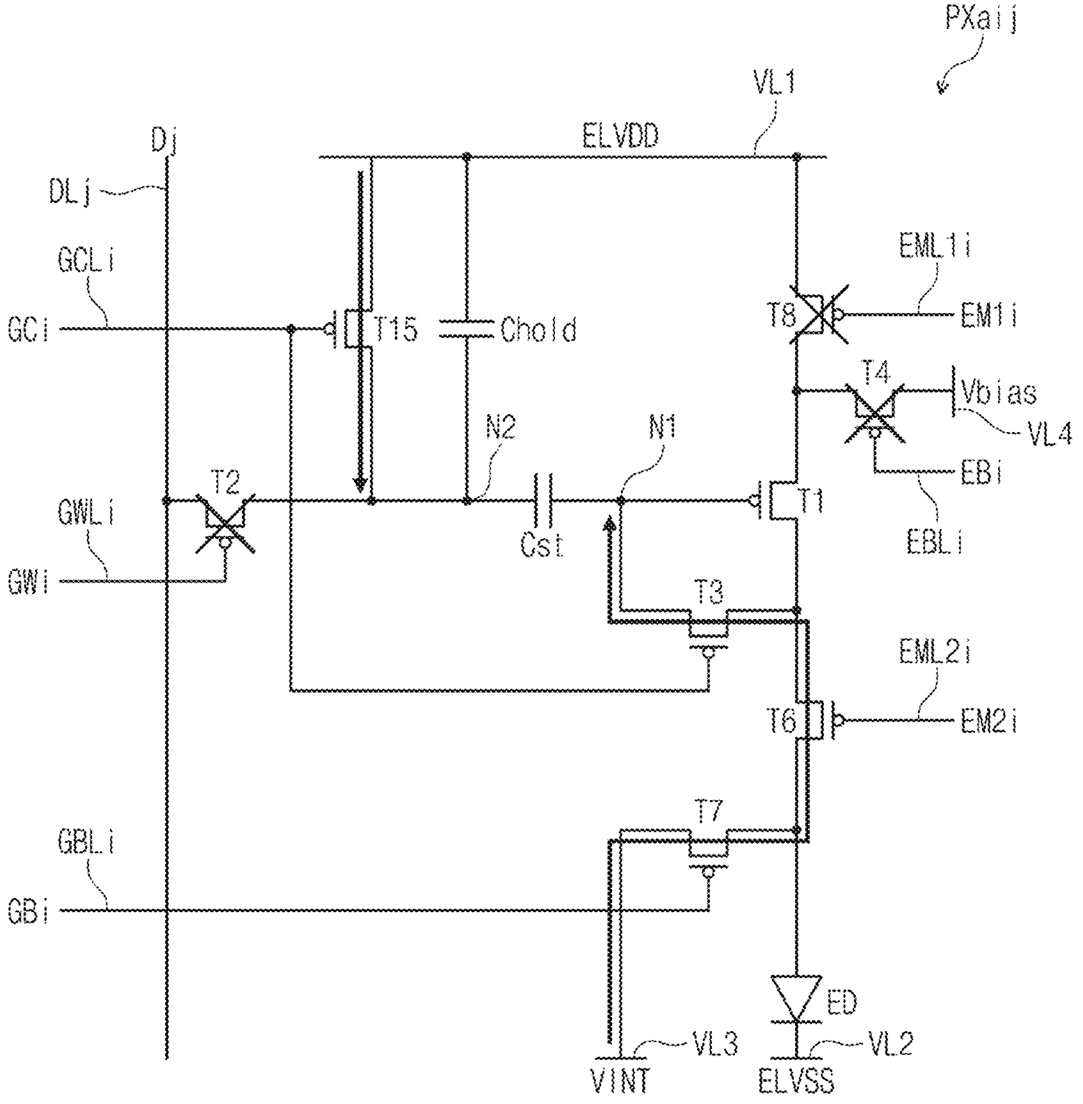
FIGS. 13A to 13F are diagrams for describing an operation of a pixel illustrated in FIG. 12.

Referring to FIGS. 4B and 13A, during the first period P1 of the write period WP, the scan signals GCi and GBi are at the active level (e.g., a low level), and the scan signals GWi and EBi are at the inactive level (e.g., a high level). Also, during the first period P1, the emission signal EM1*i* is at the inactive level, and the emission signal EM2*i* is at the active level. The third, sixth, and seventh transistors T3, T6, and T7 are turned on in response to the scan signals GCi and GBi and the emission signal EM2*i* being at the active level. As such, during the first period P1, the initialization voltage VINT may be transferred to the first node N1 through the seventh transistor T7, the sixth transistor T6, and the third transistor T3.

Meanwhile, the fifteenth transistor T15 is turned on in response to the scan signal GCi being at the active level. In this case, the first driving voltage ELVDD may be transferred to the second node N2 through the fifteenth transistor T15.

The first period P1 may refer to the first initialization period in which the first node N1, that is, the gate electrode of the first transistor T1 is initialized with the initialization voltage VINT and the second node N2 is initialized with the first driving voltage ELVDD.

Figure 13B:
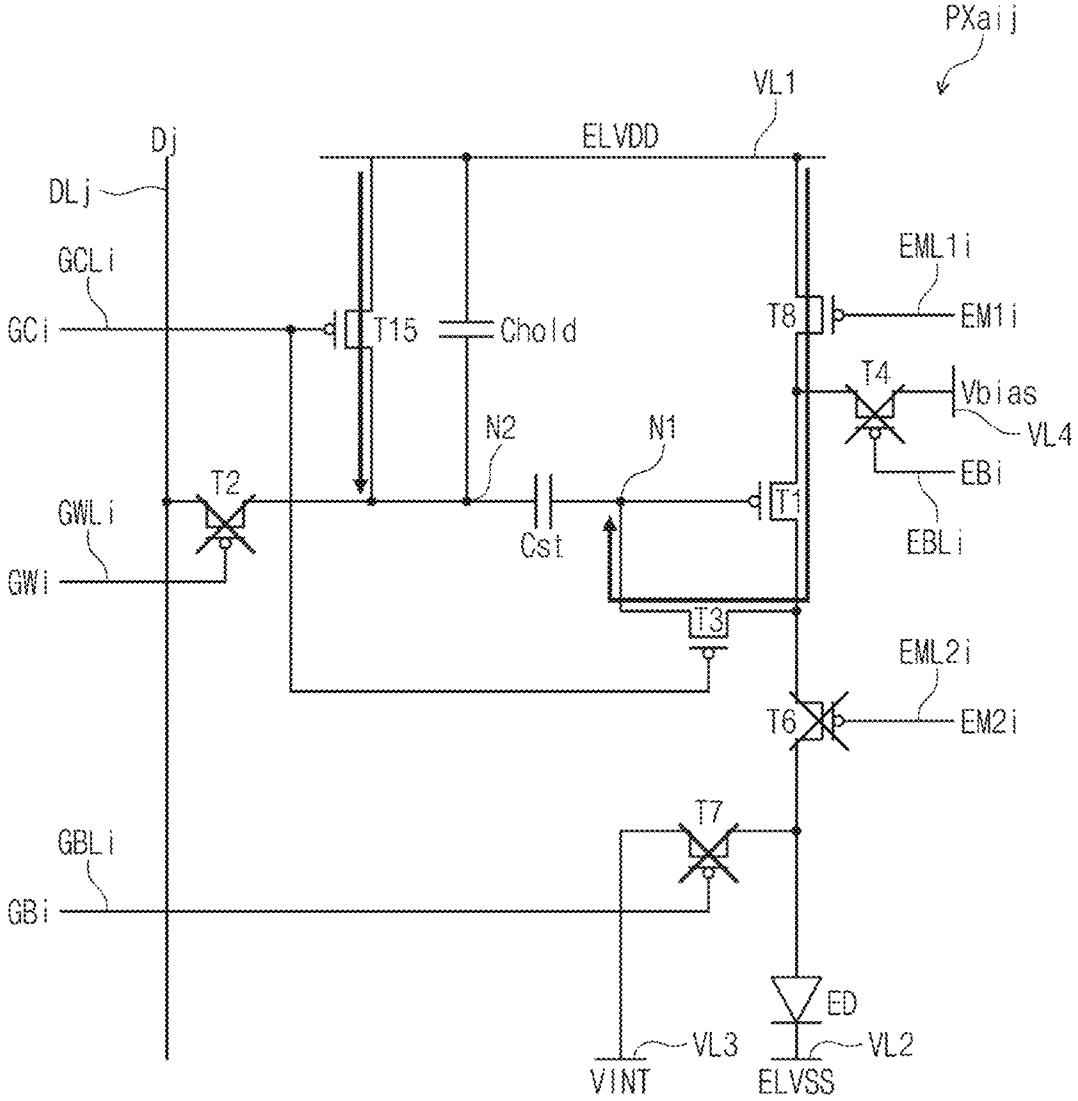

Referring to FIGS. 5B and 13B, during the second period P2 of the write period WP, the scan signal GCi is at the active level (e.g., a low level), and the scan signals GWi, GBi, and EBi are at the inactive level (e.g., a high level). Also, during the second period P2, the emission signal EM1*i* is at the active level, and the emission signal EM2*i* is at the inactive level. The third, eighth, and fifteenth transistors T3, T8, and 15 are turned on in response to the scan signal GCi and the emission signal EM1*i* being at the active level. As such, during the second period P2, the first driving voltage ELVDD may be transferred to the second node N2 through the fifteenth transistor T15.

Meanwhile, during the second period P2, the first driving voltage ELVDD may be transferred to the first node N1, that is, the gate electrode of the first transistor T1 through the eighth transistor T8, the first transistor T1, and the third transistor T3. The gate electrode of the first transistor T1 may be provided with a voltage obtained by subtracting the threshold voltage Vth of the first transistor T1 from the first driving voltage ELVDD.

The voltage of the second node N2 in the first period P1 is the first driving voltage ELVDD, and the second node N2 maintains the first driving voltage ELVDD in the second period P2. Accordingly, the voltage of the first node N1 may correspond to a voltage "ELVDD−Vth" obtained by subtracting the threshold voltage Vth of the first transistor T1 from the first driving voltage ELVDD. The second period P2 may refer to the first compensation period for compensating for the threshold voltage Vth of the first transistor T1.

Referring again to FIGS. 6B and 13A, during the third period P3 of the write period WP, the scan signals GCi and GBi are at the active level (e.g., a low level), and the scan signals GWi and EBi are at the inactive level (e.g., a high level). Also, during the third period P3, the emission signal EM1*i* is at the inactive level, and the emission signal EM2*i* is at the active level. The third, sixth, and seventh transistors T3, T6, and T7 are turned on in response to the scan signals GCi and GBi and the emission signal EM2*i* being at the active level. As such, during the third period P3, the initialization voltage VINT may be transferred to the first node N1 through the seventh transistor T7, the sixth transistor T6, and the third transistor T3. The third period P3 may refer to the second initialization period in which the gate electrode of the first transistor T1 is initialized with the initialization voltage VINT and the second node N2 is initialized with the first driving voltage ELVDD.

Referring again to FIGS. 7B and 13B, during the fourth period P4 of the write period WP, the scan signal GCi is at the active level (e.g., a low level), and the scan signals GWi, GBi, and EBi are at the inactive level (e.g., a high level). Also, during the fourth period P4, the emission signal EM1*i* is at the active level, and the emission signal EM2*i* is at the inactive level. The third, eighth, and fifteenth transistors T3, T8, and T15 are turned on in response to the scan signal GCi and the emission signal EM1*i* being at the active level. As such, during the fourth period P4, the first driving voltage ELVDD may be transferred to the second node N2 through the fifteenth transistor T15.

Meanwhile, during the fourth period P4, the first driving voltage ELVDD may be transferred to the first node N1, that is, the gate electrode of the first transistor T1 through the eighth transistor T8, the first transistor T1, and the third transistor T3. The voltage of the first node N1 may correspond to a voltage obtained by subtracting the threshold voltage Vth of the first transistor T1 from the first driving voltage ELVDD. That is, in the fourth period P4, the voltage of the first node N1 is "ELVDD−Vth".

The fourth period P4 may refer to the second compensation period for compensating for the threshold voltage Vth of the first transistor T1.

As illustrated in FIGS. 4B, 5B, 13A, and 13B, the pixel PXaij may include the fifteenth transistor T15 and may set the second node N2 with the first driving voltage ELVDD in the first period P1. In this case, the data signal Dj of a previous frame may not affect the second node N2. Accordingly, the pixel PXaij performs only one initialization operation and only one compensation operation. This means that the third period P3 illustrated in FIG. 6B and the fourth period P4 illustrated in FIG. 7B are not required.

Figure 13C:
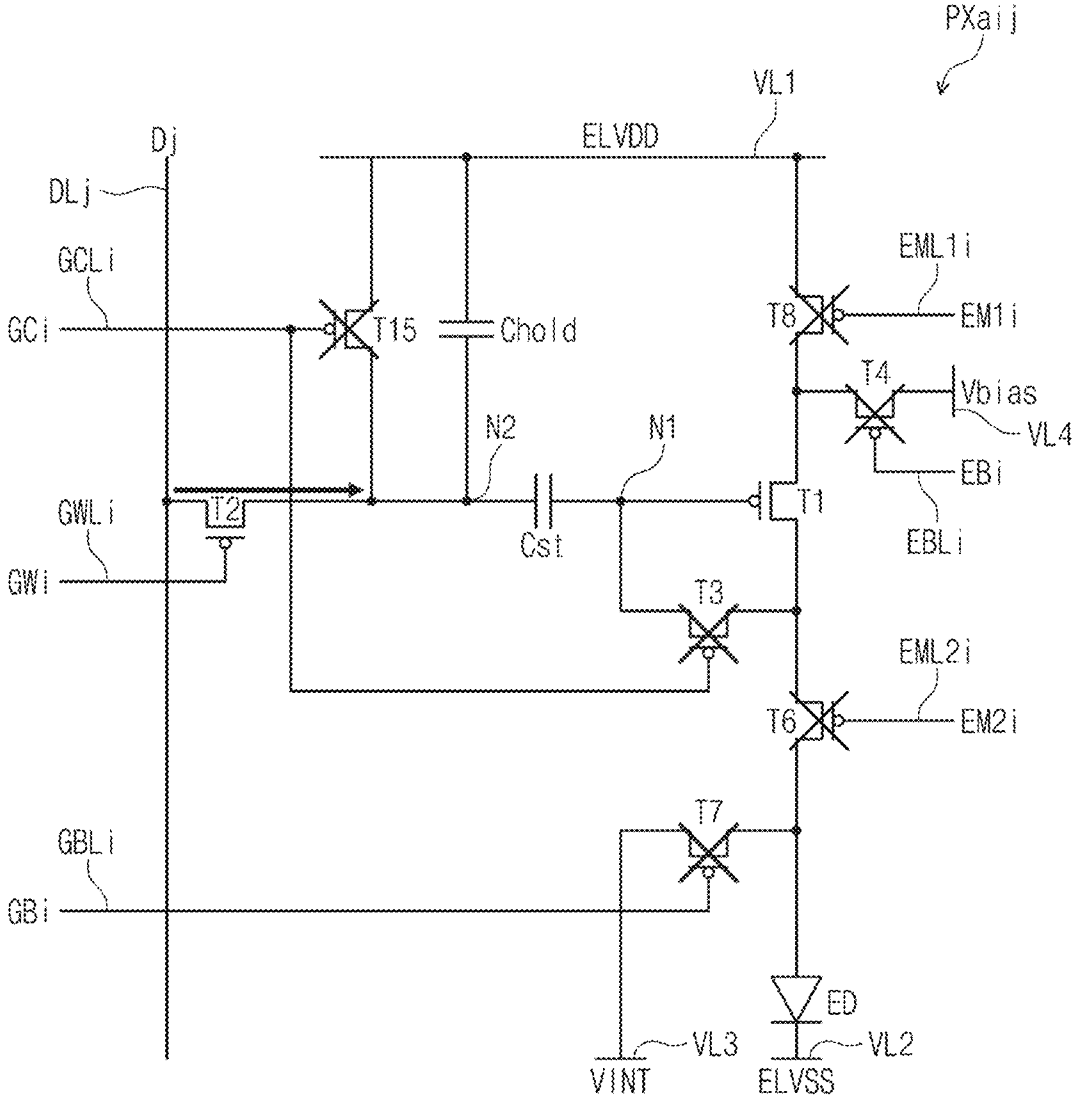

Referring to FIGS. 8B and 13C, during the fifth period P5 of the write period WP, only the scan signal GWi is at the active level. When the second transistor T2 is turned on by the scan signal GWi being at the active level, the data signal Dj from the data line DLj may be transferred to the second node N2.

The voltage of the second node N2 is changed from the first driving voltage ELVDD to the voltage Vdata of the data signal Dj. The voltage variation "Vdata−ELVDD" of the second node N2 may be transferred to the first node N1 by the coupling of the first capacitor Cst.

Because the voltage of the first node N1 in the fourth period P4 (or the second period P2) is "ELVDD−Vth", the voltage of the first node N1, that is, the gate electrode of the first transistor T1 in the fifth period P5 is "ELVDD−Vth+(Vdata −ELVDD)".

The fifth period P5 may refer to the data write period in which a voltage corresponding to the data signal Dj is stored in the first capacitor Cst.

Figure 13D:
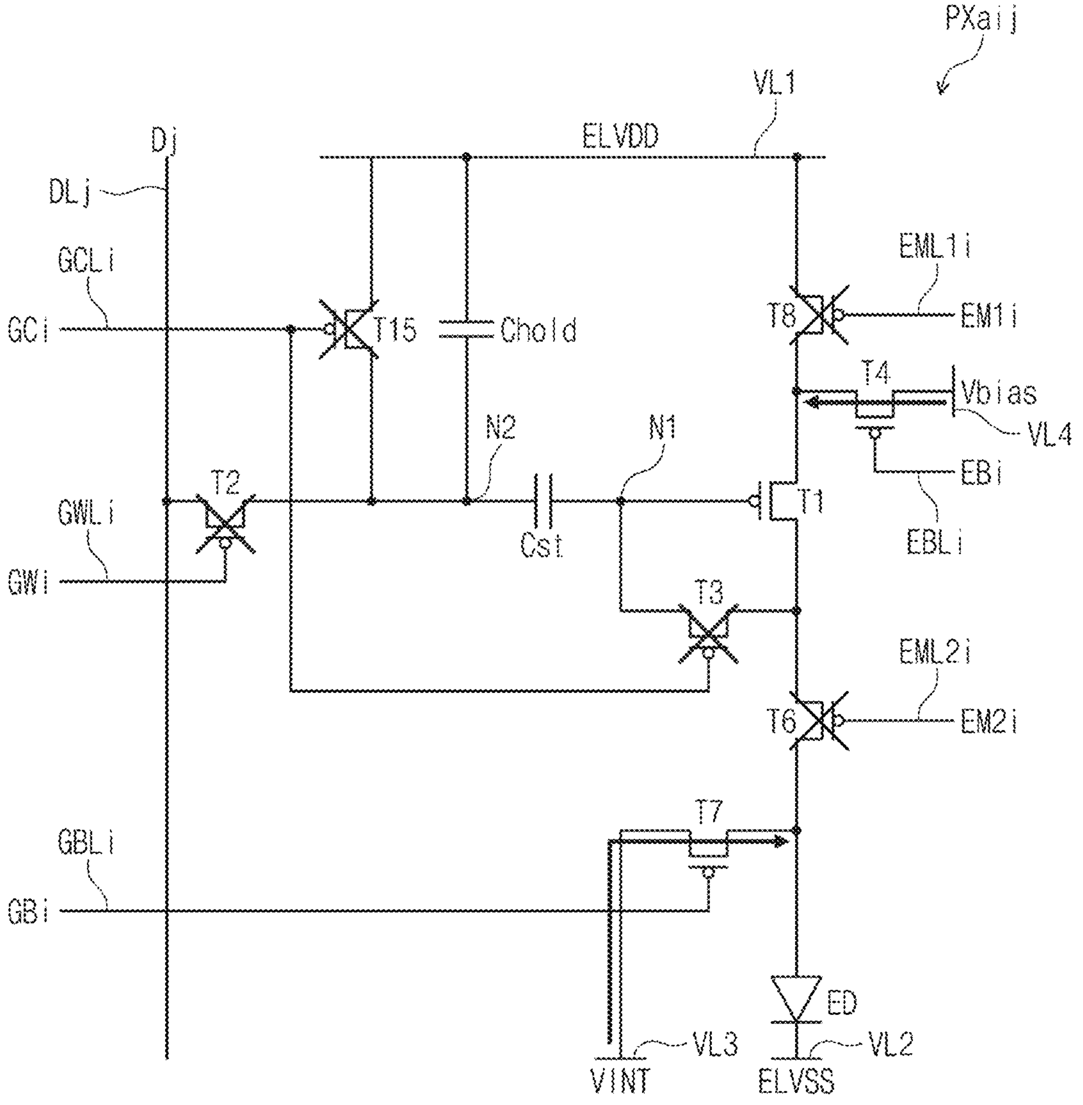

Referring to FIGS. 9B and 13D, during the sixth period P6 of the write period WP, the scan signals GBi and EBi are at the active level, and the scan signals GCi and GWi and the emission signals EM1*i* and EM2*i* are at the inactive level.

The fourth transistor T4 and the seventh transistor T7 may be turned on by the scan signals GBi and EBi being at the active level. The initialization voltage VINT is provided to the anode of the light-emitting element ED through the seventh transistor T7. The bias voltage Vbias is provided to the first electrode of the first transistor T1 through the fourth transistor T4.

The hysteresis effect due to a characteristic change in the threshold voltage Vth of the first transistor T1 may be minimized by providing the bias voltage Vbias to the first electrode of the first transistor T1.

The sixth period P6 may refer to the anode initialization and bias period in which the anode of the light-emitting element ED and the first electrode of the first transistor T1 are initialized.

Figure 13E:
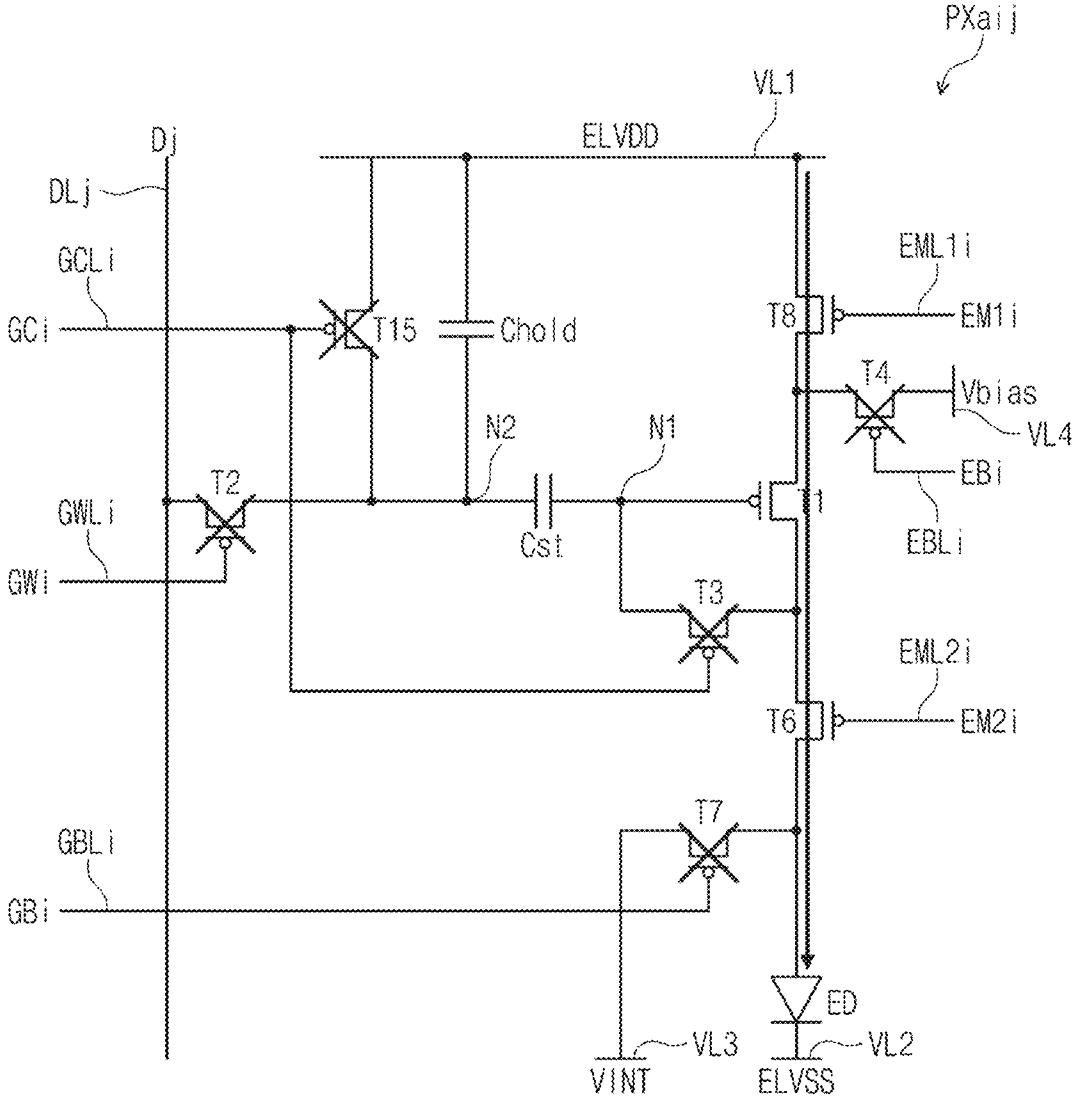

Referring to FIGS. 10B and 13E, during the seventh period P7 of the write period WP, all the scan signals GCi, GWi, GBi, and EBi are at the inactive level, and the emission signals EM1*i* and EM2*i* are at the active level. The sixth transistor T6 and the eighth transistor T8 may be turned on by the emission signals EM1*i* and EM2*i* being at the active level.

When the sixth transistor T6 and the eighth transistor T8 are turned on, a current path may be formed from the first driving voltage line VL1 to the light-emitting element ED through the eighth transistor T8, the first transistor T1, and the sixth transistor T6.

In this case, the amount of current transferred to the light-emitting element ED may be determined depending on a voltage level of the first node N1, that is, the gate electrode of the first transistor T1. Because the voltage of the gate electrode of the first transistor T1 in the fifth period P5 is "ELVDD−Vth+(Vdata−ELVDD)", the current flowing through the first transistor T1 is proportional to "(ELVDD—Vdata)".

Accordingly, the influence of the threshold voltage Vth of the first transistor T1 may be removed, and a current proportional to the voltage Vdata of the data signal Dj may be provided to the light-emitting element ED. The seventh period P7 may refer to the emission period in which the light-emitting element ED emits a light.

Figure 13F:
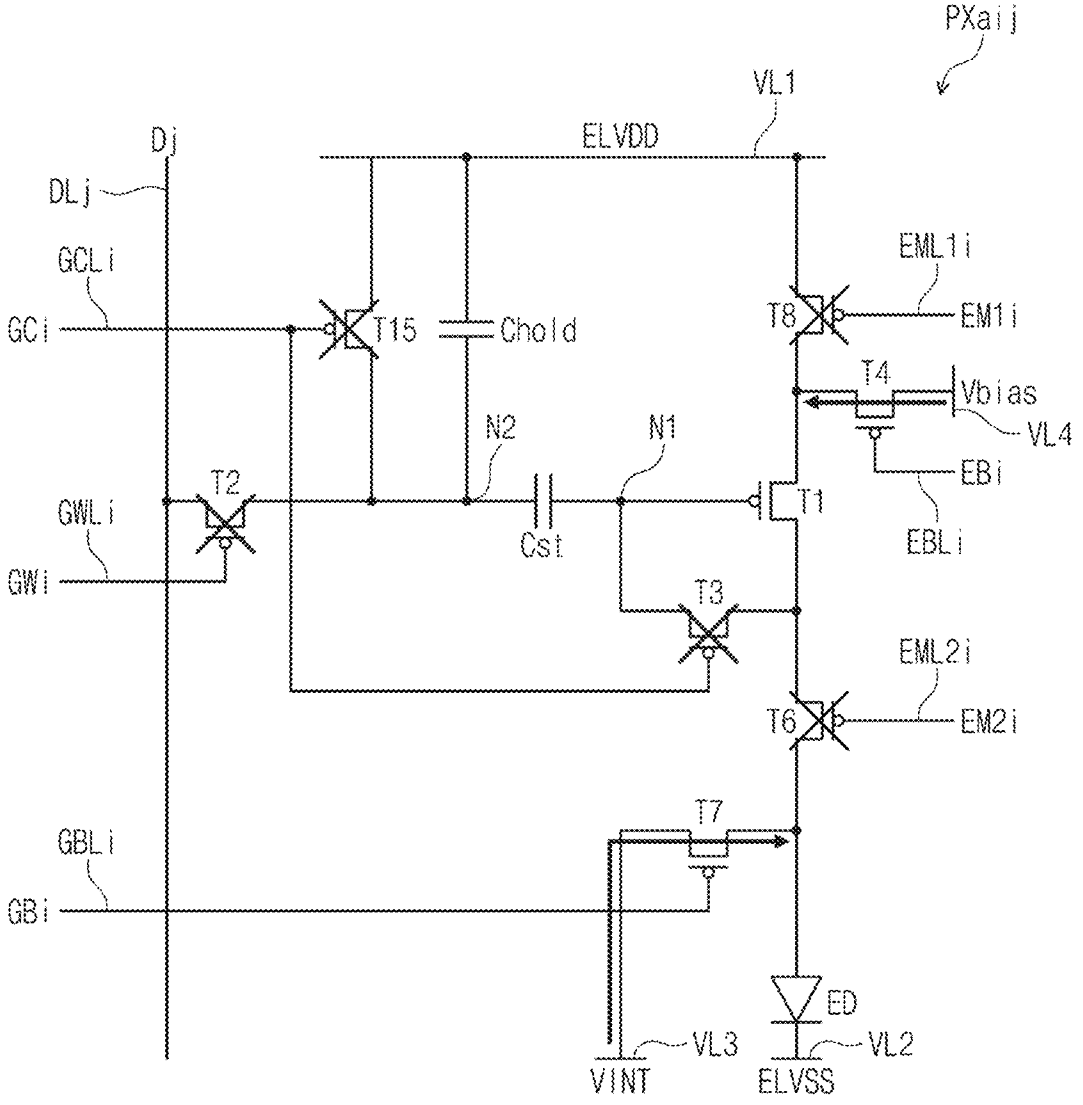

Referring to FIGS. 11B and 13F, during the eighth period P8 of the hold period HP, the scan signals GBi and EBi are at the active level, and the scan signals GCi and GWi and the emission signals EM1*i* and EM2*i* are at the inactive level.

The fourth transistor T4 and the seventh transistor T7 may be turned on by the scan signals GBi and EBi being at the active level. The initialization voltage VINT is provided to the anode of the light-emitting element ED through the seventh transistor T7. The bias voltage Vbias is provided to the first electrode of the first transistor T1 through the fourth transistor T4. Accordingly, the hysteresis influence due to the characteristic change in the threshold voltage Vth of the first transistor T1 may be minimized.

Figure 14:
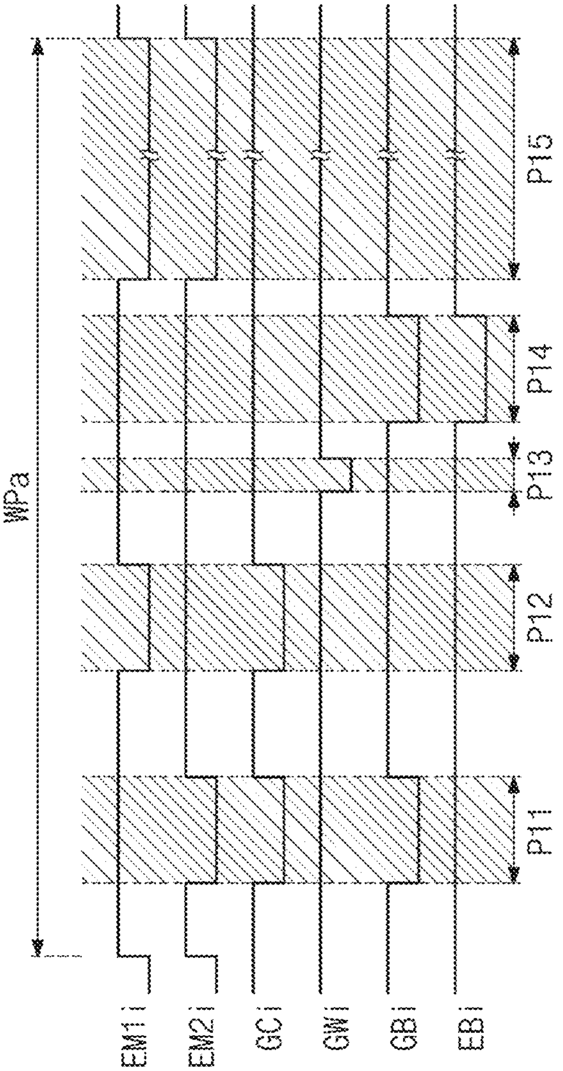
FIG. 14 is a timing diagram for describing an operation of a pixel illustrated in FIG. 12.

FIG. 14 is a timing diagram for describing an operation of the pixel PXaij illustrated in FIG. 12.

In the timing diagrams of FIGS. 4B, 5B, 6B, and 7B, the write period WP includes the first period P1, the second period P2, the third period P3, and the fourth period P4.

In the timing diagram of FIG. 14, a write period WPa includes a first period P11 and a second period P12 corresponding to the first period P1 and the second period P2 and does not include periods corresponding to the third period P3 and the fourth period P4.

The fifth, sixth, and seventh periods P5, P6, and P7 illustrated in FIGS. 8A, 9A, and 10A, respectively, may correspond to third, fourth, and fifth periods P13, P14, and P15 in the timing diagram of FIG. 14, respectively.

As described above, the pixel PXaij of FIG. 12 may include the fifteenth transistor T15 and may set the second node N2 with the first driving voltage ELVDD in the first period P11. In this case, the data signal Dj of a previous frame may not affect the second node N2. Accordingly, the pixel PXaij performs only one initialization operation and only one compensation operation. This means that the third period P3 illustrated in FIG. 6B and the fourth period P4 illustrated in FIG. 7B are not required. That is, the pixel PXaij may operate based on the timing diagram illustrated in FIG. 14 during the write period WPa.

Figure 15:
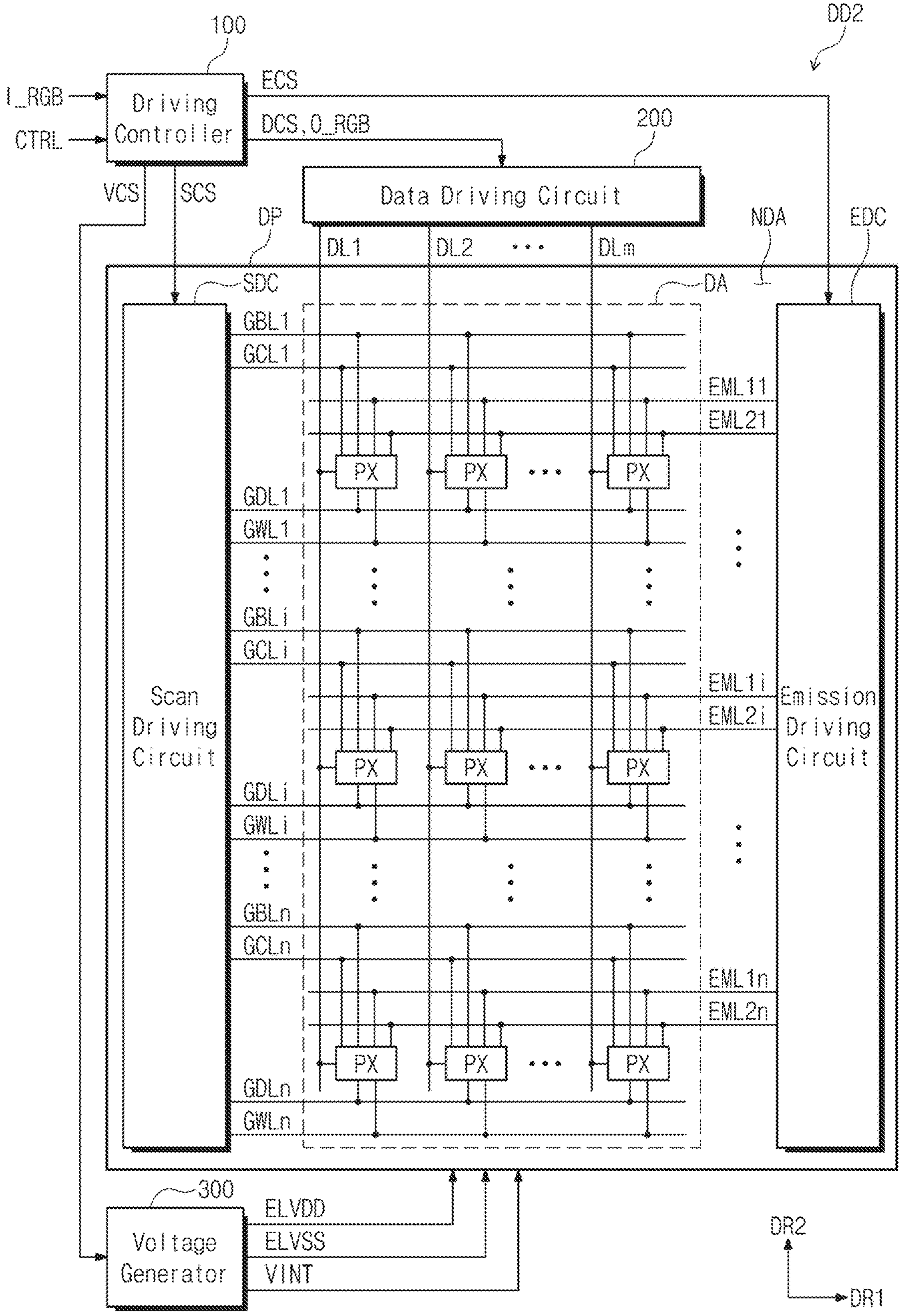
FIG. 15 is a block diagram of a display device according to an embodiment of the present disclosure.

FIG. 15 is a block diagram of a display device DD2 according to an embodiment of the present disclosure.

Referring to FIG. 15, the display device DD2 includes the display panel DP, the driving controller 100, the data driving circuit 200, the voltage generator 300, the scan driving circuit SDC, and the emission driving circuit EDC.

The driving controller 100 receives the input image signal I_RGB and the control signal CTRL. The driving controller 100 generates the output image signal O_RGB obtained by converting a data format of the input image signal I_RGB so as to be appropriate for the display panel DP. The driving controller 100 outputs the scan control signal SCS, the data control signal DCS, the emission control signal ECS, and the voltage control signal VCS.

The data driving circuit 200 receives the data control signal DCS and the output image signal O_RGB from the driving controller 100. The data driving circuit 200 converts the output image signal O_RGB into data signals and then outputs the data signals to the plurality of data lines DL1 to DLm to be described later. The data signals refer to analog voltages corresponding to a grayscale value of the output image signal O_RGB.

The voltage generator 300 generates voltages for an operation of the display panel DP. In an embodiment, the voltage generator 300 generates the first driving voltage ELVDD, the second driving voltage ELVSS, and the initialization voltage VINT. The voltages generated by the voltage generator 300 are not limited to the example illustrated in FIG. 15. The number of voltages, which are generated by the voltage generator 300 depending on a circuit configuration of a pixel included in the display panel DP and a need, and a voltage level of each of the voltages may be variously changed or modified.

The display panel DP includes scan lines GBL1 to GBLn, GCL1 to GCLn, GDL1 to GDLn, and GWL1 to GWLn, the emission lines EML11 to EML1*n* and EML21 to EML2*n*, the data lines DL1 to DLm, and the pixels PX. The scan driving circuit SDC and the emission driving circuit EDC may be disposed in the display panel DP.

In an embodiment, the pixels PX may be arranged in the display area DA, and the scan driving circuit SDC and the emission driving circuit EDC may be arranged in the non-display area NDA.

In an embodiment, the scan driving circuit SDC is disposed on the first side of the non-display area NDA of the display panel DP. The scan lines GBL1 to GBLn, GCL1 to GCLn, GDL1 to GDLn, and GWL1 to GWLn extend from the scan driving circuit SDC in the first direction DR1.

The emission driving circuit EDC is disposed on the second side of the non-display area NDA of the display panel DP. The emission lines EML11 to EML1*n* and EML21 to EML2*n* extend from the emission driving circuit EDC in a direction facing away from the first direction DR1.

The scan lines GBL1 to GBLn, GCL1 to GCLn, GDL1 to GDLn, and GWL1 to GWLn and the emission lines EML11 to EML1*n* and EML21 to EML2*n* are arranged to be spaced from each other in the second direction DR2. The data lines DL1 to DLm extend from the data driving circuit 200 in a direction facing away from the second direction DR2 and are arranged to be spaced from each other in the first direction DR1.

In an example illustrated in FIG. 15, the scan driving circuit SDC and the emission driving circuit EDC are arranged to face each other, with the pixels PX interposed therebetween. However, the present disclosure is not limited thereto. For example, the scan driving circuit SDC and the emission driving circuit EDC may be disposed adjacent to each other on the first side or the second side of the display panel DP. In an embodiment, the scan driving circuit SDC and the emission driving circuit EDC may be implemented with one circuit.

Each of the plurality of pixels PX may be electrically connected with four of the scan lines GBL1 to GBLn, GCL1 to GCLn, GDL1 to GDLn, and GWL1 to GWLn and two of the emission lines EML11 to EML1*n* and EML21 to EML2*n*. For example, as illustrated in FIG. 15, the pixels PX in the first row may be connected with the scan lines GBL1, GCL1, GDL1, and GWL1 and the emission lines EML11 and EML21. Also, the pixels PX in the i-th row may be connected with the scan lines GBLi, GCLi, GDLi, and GWLi and the emission lines EML1*i* and EML2*i*.

Each of the plurality of pixels PX includes the light-emitting element ED (refer to FIG. 16) and the pixel circuit controlling the emission of the light-emitting element ED. The pixel circuit may include one or more transistors and one or more capacitors. The scan driving circuit SDC and the emission driving circuit EDC may include transistors formed through the same process as the transistors in the pixel PX.

Each of the plurality of pixels PX receives the first driving voltage ELVDD, the second driving voltage ELVSS, and the initialization voltage VINT from the voltage generator 300.

The scan driving circuit SDC receives the scan control signal SCS from the driving controller 100. The scan driving circuit SDC may output scan signals to the scan lines GBL1 to GBLn, GCL1 to GCLn, GDL1 to GDLn, and GWL1 to GWLn in response to the scan control signal SCS.

The emission driving circuit EDC receives the emission control signal ECS from the driving controller 100. The emission driving circuit EDC may output emission signals to the emission lines EML11 to EML1*n* and EML21 to EML2*n* in response to the emission control signal ECS.

The driving controller 100 according to an embodiment of the present disclosure may output the scan control signal SCS for controlling the timing to provide the scan signals to the scan lines GBL1 to GBLn, GCL1 to GCLn, GDL1 to GDLn, and GWL1 to GWLn in response to the control signal CTRL.

The driving controller 100 according to an embodiment of the present disclosure may output the emission control signal ECS for controlling the timing to provide the emission signals to the emission lines EML1*i* and EML2*i* based on the control signal CTRL.

An example in which the scan driving circuit SDC outputs scan signals to the scan lines GDL1 to GDLn is illustrated in FIG. 15, but the present disclosure is not limited thereto. For example, scan signals that are provided to the scan lines GDL1 to GDLn may be the same as emission signals that are provided to the emission lines EML11 to EML1*n*. In this case, the scan driving circuit SDC may output scan signals only to the scan lines GBL1 to GBLn, GCL1 to GCLn, and GWL1 to GWLn.

Figure 16:
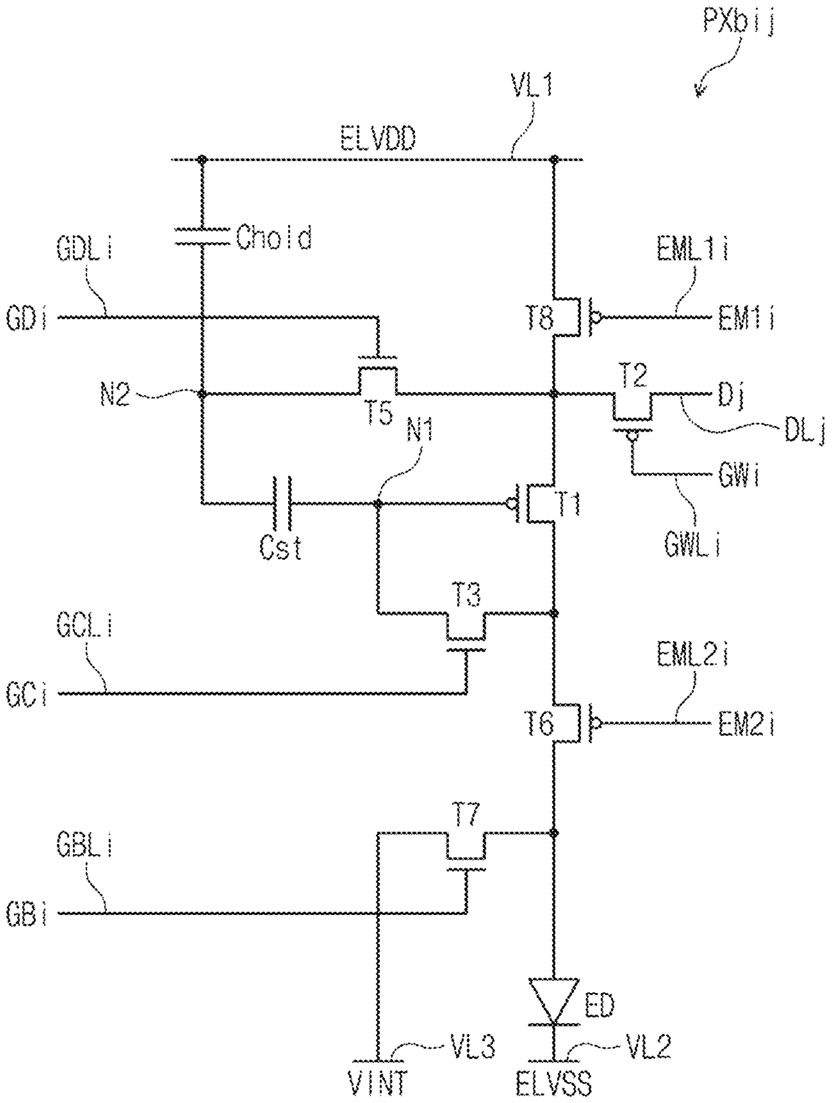
FIG. 16 is a circuit diagram of a pixel according to an embodiment of the present disclosure.

FIG. 16 is a circuit diagram of a pixel PXbij according to an embodiment of the present disclosure.

Referring to FIG. 16, the pixel PXbij includes first, second, third, fifth, sixth, seventh and eighth transistors T1, T2, T3, T5, T6, T7, and T8, a first capacitor Cst, a second capacitor Chold, and a light-emitting element ED. In an embodiment, each of the pixels PX illustrated in FIG. 15 may include the same circuit configuration as the pixel PXbij illustrated in FIG. 16.

The first, second, third, fifth, sixth, seventh, and eighth transistors T1, T2, T3, T5, T6, T7, and T8, the first and second capacitors Cst and Chold, and the light-emitting element ED illustrated in FIG. 16 are similar to the first, second, third, fifth, sixth, seventh, and eighth transistors T1, T2, T3, T5, T6, T7, and T8, the first and second capacitors Cst and Chold, and the light-emitting element ED illustrated in FIG. 2 and thus are marked by the same reference signs. Also, additional description will be omitted to avoid redundancy.

The second transistor T2 includes a first electrode connected with the data line DLj, a second electrode connected with a first electrode of the first transistor T1, and a gate electrode connected with the scan line GWLi. The second transistor T2 may be turned on depending on the scan signal GWi transferred through the scan line GWLi and may transfer the data signal Dj from the data line DLj to the first electrode of the first transistor T1.

The fifth transistor T5 includes a first electrode connected with the first electrode of the first transistor T1, a second electrode connected with a second node N2, and a gate electrode connected with the scan line GDLi (in other words, "fifth scan line"). The fifth transistor T5 may be turned on depending on the scan signal GDi (in other words, "fifth scan signal") transferred through the scan line GDLi to electrically connect the first electrode of the first transistor T1 and the second node N2.

In an embodiment, the first, second, sixth, seventh, and eighth transistors T1, T2, T6, T7, and T8 may be implemented with a P-type transistor having a low-temperature polycrystalline silicon (LTPS) semiconductor layer, and the third, fifth, and seventh transistors T3, T5, and T7 may be implemented with an N-type transistor using an oxide semiconductor as a semiconductor layer. The pixel PXbij illustrated in FIG. 16 is only an example, and the circuit configuration of the pixel PXbij may be changed or modified.

FIGS. 17A to 17I are diagrams for describing an operation of the pixel PXbij. FIG. 18A is a timing diagram for describing an operation of the pixel PXbij during the write period WP. FIG. 18B is a timing diagram for describing an operation of the pixel PXbij during the hold period HP.

Figure 17A:
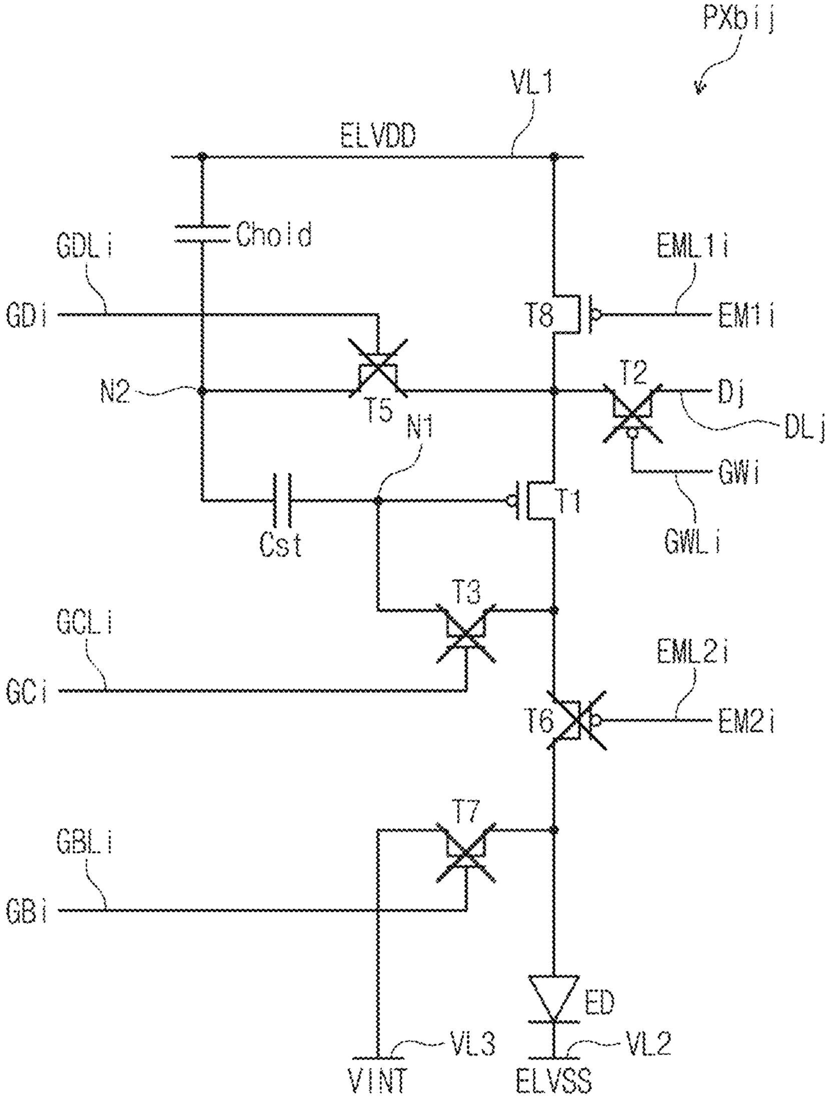
FIGS. 17A to 17I are diagrams for describing an operation of a pixel.
Figure 18A:
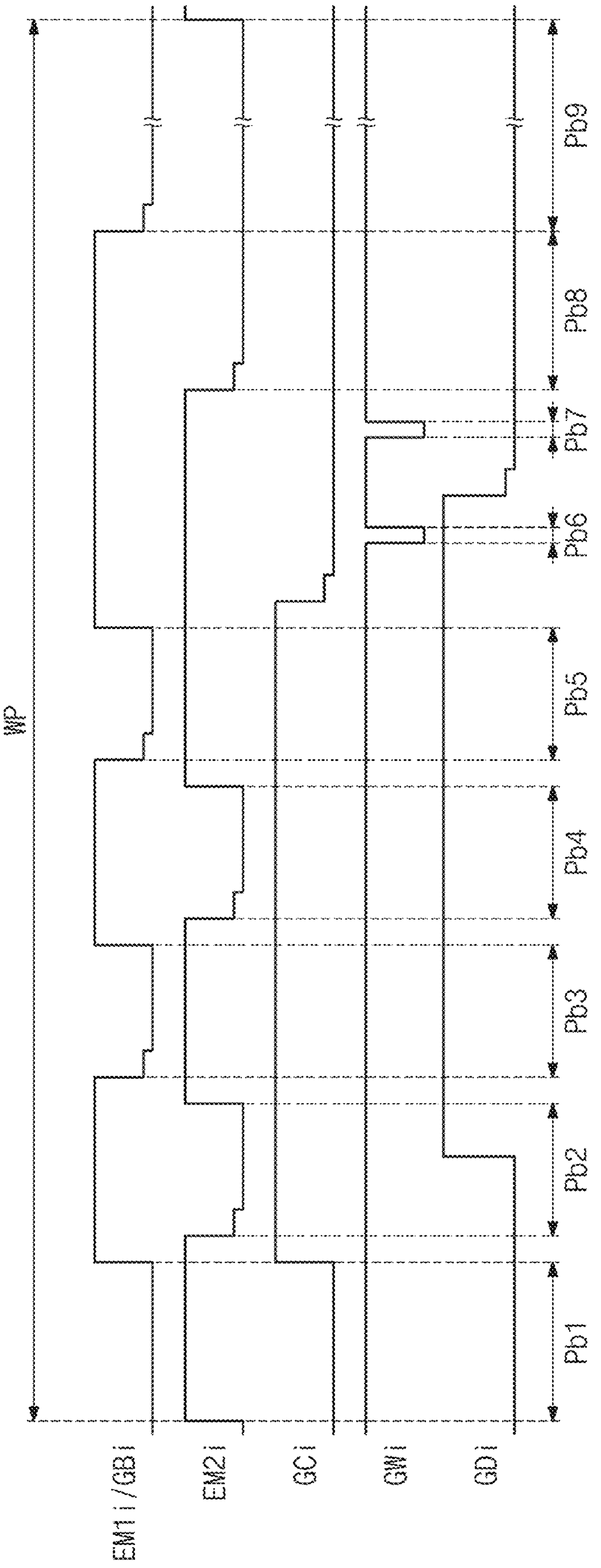
FIG. 18A is a timing diagram for describing an operation of a pixel during a write period.
Figure 18B:
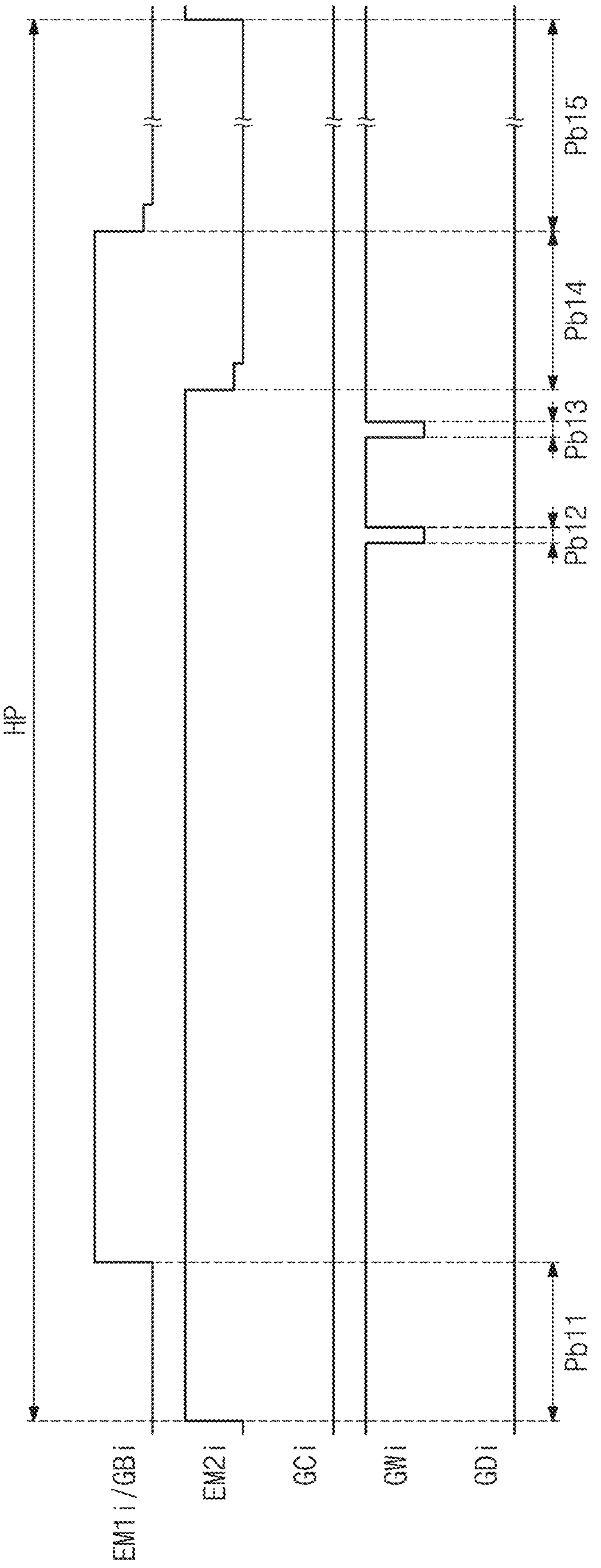
FIG. 18B is a timing diagram for describing an operation of a pixel during a hold period.

Referring to FIGS. 17A and 18A, the emission signal EM1*i* and the scan signal GBi may be the same signal. During a first period Pb1 of the write period WP, the emission signal EM1*i* and the scan signal GBi are at the active level, and the emission signal EM2*i* and the scan signals GCi, GWi, and GDi are at the inactive level. While the emission signal EM2*i* is at the high level being the inactive level, a current is not supplied to the light-emitting element ED. That is, the first period Pb1 may be an emission-off period.

Figure 17B:
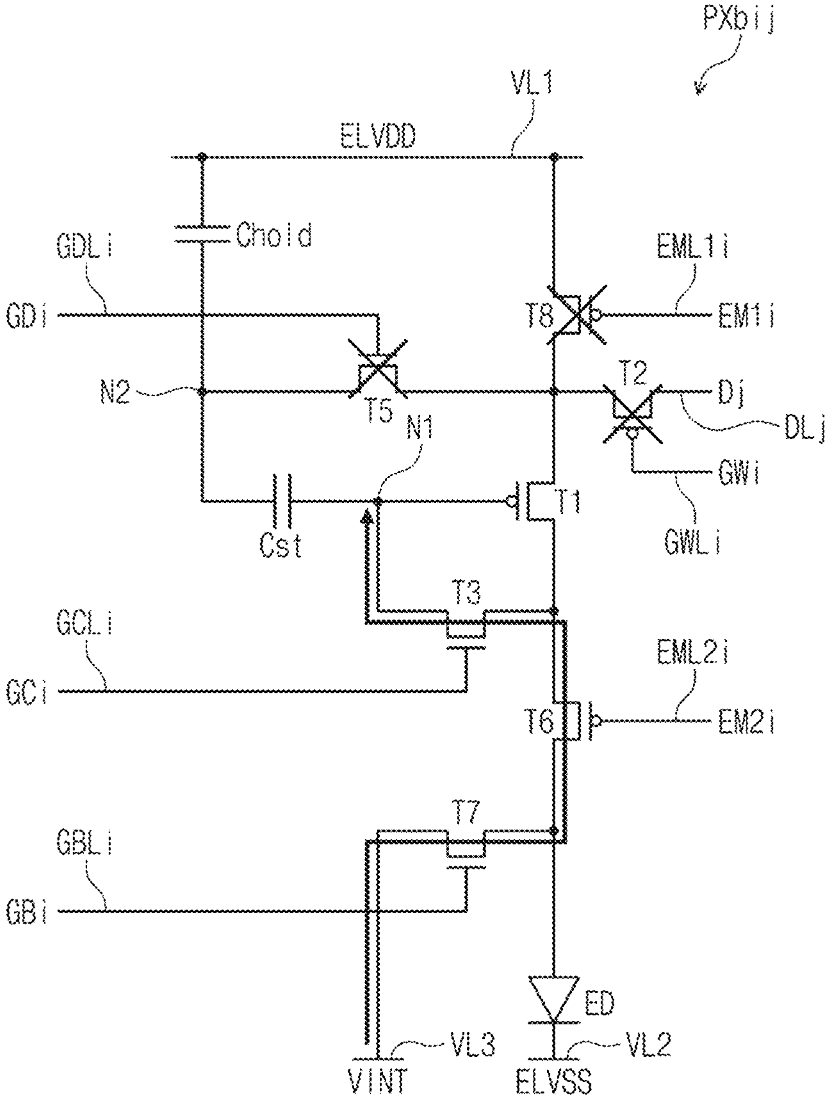

Referring to FIGS. 17B and 18A, during a second period Pb2 of the write period WP, the third, sixth, and seventh transistors T3, T6, and T7 are turned on in response to the scan signals GCi and GBi of the high level and the emission signal EM2*i* of the low level. As such, during the second period Pb2, the initialization voltage VINT may be transferred to the first node N1 through the seventh transistor T7, the sixth transistor T6, and the third transistor T3. The second period Pb2 may refer to a "first initialization period" in which the first node N1, that is, the gate electrode of the first transistor T1 is initialized with the initialization voltage VINT.

Figure 17C:
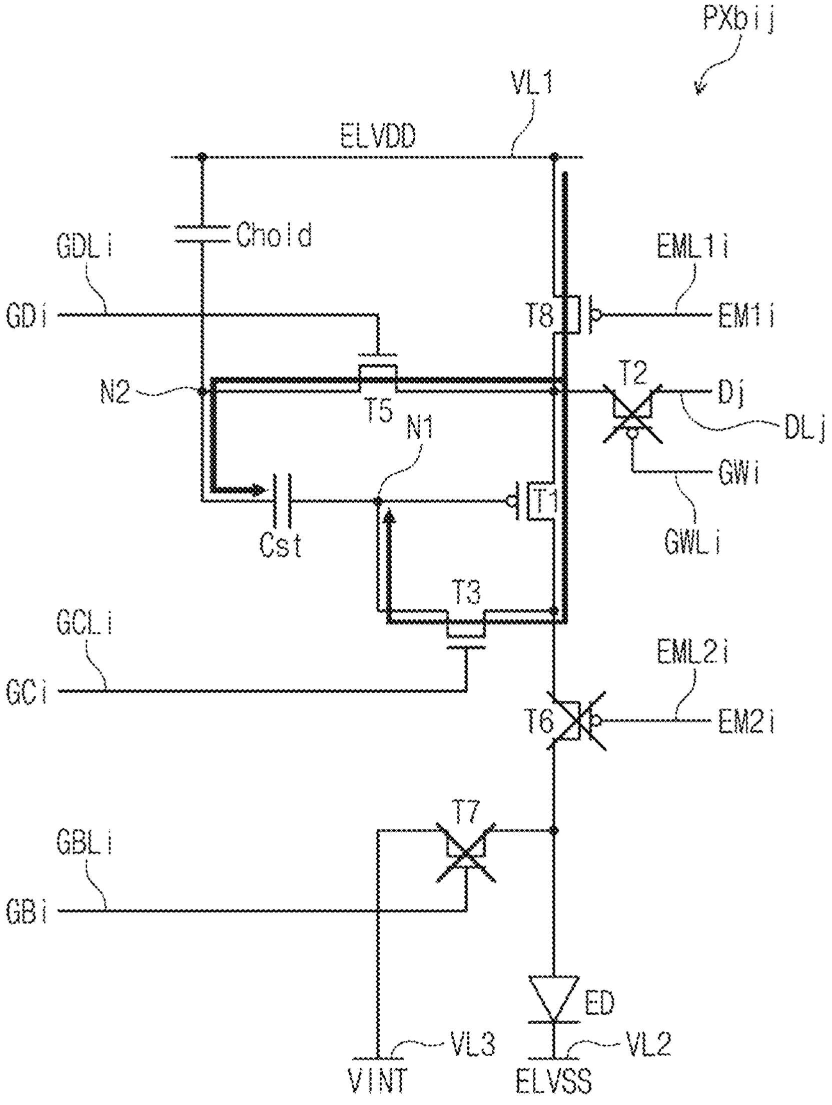

Referring to FIGS. 17C and 18A, during a third period Pb3 of the write period WP, the scan signals GCi and GDi are at the high level, and the emission signal EM1*i* is at the low level; in this case, the third, fifth, and eighth transistors T3, T5, and T8 are turned on. As such, during the third period Pb3, the first driving voltage ELVDD may be transferred to the second node N2 through the eighth transistor T8 and the fifth transistor T5.

Meanwhile, during the third period Pb3, the first driving voltage ELVDD may be transferred to the first node N1, that is, the gate electrode of the first transistor T1 through the eighth transistor T8, the first transistor T1, and the third transistor T3. The gate electrode of the first transistor T1 may be provided with a voltage "ELVDD−Vth" obtained by subtracting the threshold voltage Vth of the first transistor T1 from the first driving voltage ELVDD.

When the voltage of the second node N2 is changed to the first driving voltage ELVDD in the second period Pb2, a difference between the voltage of the second node N2 in the previous frame and the first driving voltage ELVDD provided to the second node N2 may be transferred to the first node N1 by the coupling of the first capacitor Cst.

Figure 17D:
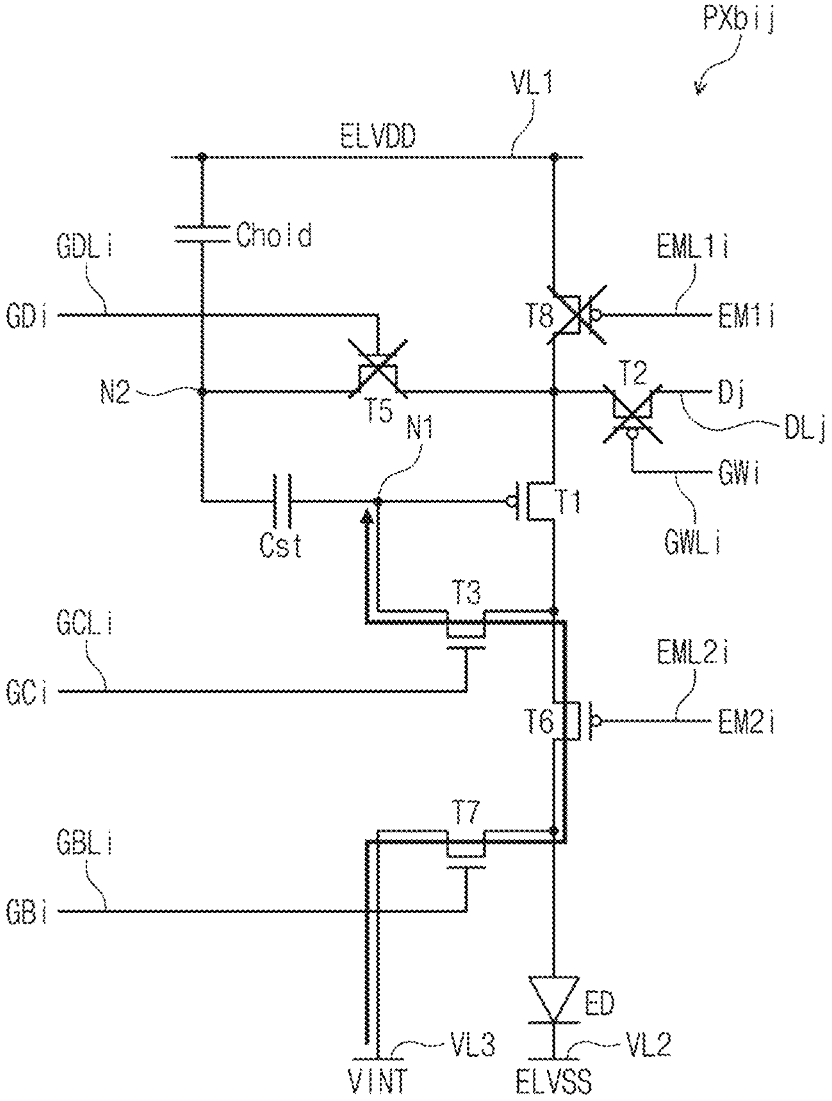

Referring to FIGS. 17D and 18A, during a fourth period Pb4 of the write period WP, the scan signals GCi and GBi are at the high level, and the emission signal EM2*i* is at the low level; in this case, the third, sixth, and seventh transistors T3, T6, and T7 are turned on. As such, during the fourth period Pb4, the initialization voltage VINT may be transferred to the first node N1 through the seventh transistor T7, the sixth transistor T6, and the third transistor T3. The fourth period Pb4 may refer to a "second initialization period" in which the first node N1, that is, the gate electrode of the first transistor T1 is initialized with the initialization voltage VINT.

Figure 17E:
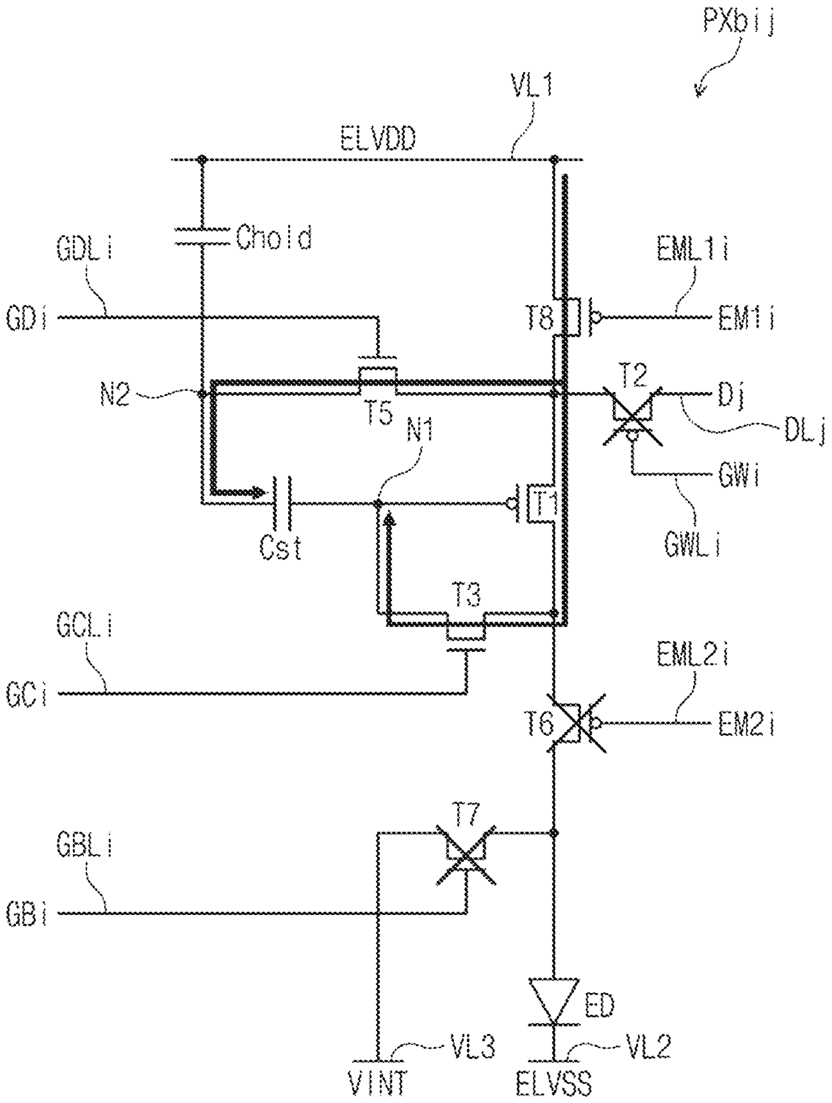

Referring to FIGS. 17E and 18A, during a fifth period Pb5 of the write period WP, the scan signals GCi and GDi are at the high level, and the emission signal EM1*i* is at the low level; in this case, the third, fifth, and eighth transistors T3, T5, and T8 are turned on. As such, during the fifth period Pb5, the first driving voltage ELVDD may be transferred to the second node N2 through the eighth transistor T8 and the fifth transistor T5.

Meanwhile, during the fifth period Pb5, the first driving voltage ELVDD may be transferred to the first node N1, that is, the gate electrode of the first transistor T1 through the eighth transistor T8, the first transistor T1, and the third transistor T3. The voltage of the first node N1 may correspond to a voltage obtained by subtracting the threshold voltage Vth of the first transistor T1 from the first driving voltage ELVDD. That is, in the fifth period Pb5, the voltage of the first node N1 is "ELVDD−Vth".

Because the voltage of the second node N2 in the third period Pb3 is set to the first driving voltage ELVDD, when the first driving voltage ELVDD is again provided to the second node N2 through the eighth transistor T8 and the fifth transistor T5 in the fifth period Pb5, the second node N2 may be maintained at the first driving voltage ELVDD. Because the voltage level of the second node N2 does not change, the voltage of the second node N2 does not affect the first node N1. Accordingly, the voltage of the gate electrode of the first transistor T1 may be "ELVDD−Vth". The fifth period Pb5 may refer to a "second compensation period" for compensating for the threshold voltage Vth of the first transistor T1.

To prevent the voltage of the second node N2 from being affected by the voltage of the data signal Dj in the previous frame, two initialization operations, that is, the second and fourth periods Pb2 and Pb4 and two compensation operations, that is, the third and fifth periods Pb3 and Pb5 are required. In an embodiment, the description is given as the second and fourth periods Pb2 and Pb4 being the initialization period and the third and fifth periods Pb3 and Pb5 being the compensation period are repeated in turn, but the present disclosure is not limited thereto. In an embodiment, the initialization period and the compensation period may be repeated in turn plural times (e.g., three times).

Figure 17F:
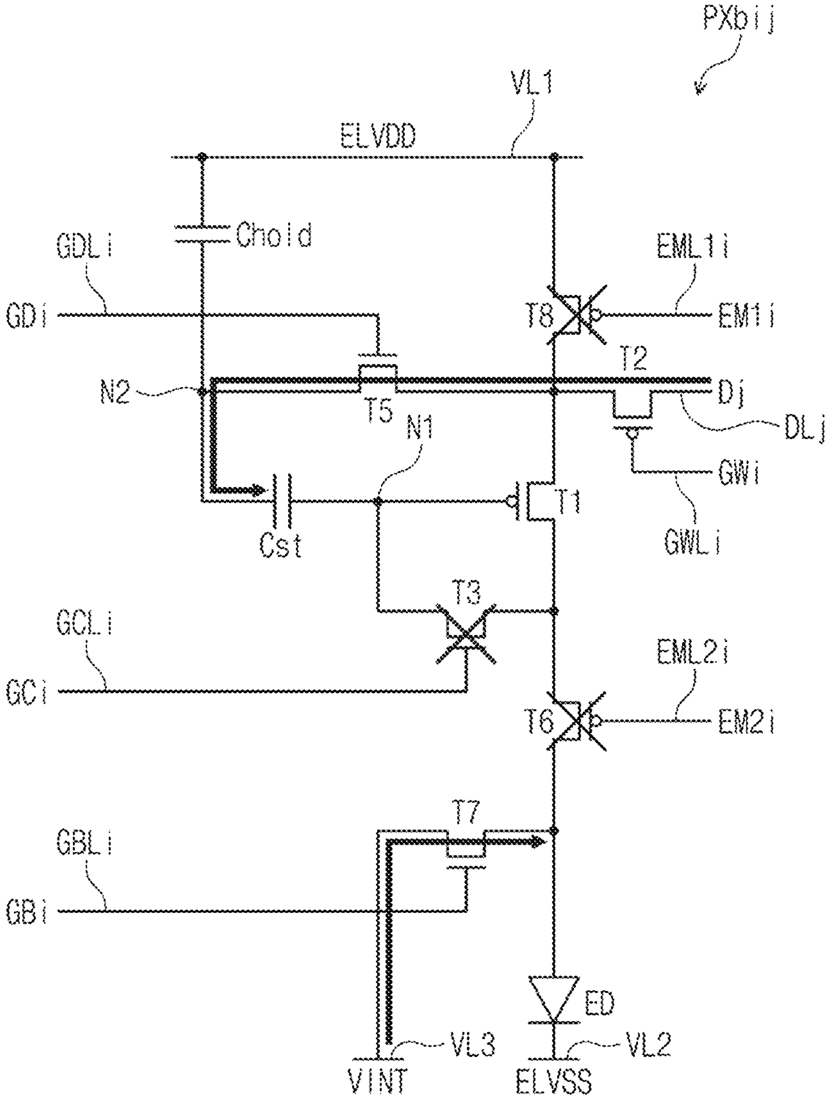

Referring to FIGS. 17F and 18A, during a sixth period Pb6 of the write period WP, the scan signals GBi and GDi are at the high level, and the scan signal GWi is at the low level. The data signal Dj from the data line DLj may be transferred to the second node N2 through the second transistor T2 and the fifth transistor T5 thus turned on.

The voltage of the second node N2 is changed from the first driving voltage ELVDD to the voltage Vdata of the data signal Dj. The voltage variation "Vdata−ELVDD" of the second node N2 may be transferred to the first node N1 by the coupling of the first capacitor Cst.

Because the voltage of the first node N1 in the fifth period Pb5 is "ELVDD−Vth", a voltage of the first node N1, that is, the gate electrode of the first transistor T1 in the sixth period Pb6 is "ELVDD−Vth+(Vdata−ELVDD)". The sixth period Pb6 may refer to a "data write period" in which a voltage corresponding to the data signal Dj is stored in the first capacitor Cst.

Figure 17G:
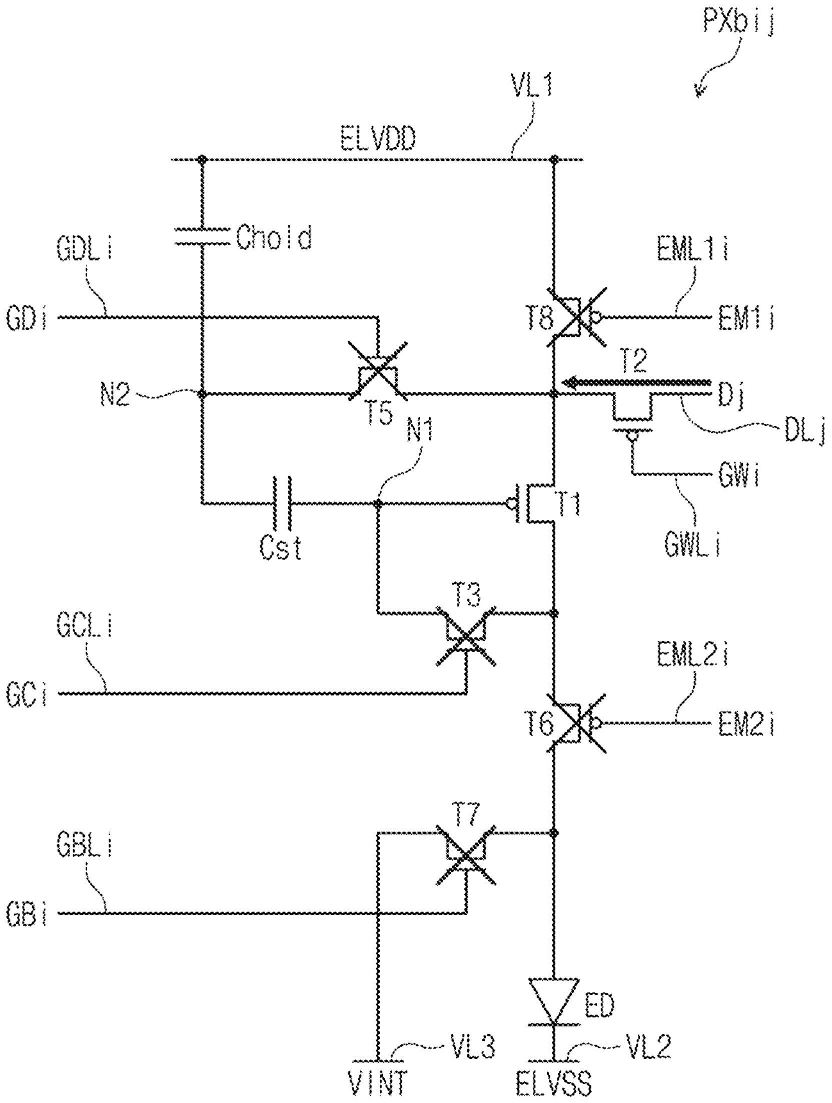

Referring to FIGS. 17G and 18A, during a seventh period Pb7 of the write period WP, the scan signal GWi is at the low level. When the second transistor T2 is turned on by the scan signal GWi being at the low level, the data signal Dj from the data line DLj may be provided to the first electrode of the first transistor T1. In this case, the data signal Dj provided through the data line DLj may correspond to a bias voltage for initializing the first electrode of the first transistor T1. The seventh period Pb7 may refer to a "bias period" in which a bias voltage is provided to the first electrode of the first transistor T1. An example in which the seventh period Pb7 is included once in the write period WP is illustrated in FIG. 18A, but the present disclosure is not limited thereto. The seventh period Pb7 being the bias period in which a bias voltage is provided to the first electrode of the first transistor T1 may be included two times or more in the write period WP.

Figure 17H:
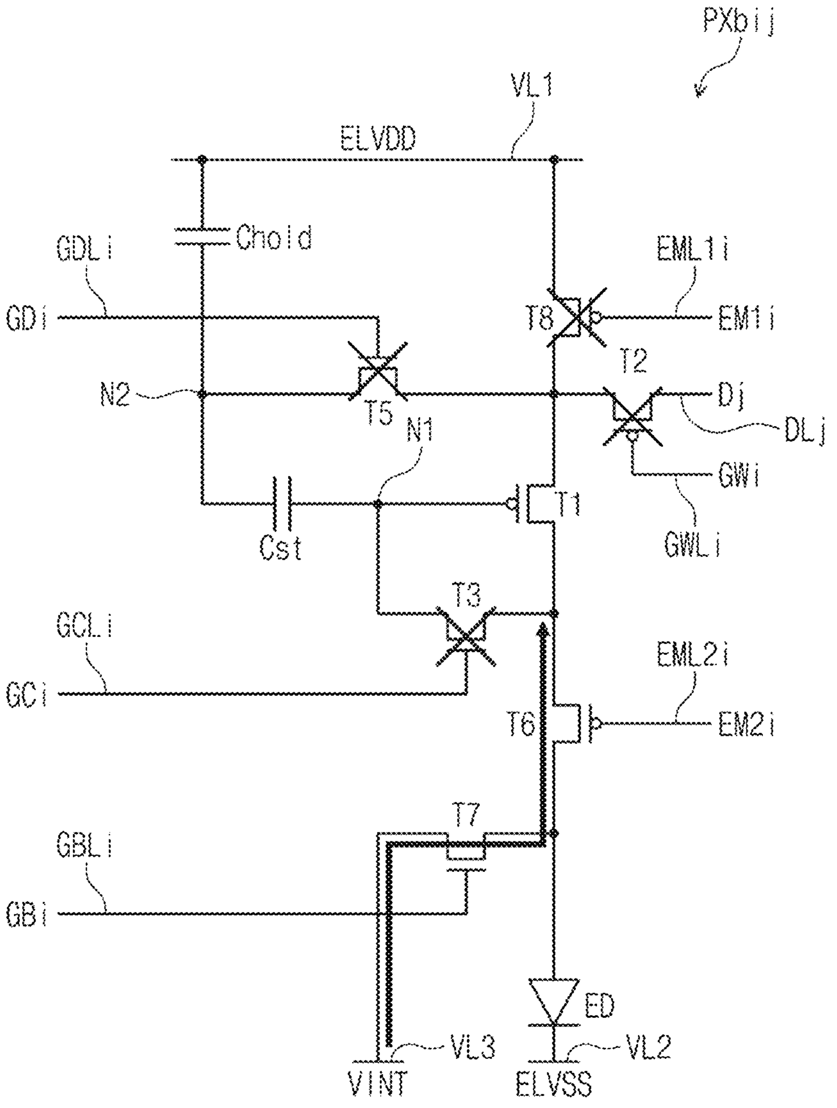

Referring to FIGS. 17H and 18A, during an eighth period Pb8 of the write period WP, the emission signal EM2*i* is at the low level, and the scan signal GBi is at the high level. In this case, the second electrode of the first transistor T1 may be initialized with the initialization voltage VINT through the seventh transistor T7 and the sixth transistor T6. The eighth period Pb8 may refer to a "drain initialization period" in which the second electrode of the first transistor T1 is initialized with the initialization voltage VINT.

Figure 17I:
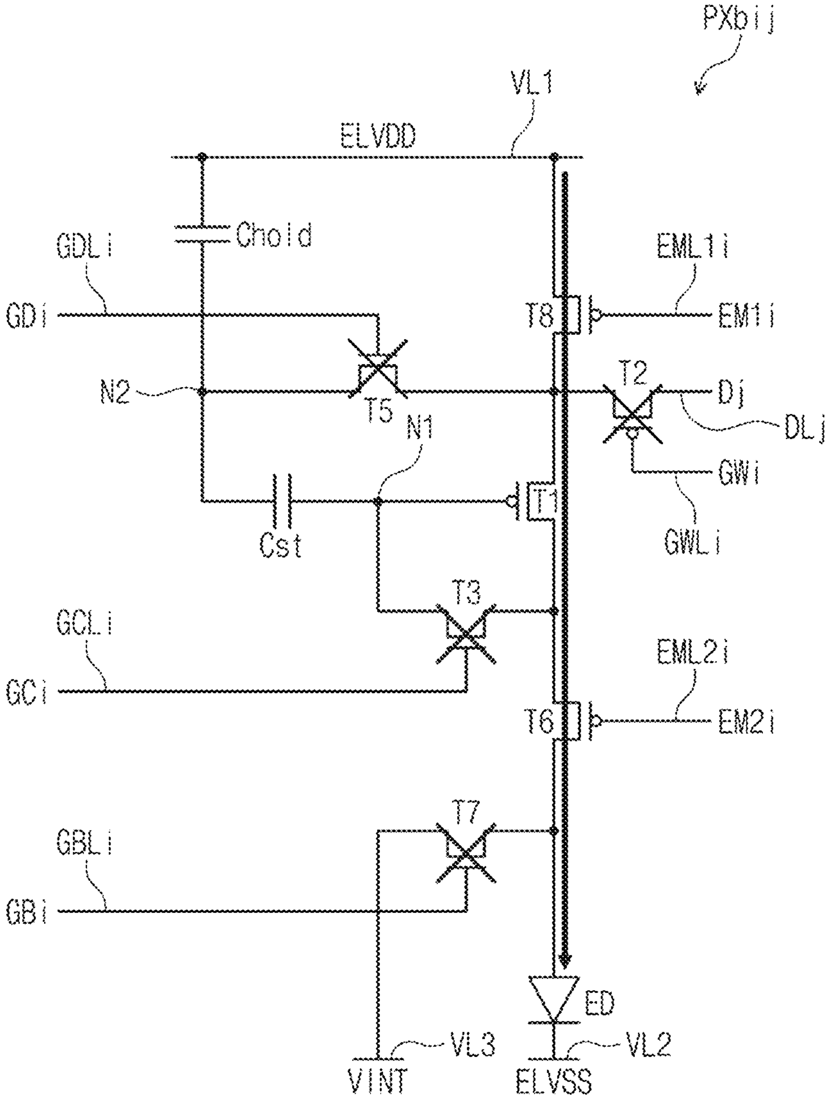

Referring to FIGS. 17I and 18A, during a ninth period Pb9 of the write period WP, the emission signals EM1*i* and EM2*i* are at the low level. When the sixth transistor T6 and the eighth transistor T8 are turned on in response to the emission signals EM1*i* and EM2*i* being at the low level, a current path may be formed from the first driving voltage line VL1 to the light-emitting element ED through the eighth transistor T8, the first transistor T1, and the sixth transistor T6.

In this case, the amount of current transferred to the light-emitting element ED may be determined depending on a voltage level of the first node N1, that is, the gate electrode of the first transistor T1. As described above, in the sixth period P6, the voltage of the gate electrode of the first transistor T1 is "ELVDD−Vth+(Vdata−ELVDD)".

A current flowing through the first transistor T1 is proportional to "(Vgs−Vth) 2" that is the square of a difference between the threshold voltage Vth of the first transistor T1 and the voltage Vgs being a voltage difference between the first electrode and the gate electrode of the first transistor T1.

Because the voltage of the first electrode of the first transistor T1 is the first driving voltage ELVDD and the voltage of the gate electrode of the first transistor T1 is "ELVDD−Vth+(Vdata−ELVDD)", the voltage difference Vgs between the first electrode and the gate electrode of the first transistor T1 is "ELVDD−(ELVDD—Vth+(Vdata−ELVDD))".

Accordingly, the current flowing through the first transistor T1 is proportional to "$((ELVDD-(ELVDD-Vth+(Vdata-ELVDD)))-Vth)^2$". That is, the current flowing through the first transistor T1 is proportional to "(ELVDD—Vdata)".

Accordingly, the influence of the threshold voltage Vth of the first transistor T1 may be removed, and a current proportional to the voltage Vdata of the data signal Dj may be provided to the light-emitting element ED. The ninth period Pb9 may refer to an "emission period" in which the light-emitting element ED emits a light.

Referring to FIGS. 17A and 18B, during an eleventh period Pb11 of the hold period HP, the emission signal EM1*i* and the scan signal GBi are at the active level, and the emission signal EM2*i* and the scan signals GCi, GWi, and GDi are at the inactive level. While the emission signal EM2*i* is at the high level being the inactive level, a current is not supplied to the light-emitting element ED. That is, the eleventh period Pb11 may refer to an "emission-off period".

Referring to FIGS. 17G and 18B, in each of a twelfth period Pb12 and a thirteenth period Pb13 of the hold period HP, the scan signal GBi and the emission signals EM1*i* and EM2*i* are at the high level, and the scan signals GCi, GDi, and GWi are at the low level. The data signal Dj from the data line DLj may be transferred to the first electrode of the first transistor T1 through the second transistor T2 being in the turn-on state. In this case, the data signal Dj provided through the data line DLj may correspond to a bias voltage for initializing the first electrode of the first transistor T1. Each of the twelfth period Pb12 and the thirteenth period Pb13 of the hold period HP may refer to a "bias period" in which the bias voltage is provided to the first electrode of the first transistor T1.

An example in which the hold period HP includes the twelfth period Pb12 and the thirteenth period Pb13 being the bias period is illustrated in FIG. 18B, but the present disclosure is not limited thereto. For example, the hold period HP may include three or more bias periods.

Referring to FIGS. 17H and 18B, during a fourteenth period Pb14 of the hold period HP, the emission signal EM2*i* is at the low level, and the scan signal GBi is at the high level. In this case, the second electrode of the first transistor T1 may be initialized with the initialization voltage VINT through the seventh transistor T7 and the sixth transistor T6. The eighth period Pb8 may refer to a "drain initialization period" in which the second electrode of the first transistor T1 is initialized with the initialization voltage VINT.

Referring to FIGS. 17I and 18B, during a fifteenth period Pb15 of the hold period HP, the emission signals EM1*i* and EM2*i* are at the low level. When the sixth transistor T6 and the eighth transistor T8 are turned on in response to the emission signals EM1*i* and EM2*i* being at the low level, a current path may be formed from the first driving voltage line VL1 to the light-emitting element ED through the eighth transistor T8, the first transistor T1, and the sixth transistor T6.

In this case, the amount of current transferred to the light-emitting element ED may be determined depending on a voltage level of the first node N1, that is, the gate electrode of the first transistor T1. The fifteenth period Pb15 may refer to an "emission period" in which the light-emitting element ED emits a light.

Referring to FIGS. 17G and 18A, during the sixth period Pb6 of the write period WP, as the data signal Dj is provided to the first electrode of the first transistor T1, a voltage level of the second electrode of the first transistor T1 may rise as much as a voltage corresponding to the data signal Dj.

Referring to FIG. 18B, the data signal Dj are not provided in the hold period HP. That is, the voltage of the second electrode of the first transistor T1 in the write period WP may be different from the voltage of the second electrode of the first transistor T1 in the hold period HP. In this case, when a current is provided to the light-emitting element ED, the brightness of the light-emitting element ED in the ninth period Pb9 being the emission period may be different from the brightness of the light-emitting element ED in the fifteenth period Pb15 being the emission period.

A brightness difference of the light-emitting element ED that is caused by a difference between the voltage of the second electrode of the first transistor T1 in the eighth period Pb8 of the write period WP (refer to FIG. 18A) and the voltage of the second electrode of the first transistor T1 in the fourteenth period Pb14 of the hold period HP (refer to FIG. 18B) may be minimized by providing the initialization voltage VINT to the second electrode of the first transistor T1 through the seventh transistor T7 and the sixth transistor T6 in the eighth period Pb8 and the fourteenth period Pb14.

Figure 19:
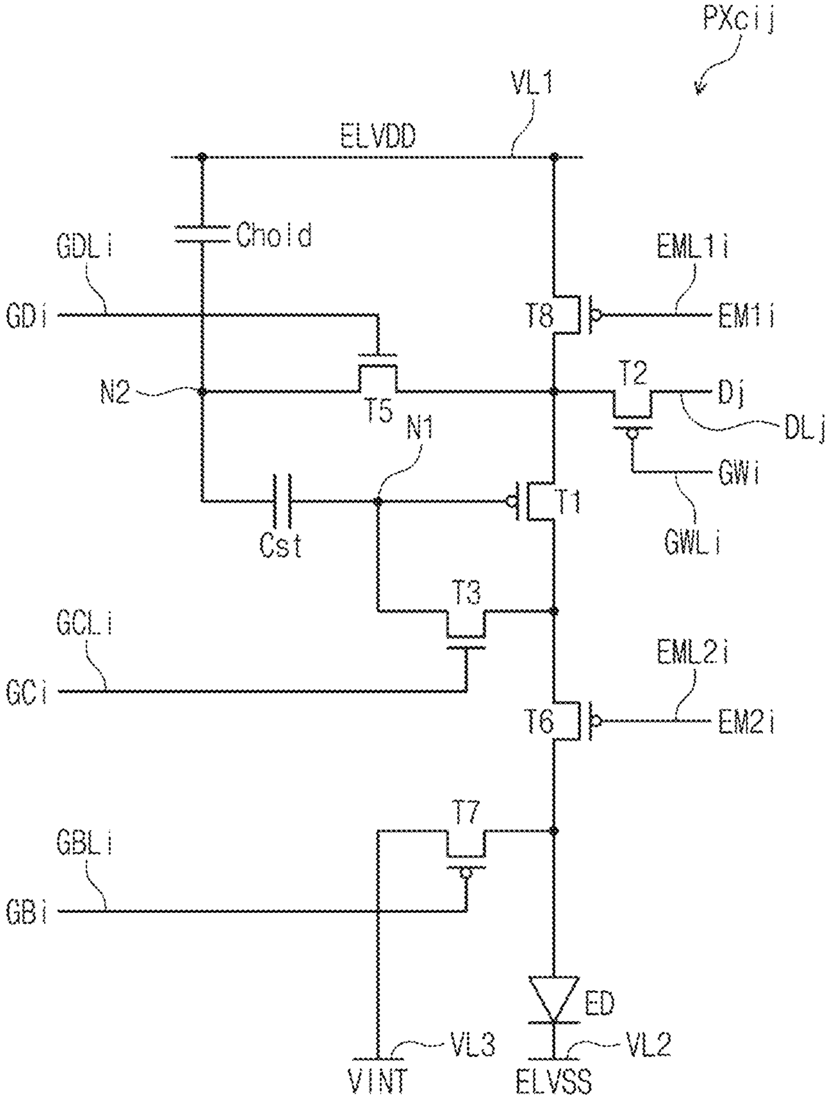
FIG. 19 is a circuit diagram of a pixel according to an embodiment of the present disclosure.

FIG. 19 is a circuit diagram of a pixel PXcij according to an embodiment of the present disclosure.

Referring to FIG. 19, the pixel PXcij includes first, second, third, fifth, sixth, seventh and eighth transistors T1, T2, T3, T5, T6, T7, and T8, a first capacitor Cst, a second capacitor Chold, and a light-emitting element ED.

The first, second, third, fifth, sixth, seventh, and eighth transistors T1, T2, T3, T5, T6, T7, and T8, the first and second capacitors Cst and Chold, and the light-emitting element ED of the pixel PXcij illustrated in FIG. 19 are similar to the first, second, third, fifth, sixth, seventh, and eighth transistors T1, T2, T3, T5, T6, T7, and T8, the first and second capacitors Cst and Chold, and the light-emitting element ED of the pixel PXbij illustrated in FIG. 16 and thus are marked by the same reference signs. Also, additional description will be omitted to avoid redundancy.

The seventh transistor T7 of the pixel PXbij illustrated in FIG. 16 is an N-type transistor using an oxide semiconductor as a semiconductor layer, but the seventh transistor T7 of the pixel PXcij illustrated in FIG. 19 is a P-type transistor an LTPS semiconductor layer.

Figure 20A:
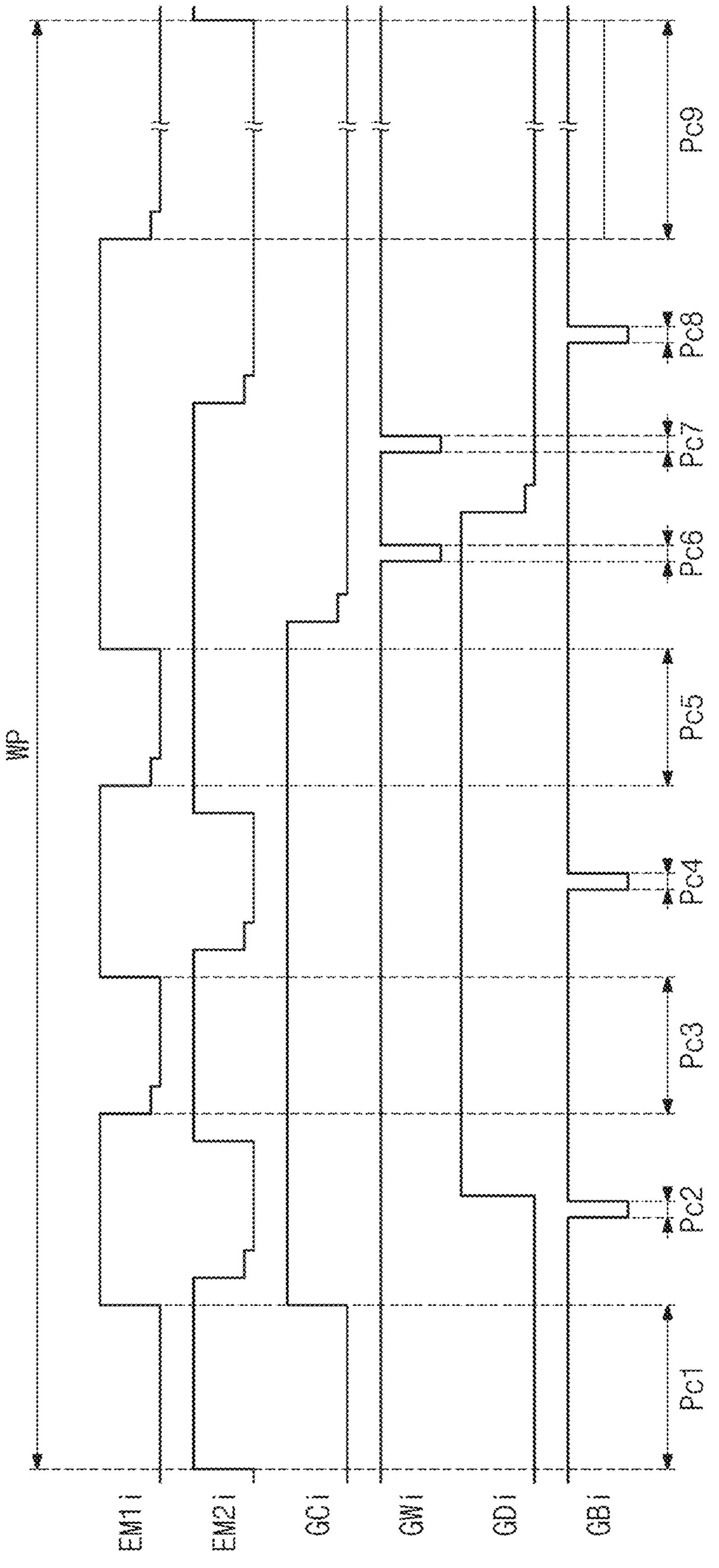
FIG. 20A is a timing diagram for describing an operation of a pixel during a write period.
Figure 20B:
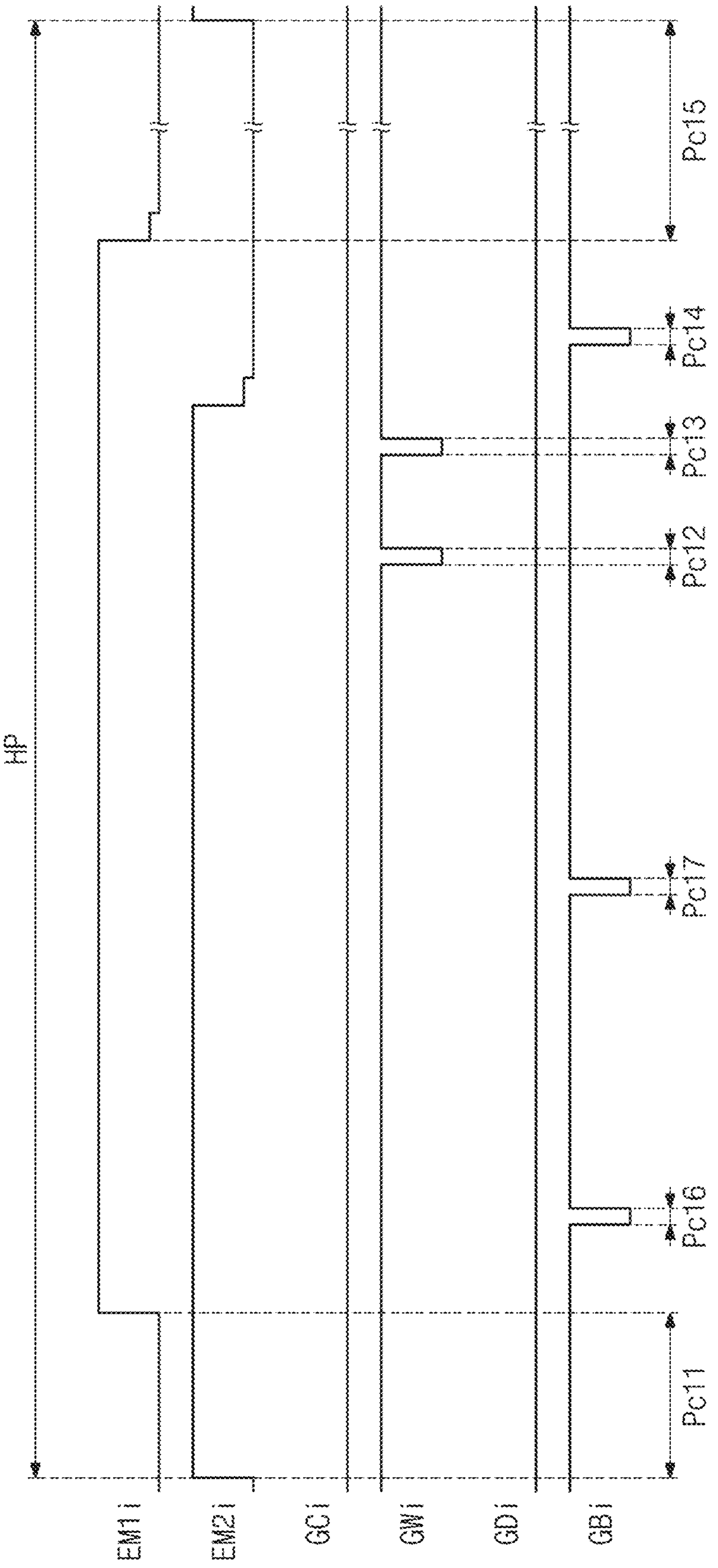
FIG. 20B is a timing diagram for describing an operation of a pixel during a hold period.

FIG. 20A is a timing diagram for describing an operation of the pixel PXcij during the write period WP. FIG. 20B is a timing diagram for describing an operation of the pixel PXcij during the hold period HP.

The first to ninth periods PM to Pb9 of the write period WP illustrated in FIG. 18A are substantially the same as first to ninth periods Pc1 to Pc9 of the write period WP illustrated in FIG. 20A, and thus, additional description will be omitted to avoid redundancy.

Referring to FIGS. 19 and 20A, in each of the second and fourth periods Pc2 and Pc4 of the write period WP, the seventh transistor T7 is turned on in response to the scan signal GBi of the low level, the sixth transistor T6 is turned on in response to the emission signal EM2*i* of the low level, and the third transistor T3 is turned on in response to the scan signal GCi of the high level. In each of the second and fourth periods Pc2 and Pc4, the initialization voltage VINT may be transferred to the first node N1 through the seventh transistor T7, the sixth transistor T6, and the third transistor T3.

During the eighth period Pc8, when the seventh transistor T7 is turned on in response to the scan signal GBi of the low level and the sixth transistor T6 is turned on in response to the emission signal EM2*i* of the low level, the second electrode of the first transistor T1 may be initialized with the initialization voltage VINT through the seventh transistor T7 and the sixth transistor T6.

Eleventh to fifteenth periods Pc11 to Pc15 of the hold period HP illustrated in FIG. 20B are substantially the same as the eleventh to fifteenth periods Pb11 to Pb15 of the hold period HP illustrated in FIG. 18B, and thus, additional description will be omitted to avoid redundancy.

After the eleventh period Pc11 ends, while the emission signals EM1*i* and EM2*i* and the scan signal GWi are maintained at the high level and the scan signals GCi and GDi are maintained at the low level, the scan signal GBi transitions to the low level in each of the sixteenth period Pc16 and the seventeenth period Pc17. The seventh transistor T7 may be turned on in response to the scan signal GBi of the low level. In each of the sixteenth period Pc16 and the seventeenth period Pc17, the initialization voltage VINT may be provided to the anode of the light-emitting element ED through the seventh transistor T7.

During the hold period HP illustrated in FIG. 20B, the scan signal GBi has the same signal pattern as the scan signal GBi in the write period WP illustrated in FIG. 20A. However, the present disclosure is not limited thereto. In an embodiment, the scan signal GBi may be maintained at the high level without the transition to the low level during a time period between the eleventh period Pc11 and the twelfth period Pc12 of the hold period HP.

Figure 21:
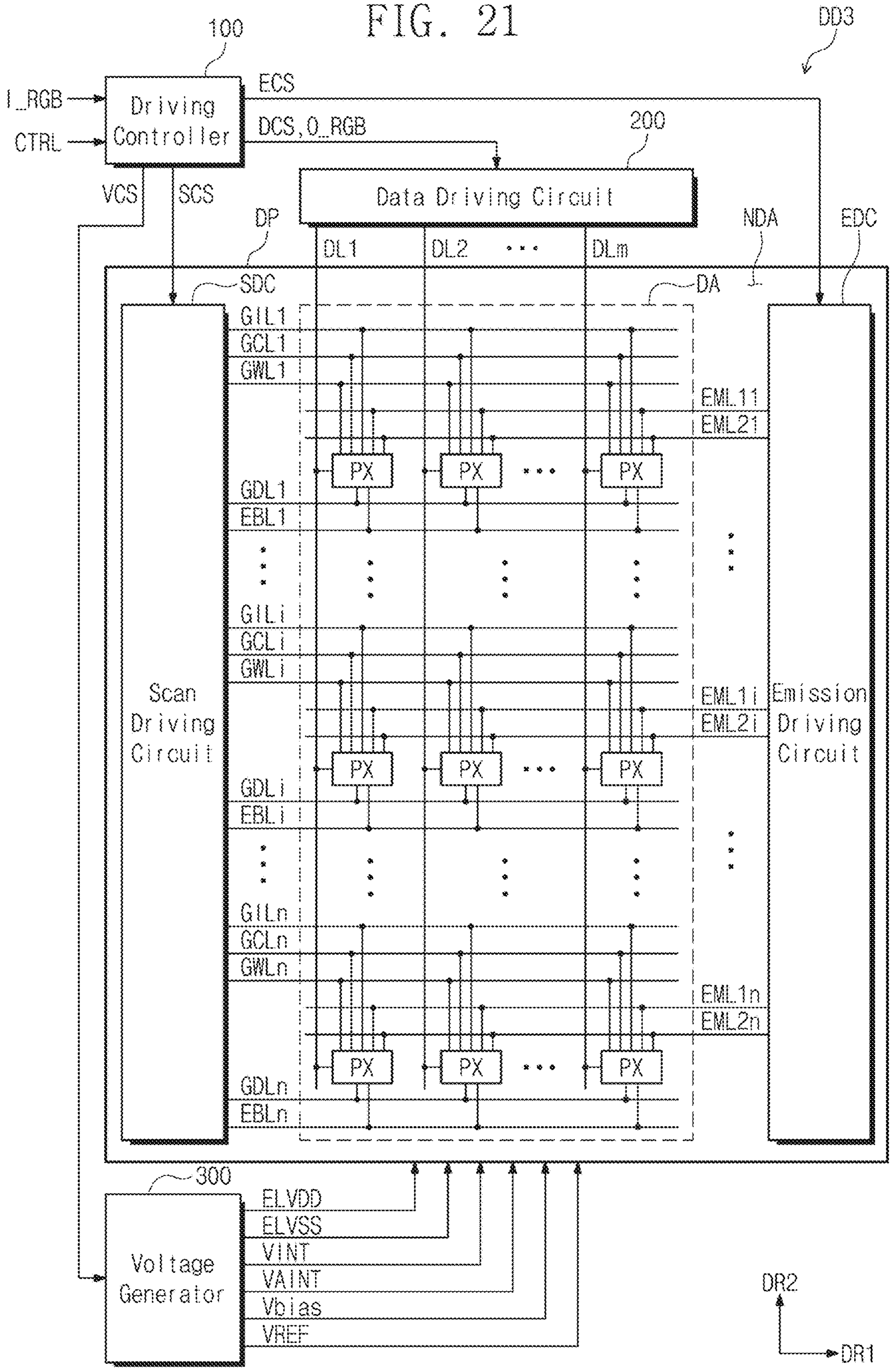
FIG. 21 is a block diagram of a display device according to an embodiment of the present disclosure.

FIG. 21 is a block diagram of a display device DD3 according to an embodiment of the present disclosure.

The display device DD3 illustrated in FIG. 21 includes components similar to those of the display device DD2 illustrated in FIG. 15. Accordingly, similar reference signs are used for similar components, and thus, additional description will be omitted to avoid redundancy.

The display panel DP includes the scan lines GIL1 to GILn, GCL1 to GCLn, GWL1 to GWLn, GDL1 to GDLn, and EBL1 to EBLn, and the emission lines EML11 to EML1*n* and EML21 to EML2*n*, the data lines DL1 to DLm, and the pixels PX.

The scan driving circuit SDC may output scan signals to the scan lines GIL1 to GILn, GCL1 to GCLn, GWL1 to GWLn, GDL1 to GDLn, and EBL1 to EBLn in response to the scan control signal SCS.

The voltage generator 300 generates voltages for an operation of the display panel DP. In an embodiment, the voltage generator 300 generates the first driving voltage ELVDD, the second driving voltage ELVSS, a first initialization voltage VINT, a second initialization voltage VAINT, the bias voltage Vbias, and a reference voltage VREF. The voltages generated by the voltage generator 300 are not limited to the example illustrated in FIG. 21. The number of voltages, which are generated by the voltage generator 300 depending on a circuit configuration of a pixel included in the display panel DP and a need, and a voltage level of each of the voltages may be variously changed or modified.

Figure 22:
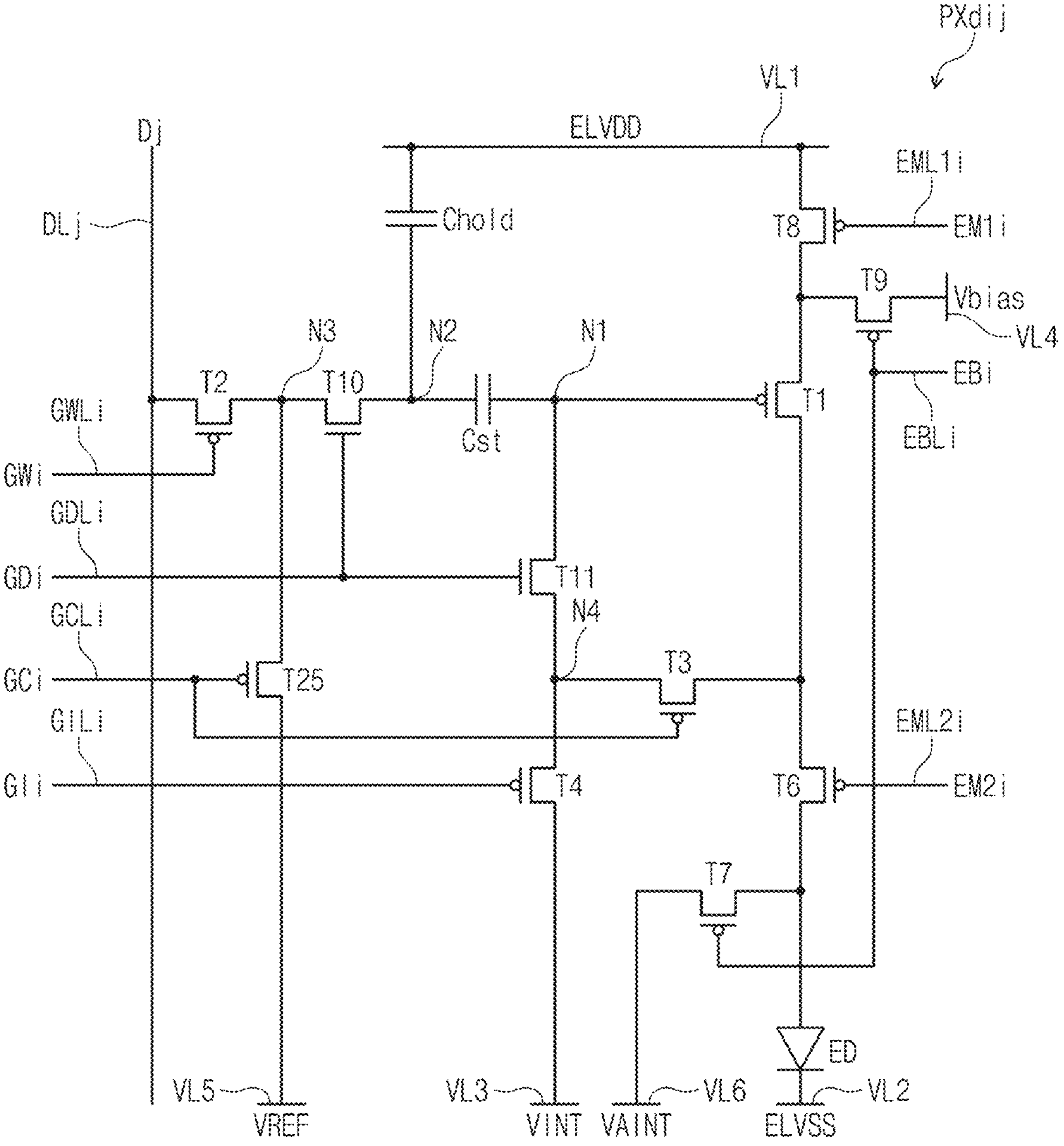
FIG. 22 is a circuit diagram of a pixel according to an embodiment of the present disclosure.

FIG. 22 is a circuit diagram of a pixel PXdij according to an embodiment of the present disclosure.

Referring to FIG. 22, the pixel PXdij includes first, second, third, fourth, sixth, seventh, eighth, ninth, tenth, eleventh, and twenty-fifth transistors T1, T2, T3, T4, T6, T7, T8, T9, T10, T11, and T25, a first capacitor Cst, a second capacitor Chold, and a light-emitting element ED. In an embodiment, each of the pixels PX illustrated in FIG. 21 may include the same circuit configuration as the pixel PXdij illustrated in FIG. 22.

Also, the pixel PXdij illustrated in FIG. 22 includes components similar to those of the pixel PXbij illustrated in FIG. 16. The same reference signs are used for components similar in characteristic to components of the pixel PXbij of FIG. 16 from among the components of the pixel PXdij of FIG. 22, and thus, additional description will be omitted to avoid redundancy.

The second transistor T2 includes a first electrode connected with the data line DLj, a second electrode connected with a third node N3, and a gate electrode connected with the scan line GWLi.

The third transistor T3 is connected between a second electrode of the first transistor T1 and a fourth node N4 and includes a gate electrode connected with the scan line GCLi.

The fourth transistor T4 is connected between the fourth node N4 and the third driving voltage line VL3 and includes a gate electrode connected with the scan line GILi (in other words, "sixth scan line"). The third driving voltage line VL3 may refer to a "first initialization voltage line" for transferring the first initialization voltage VINT.

The seventh transistor T7 is connected between the anode of the light-emitting element ED and a sixth driving voltage line VL6 and include a gate electrode connected with the scan line EBLi. The sixth driving voltage line VL6 may transfer the second initialization voltage VAINT. The sixth driving voltage line VL6 may refer to a "second initialization voltage line".

The ninth transistor T9 is connected between a first electrode of the first transistor T1 and the fourth driving voltage line VL4 and includes a gate electrode connected with the scan line EBLi.

The tenth transistor T10 is connected between the third node N3 and a second node N2 and includes a gate electrode connected with the scan line GDLi.

The eleventh transistor T11 is connected between a first node N1 and the fourth node N4 and includes a gate electrode connected with the scan line GDLi.

The twenty-fifth transistor T25 is connected between the third node N3 and a fifth driving voltage line VL5 and includes a gate electrode connected with the scan line GCLi. The fifth driving voltage line VL5 may transfer the reference voltage VREF. The fifth driving voltage line VL5 may refer to a "reference voltage line".

In an embodiment, the first, second, third, fourth, sixth, seventh, eighth, ninth, and twenty-fifth transistors T1, T2, T3, T4, T6, T7, T8, T9, and T25 may be implemented with a P-type transistor having an LTPS semiconductor layer, and the tenth and eleventh transistors T10 and T11 may be implemented with an N-type transistor using an oxide semiconductor as a semiconductor layer.

It may be possible to minimize the leakage of charges, which are stored in the first capacitor Cst by the tenth and eleventh transistors T10 and T11, through the second transistor T2 or through the third and fourth transistors T3 and T4.

Figure 23:
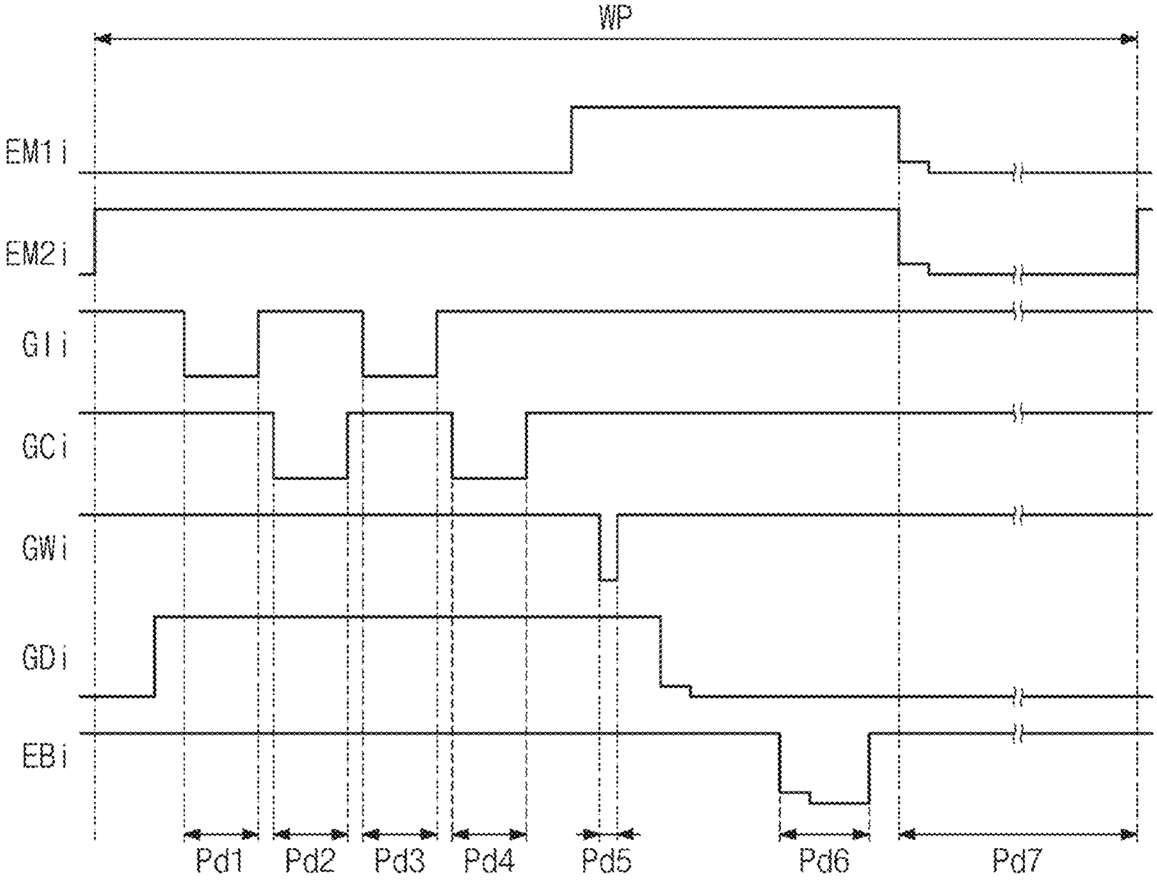
FIG. 23 is a timing diagram for describing an operation of a pixel during a write period.

FIG. 23 is a timing diagram for describing an operation of the pixel PXdij during the write period WP.

Referring to FIGS. 22 and 23, in a first period Pd1 in which the scan signal GIi (in other words, "sixth scan signal") is at the low level and the scan signal GDi is at the high level, the fourth transistor T4 and the eleventh transistor T11 are turned on. The first initialization voltage VINT may be transferred to the first node N1 through the fourth transistor T4 and the eleventh transistor T11.

In a second period Pd2 in which the scan signal GCi and the emission signal EM1*i* are at the low level and the scan signal GDi is at the high level, the third, eighth, tenth, eleventh, and twenty-fifth transistors T3, T8, T10, T11, and T25 are turned on. The reference voltage VREF may be transferred to the third node N3 through the twenty-fifth transistor T25 being in the turn-on state. The first driving voltage ELVDD may be transferred to the first node N1 through the eighth, first, third, and eleventh transistors T8, T1, T3, and T11.

An operation in a third period Pd3 may be identical to the operation in the first period Pd1. The first period Pd1 and the third period Pd3 may refer to an "initialization period" in which the first node N1 is initialized.

An operation in a fourth period Pd4 may be identical to the operation in the second period Pd2. The second period Pd2 and the fourth period Pd4 may refer to a "compensation period" for compensating for the threshold voltage Vth of the first transistor T1.

In a fifth period Pd5 in which the scan signal GWi is at the low level and the scan signal GDi is at the high level, the second transistor T2 and the tenth transistor T10 are turned on. The data signal Dj from the data line DLj may be transferred to the second node N2 through the second transistor T2 and the tenth transistor T10. The fifth period Pd5 may refer to a "data write period" in which the data signal Dj is transferred to the first capacitor Cst.

In a sixth period Pd6 in which the scan signal EBi is at the low level, the seventh transistor T7 and the ninth transistor T9 are turned on. The bias voltage Vbias transferred through the fourth driving voltage line VL4 may be provided to the first electrode of the first transistor T1 through the ninth transistor T9. Also, the second initialization voltage VAINT may be provided to the anode of the light-emitting element ED through the seventh transistor T7. The sixth period Pd6 may refer to an "anode initialization and bias period" in which the anode of the light-emitting element ED and the first electrode of the first transistor T1 are initialized.

In a seventh period Pd7 in which the scan signals GIi, GCi, GWi, and EBi are at the high level being the inactive level and the scan signal GDi is at the low level being the inactive level, the emission signals EM1*i* and EM2*i* are at the low level being the active level. The sixth transistor T6 and the eighth transistor T8 may be turned on by the emission signals EM1*i* and EM2*i* being at the active level.

When the sixth transistor T6 and the eighth transistor T8 are turned on, a current path may be formed from the first driving voltage line VL1 to the light-emitting element ED through the eighth transistor T8, the first transistor T1, and the sixth transistor T6, and thus, the light-emitting element ED may emit a light. In this case, the amount of current transferred to the light-emitting element ED may be determined depending on a voltage level of the first node N1, that is, the gate electrode of the first transistor T1. The seventh period Pd7 may refer to an "emission period" in which the light-emitting element ED emits a light.

Although not illustrated in drawing, during the hold period HP, the scan signals GIi and GCi provided to the pixel PXdij are maintained at the high level being the inactive level, and the scan signal GDi provided to the pixel PXdij is maintained at the low level being the inactive level. Also, like the sixth period Pd6 of the write period WP, only the scan signal EBi may transition to the low level being the active level, and thus, the bias voltage Vbias may be provided to the first electrode of the first transistor T1.

Figure 24:
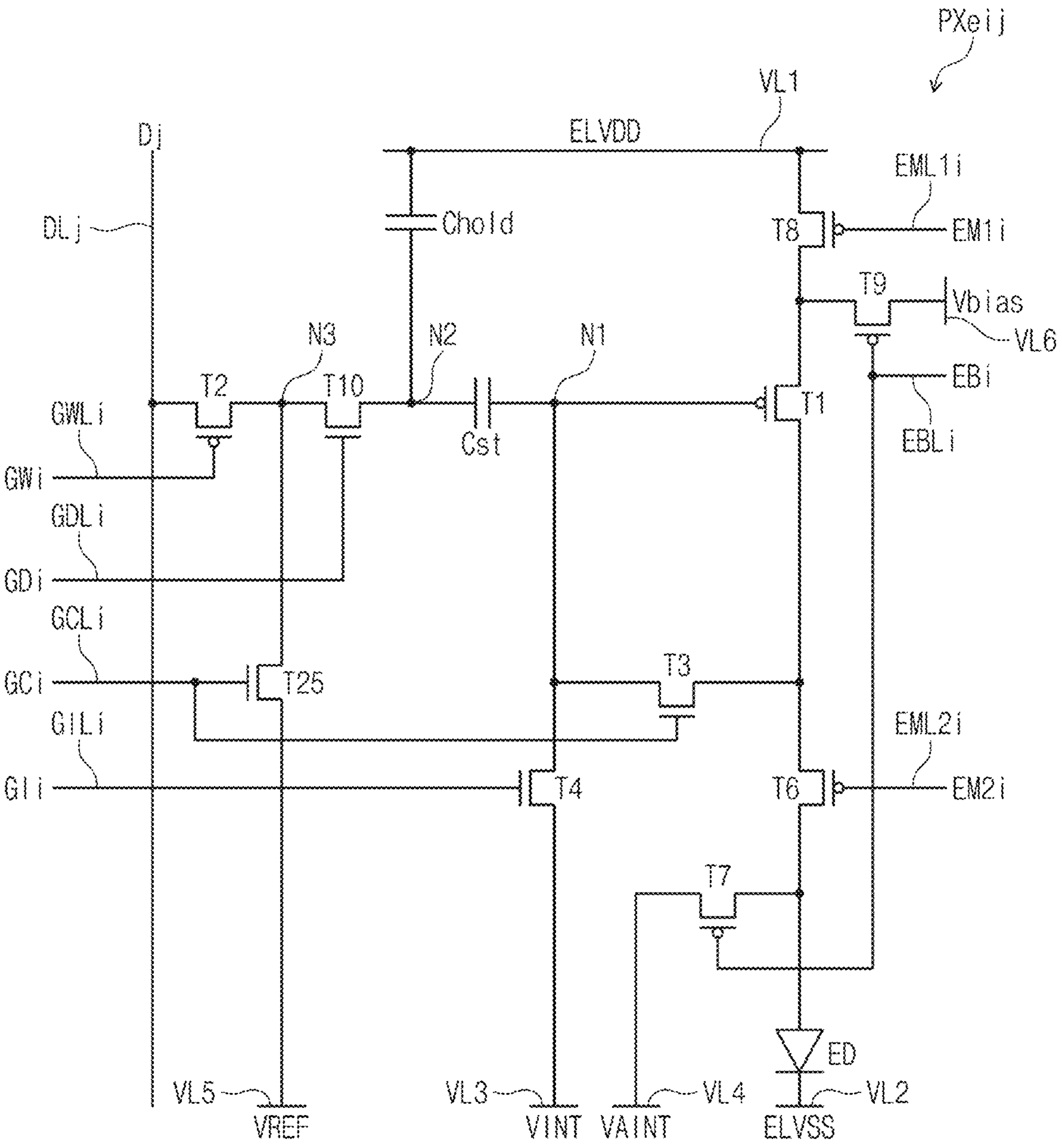
FIG. 24 is a circuit diagram of a pixel according to an embodiment of the present disclosure.

FIG. 24 is a circuit diagram of a pixel PXeij according to an embodiment of the present disclosure.

A configuration of the pixel PXeij illustrated in FIG. 24 is similar to the configuration of the pixel PXdij illustrated in FIG. 22 except that the eleventh transistor T11 is not included. Also, the third, fourth, and twenty-fifth transistors T3, T4, and T25 of the pixel PXdij illustrated in FIG. 22 are implemented with a P-type transistor, but the third, fourth, and twenty-fifth transistors T3, T4, and T25 of the pixel PXeij illustrated in FIG. 24 are implemented with an N-type transistor. Because the third, fourth, tenth, and twenty-fifth transistors T3, T4, T10, and T25 directly connected with the first capacitor Cst are implemented with the N-type transistor, the leakage of charges stored in the first capacitor Cst may be minimized.

Figure 25:
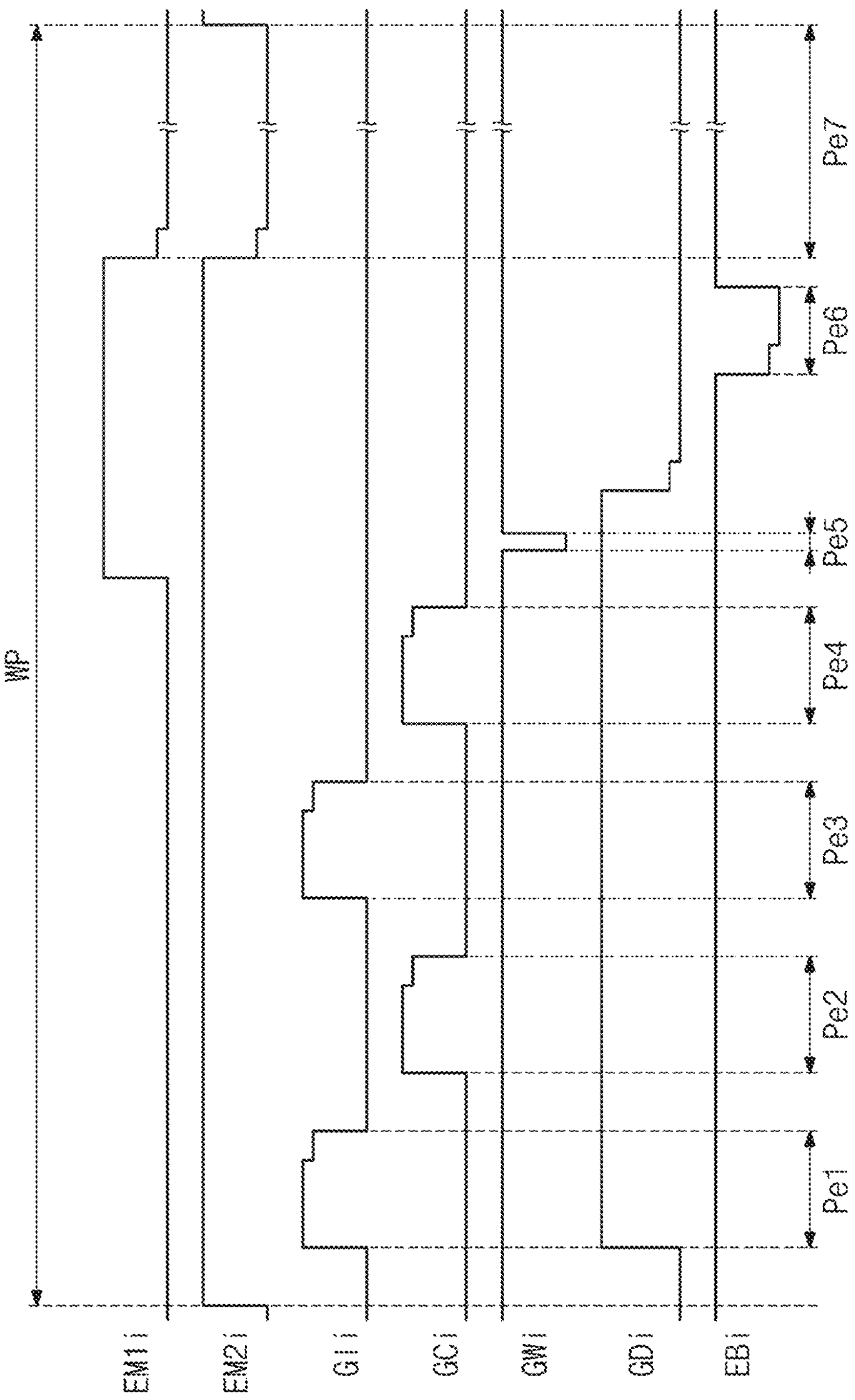
FIG. 25 is a timing diagram for describing an operation of a pixel during a write period.

FIG. 25 is a timing diagram for describing an operation of the pixel PXeij during the write period WP.

Referring to FIGS. 24 and 25, in a first period Pe1 in which the scan signal GIi is at the high level, the fourth transistor T4 is turned on. The first initialization voltage VINT may be transferred to the first node N1 through the fourth transistor T4 being in the turn-on state.

In a second period Pe2 in which the scan signals GCi and GDi are at the high level and the emission signal EM1*i* is at the low level, the third, eighth, tenth, and twenty-fifth transistors T3, T8, T10, and T25 are turned on. The reference voltage VREF may be transferred to the third node N3 through the twenty-fifth transistor T25 being in the turn-on state. The first driving voltage ELVDD may be transferred to the first node N1 through the eighth, first, and third transistors T8, T1, and T3.

An operation of the pixel PXeij in a third period Pe3 may be identical to that in the first period Pe1. The first period Pe1 and the third period Pe3 may refer to an "initialization period" in which the first node N1 is initialized.

An operation in a fourth period Pe4 may be identical to the operation in the second period Pe2. The second period Pe2 and the fourth period Pe4 may refer to a "compensation period" for compensating for the threshold voltage Vth of the first transistor T1.

In a fifth period Pe5 in which the scan signal GWi is at the low level and the scan signal GDi is at the high level, the second transistor T2 and the tenth transistor T10 are turned on. The data signal Dj from the data line DLj may be transferred to the second node N2 through the second transistor T2 and the tenth transistor T10. The fifth period Pd5 may refer to a "data write period" in which the data signal Dj is transferred to the first capacitor Cst.

In a sixth period Pe6 in which the scan signal EBi is at the low level, the seventh transistor T7 and the ninth transistor T9 are turned on. The second initialization voltage VAINT provided through the fourth driving voltage line VL4 may be provided to the anode of the light-emitting element ED through the seventh transistor T7. The bias voltage Vbias transferred through the sixth driving voltage line VL6 may be provided to the first electrode of the first transistor T1 through the ninth transistor T9. The sixth period Pe6 may refer to an "anode initialization and bias period" in which the anode of the light-emitting element ED and the first electrode of the first transistor T1 are initialized.

In the seventh period Pd7 in which the scan signals GIi, GCi, and GDi are at the low level and the scan signals GWi and EBi are at the high level, the emission signals EM1*i* and EM2*i* are at the low level. The sixth transistor T6 and the eighth transistor T8 may be turned on by the emission signals EM1*i* and EM2*i* being at the low level.

When the sixth transistor T6 and the eighth transistor T8 are turned on, a current path may be formed from the first driving voltage line VL1 to the light-emitting element ED through the eighth transistor T8, the first transistor T1, and the sixth transistor T6, and thus, the light-emitting element ED may emit a light. In this case, the amount of current transferred to the light-emitting element ED may be determined depending on a voltage level of the first node N1, that is, the gate electrode of the first transistor T1. The seventh period Pd7 may refer to an "emission period" in which the light-emitting element ED emits a light.

Although not illustrated in drawing, during the hold period HP, the scan signals GIi, GCi, and GDi provided to the pixel PXeij are maintained at the low level, and the scan signal GWi provided to the pixel PXeij is maintained at the high level. Also, like the sixth period Pe6 of the write period WP, in the hold period HP, only the scan signal EBi may transition to the low level being the active level, and thus, the bias voltage Vbias may be provided to the first electrode of the first transistor T1.

Figure 26:
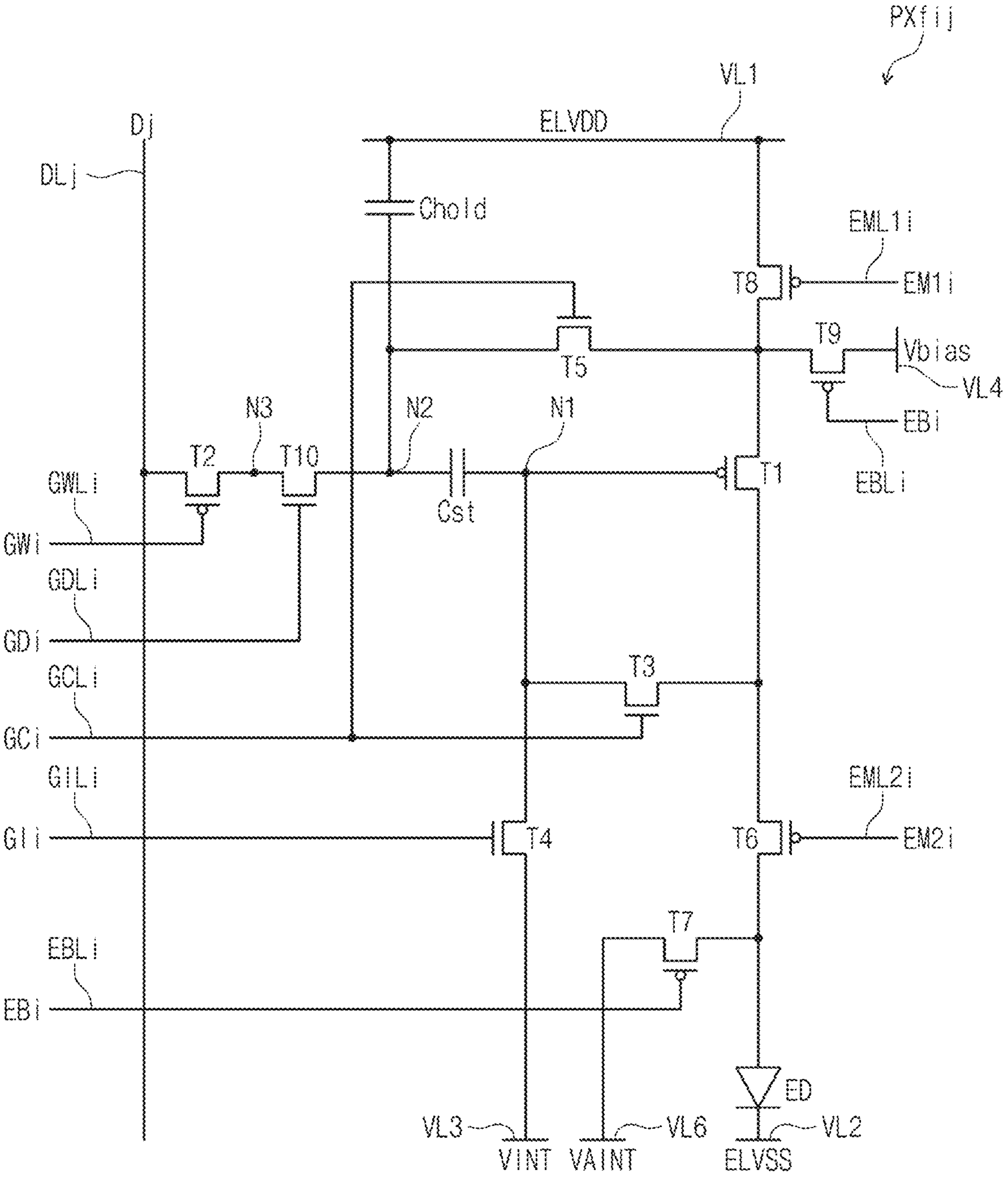
FIG. 26 is a circuit diagram of a pixel according to an embodiment of the present disclosure.

FIG. 26 is a circuit diagram of a pixel PXfij according to an embodiment of the present disclosure.

A configuration of the pixel PXfij illustrated in FIG. 26 is similar to the configuration of the pixel PXeij illustrated in FIG. 24 except that the twenty-fifth transistor T25 is not included and the fifth transistor T5 is included.

The fifth transistor T5 is connected between the first electrode of the first transistor T1 and the second node N2 and includes a gate electrode connected with the scan line GCLi. Because the third, fourth, fifth, and tenth transistors T3, T4, T5, and T10 directly connected with the first capacitor Cst are implemented with the N-type transistor, the leakage of charges stored in the first capacitor Cst may be minimized.

Figure 27:
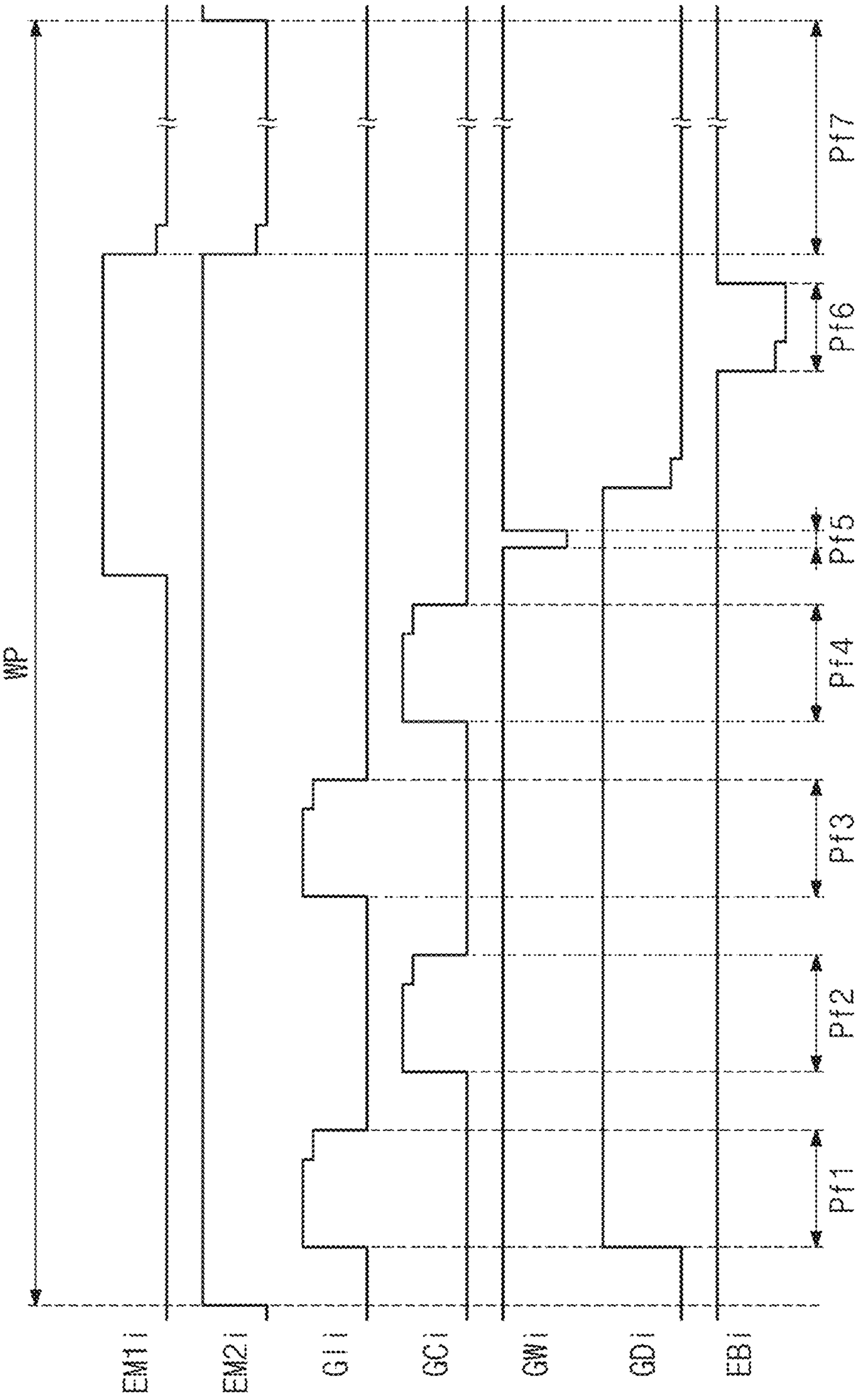
FIG. 27 is a timing diagram for describing an operation of a pixel during a write period.

FIG. 27 is a timing diagram for describing an operation of the pixel PXfij during the write period WP.

First to seventh periods Pf1 to Pf7 illustrated in FIG. 27 are similar to the first to seventh periods Pe1 to Pe7 illustrated in FIG. 25, and thus, additional description will be omitted to avoid redundancy.

In each of the second period Pf2 and the fourth period Pf4 in which the scan signal GCi is at the high level and the emission signal EM1*i* is at the low level, the first driving voltage ELVDD may be provided to the first node N1 through the eighth and fifth transistors T8 and T5.

Figure 28:
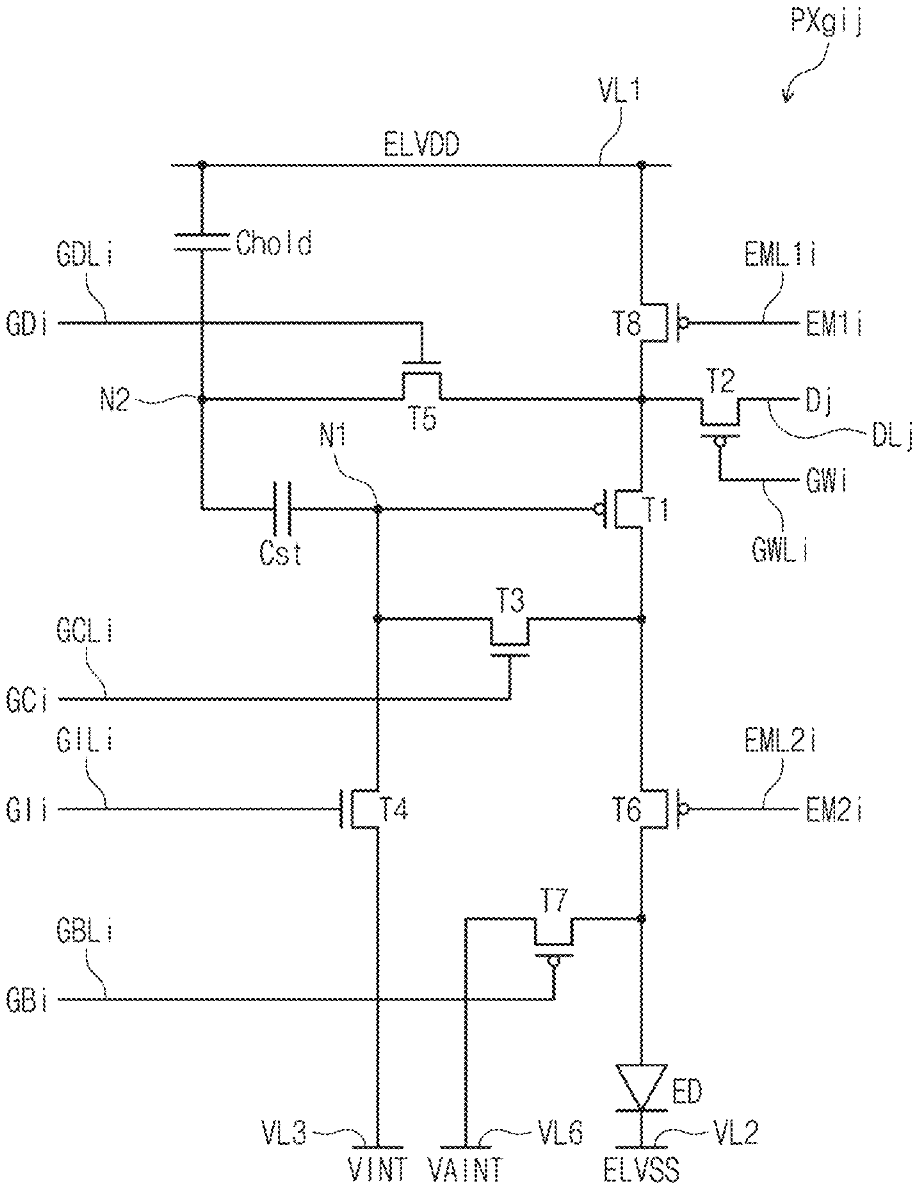
FIG. 28 is a circuit diagram of a pixel according to an embodiment of the present disclosure.

FIG. 28 is a circuit diagram of a pixel PXgij according to an embodiment of the present disclosure.

A configuration of the pixel PXgij illustrated in FIG. 28 is similar to the configuration of the pixel PXfij illustrated in FIG. 26 except that the ninth and tenth transistors T9 and T10 are not included.

A second transistor T2 is connected between the data line DLj and the first electrode of the first transistor T1 and includes a gate electrode connected with the scan line GWLi.

In an embodiment, the first, second, sixth, seventh, and eighth transistors T1, T2, T6, T7, and T8 of the pixel PXgij are implemented with a P-type transistor, and the third, fourth, and fifth transistors T3, T4, and T5 are implemented with an N-type transistor.

Because the third, fourth, and fifth transistors T3, T4, and T5 directly connected with the first capacitor Cst are implemented with the N-type transistor, the leakage of charges stored in the first capacitor Cst may be minimized.

Figure 29A:
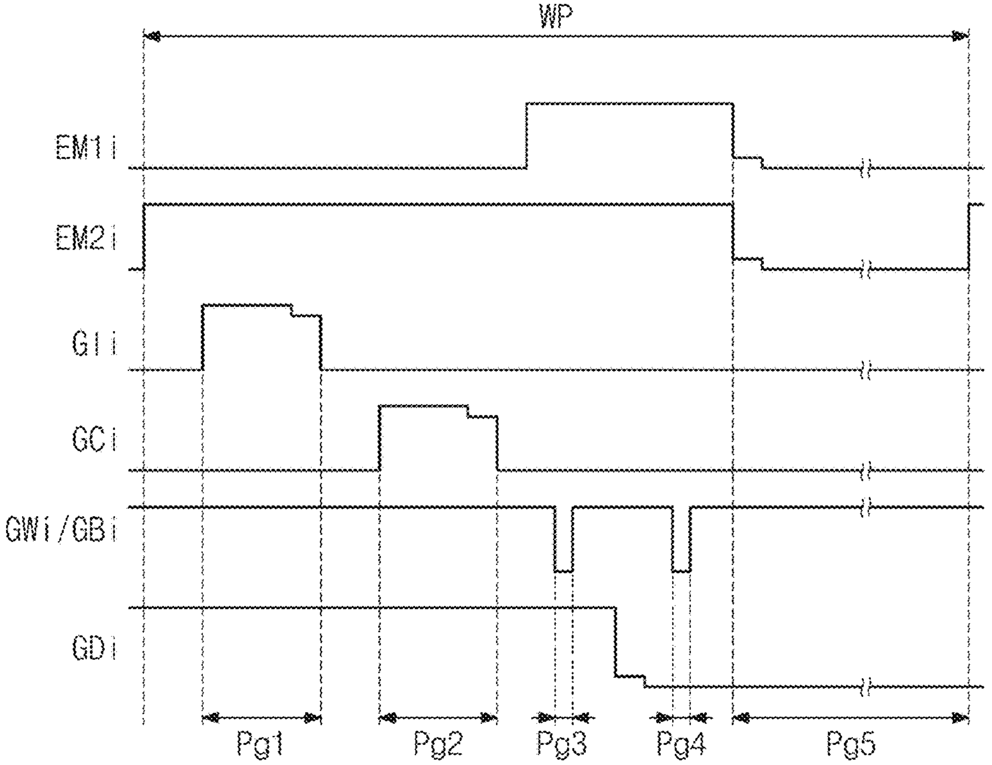
FIG. 29A is a timing diagram for describing an operation of a pixel during a write period.

FIG. 29A is a timing diagram for describing an operation of the pixel PXgij during the write period WP.

Referring to FIGS. 28 and 29A, in a first period Pg1, the fourth, fifth, and eighth transistors T4, T5, and T8 are turned on by the scan signals GIi and GDi and the emission signal EM1*i*. The first initialization voltage VINT may be transferred to the first node N1 through the fourth transistor T4 being in the turn-on state. Also, the first driving voltage ELVDD may be transferred to the second node N2 through the eighth transistor T8 and the fifth transistor T5.

In a second period Pg2 in which the scan signals GCi and GDi are at the high level and the emission signal EM1*i* is at the low level, the third, fifth, and eighth transistors T3, T5, and T8 are turned on. The first driving voltage ELVDD may be transferred to the second node N2 through the eighth transistor T8 and the fifth transistor T5 being in the turn-on state. Also, the first driving voltage ELVDD may be transferred to the first node N1 through the eighth, first, and third transistors T8, T1, and T3.

In a third period Pg3 in which the scan signal GWi is at the low level and the scan signal GDi is at the high level, the second and fifth transistors T2 and T5 are turned on. The data signal Dj from the data line DLj may be transferred to the second node N2 through the second and fifth transistors T2 and T5. In this case, the data signal Dj provided through the data line DLj may correspond to a data voltage of an image to be displayed by the light-emitting element ED.

In a fourth period Pg4 in which the scan signal GWi is at the low level, the data signal Dj from the data line DLj may be provided to the first electrode of the first transistor T1. In this case, the data signal Dj provided through the data line DLj may correspond to a bias voltage for initializing the first electrode of the first transistor T1.

During a fifth period Pg5, the emission signals EM1*i* and EM2*i* are at the low level. When the sixth transistor T6 and the eighth transistor T8 are turned on in response to the emission signals EM1*i* and EM2*i* being at the low level, a current path may be formed from the first driving voltage line VL1 to the light-emitting element ED through the eighth transistor T8, the first transistor T1, and the sixth transistor T6. In this case, the amount of current transferred to the light-emitting element ED may be determined depending on a voltage level of the first node N1, that is, the gate electrode of the first transistor T1.

The scan signal GDi is maintained at the high level in the first period Pg1 and the second period Pg2. As such, the first driving voltage ELVDD may be transferred to the second node N2 in the first period Pg1 being the initialization period, and the first driving voltage ELVDD may also be transferred to the second node N2 in the second period Pg2 being the compensation period. That is, because the first driving voltage ELVDD is provided to the second node N2 continuously two times, the voltage change of the second node N2 does not affect the first node N1 after the second period Pg2 is performed.

As illustrated in FIG. 27, the pixel PXgij illustrated in FIG. 26 should perform the initialization period two times (i.e., the first period Pf1 and the third period Pf3) and should perform the compensation period two times (i.e., the second period Pf2 and the fourth period Pf4).

As illustrated in FIG. 29A, the pixel PXgij illustrated in FIG. 28 performs the initialization period only once (i.e., the first period Pg1) and performs the compensation period only once (i.e., the second Pg2).

Figure 29B:
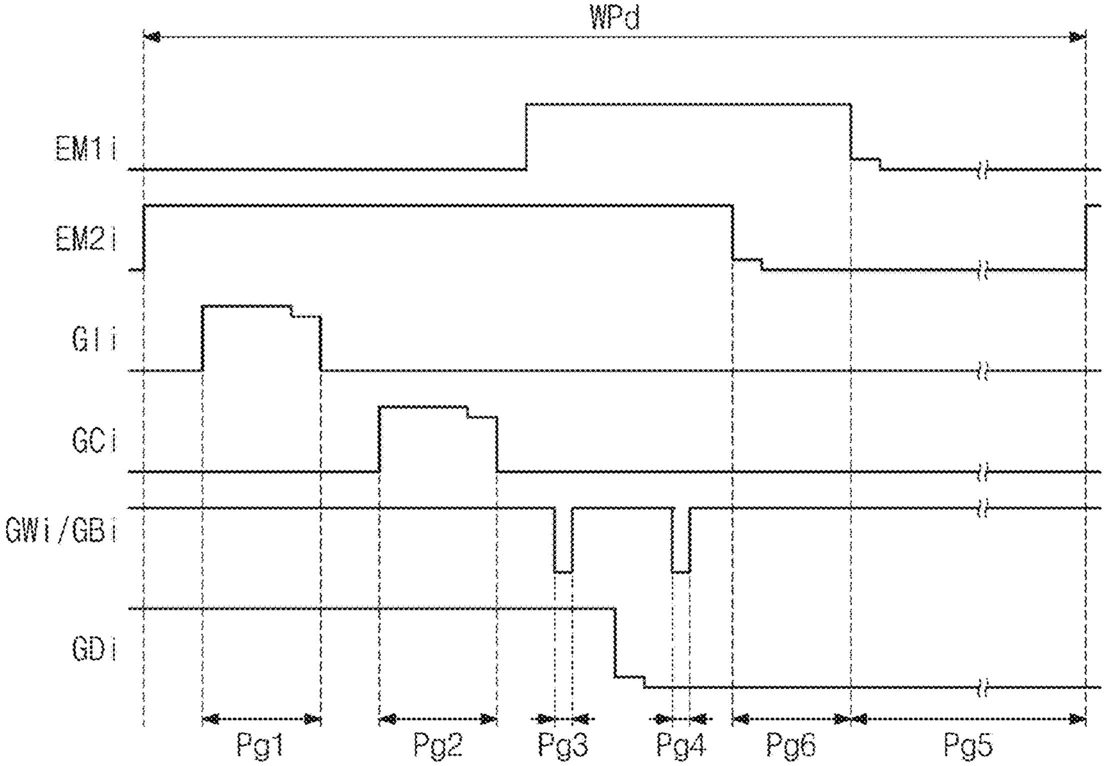
FIG. 29B is a timing diagram for describing an operation of a pixel during a write period according to an embodiment of the present disclosure.

FIG. 29B is a timing diagram for describing an operation of the pixel PXgij during a write period WPd according to an embodiment of the present disclosure.

First to fifth periods Pg1 to Pg5 of the write period WPd illustrated in FIG. 29B are substantially the same as the first to fifth periods Pg1 to Pg5 of the write period WP illustrated in FIG. 29A, and the same reference signs are used for the same periods. Thus, additional description will be omitted to avoid redundancy.

The write period WPd illustrated in FIG. 29B further includes a sixth period Pg6 between the fourth period Pg5 and the fifth period Pg5.

In the sixth period Pg6, the emission signal EM1*i* is at the high level, and the emission signal EM2*i* is at the low level.

In the third period Pg3 and the fourth period Pg4, the anode of the light-emitting element ED is initialized with the second initialization voltage VAINT. The light-emitting element ED may maintain the anode of the light-emitting element ED at a given voltage level by the capacitance between the anode and the cathode thereof.

When the sixth transistor T6 is turned on by the emission signal EM2*i* of the low level, the second electrode of the first transistor T1 may be initialized with the voltage level of the anode of the light-emitting element ED.

In the sixth period Pg6 of each of the write period WPd and the hold period HP, when the second electrode of the first transistor T1 is initialized with the voltage level of the anode of the light-emitting element ED, a brightness difference due to a difference between the voltage level of the second electrode of the first transistor T1 in the write period WPd and the voltage level of the second electrode of the first transistor T1 in the hold period HP may be minimized.

Figure 30:
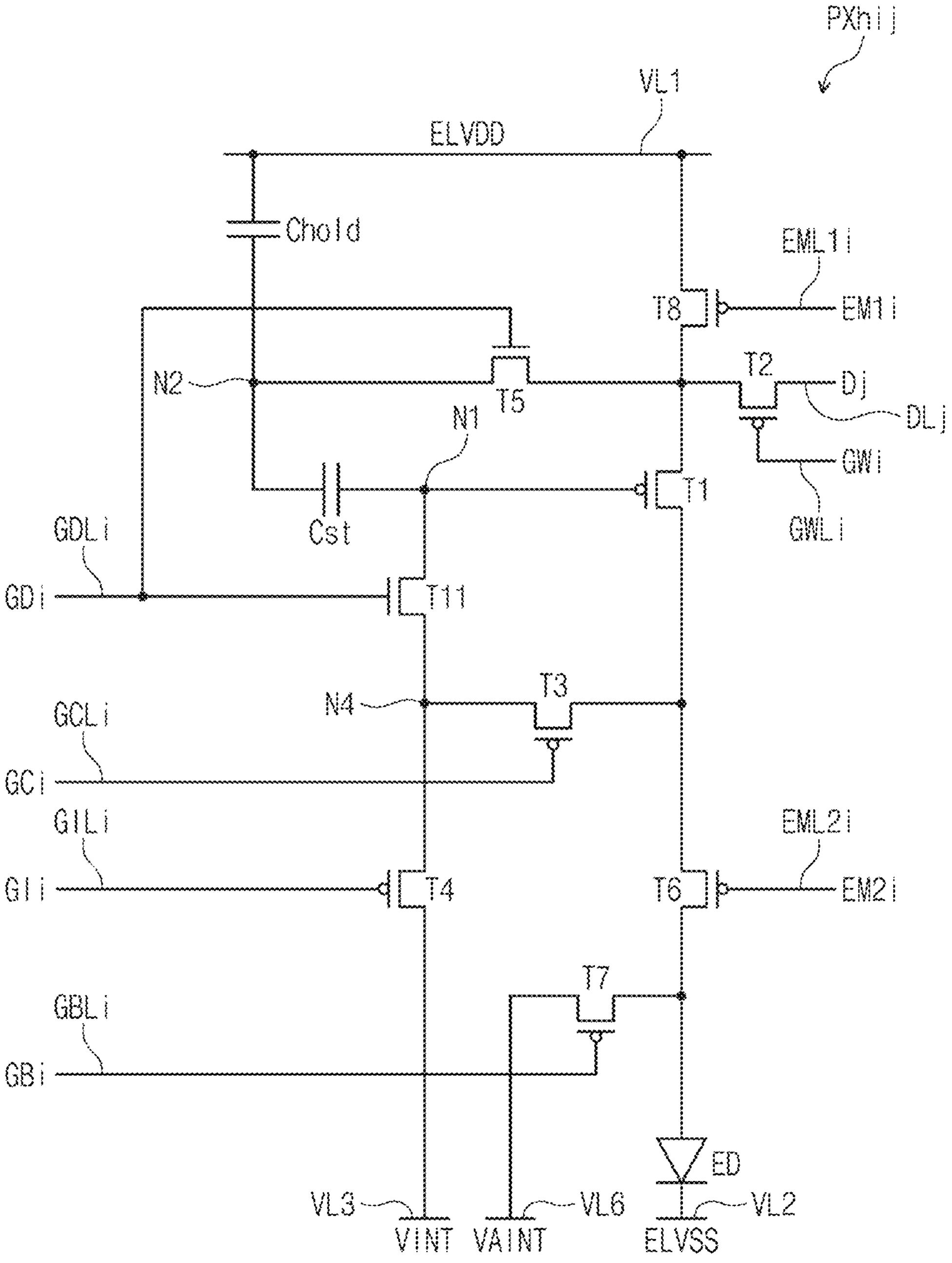
FIG. 30 is a circuit diagram of a pixel according to an embodiment of the present disclosure.

FIG. 30 is a circuit diagram of a pixel PXhij according to an embodiment of the present disclosure.

The pixel PXhij illustrated in FIG. 30 includes a configuration similar to the configuration of the pixel PXgij illustrated in FIG. 28 except that an eleventh transistor T11 is further included therein. The third and fourth transistors T3 and T4 of the pixel PXgij illustrated in FIG. 28 are implemented with an N-type transistor, but the third and fourth transistors T3 and T4 of the pixel PXhij illustrated in FIG. 30 are implemented with a P-type transistor.

The eleventh transistor T11 is connected between the first node N1 and the fourth node N4 and includes a gate electrode connected with the scan line GDLi.

Because the fifth and eleventh transistors T5 and T11 directly connected with the first capacitor Cst are implemented with an N-type transistor, the leakage of charges stored in the first capacitor Cst may be minimized.

Figure 31A:
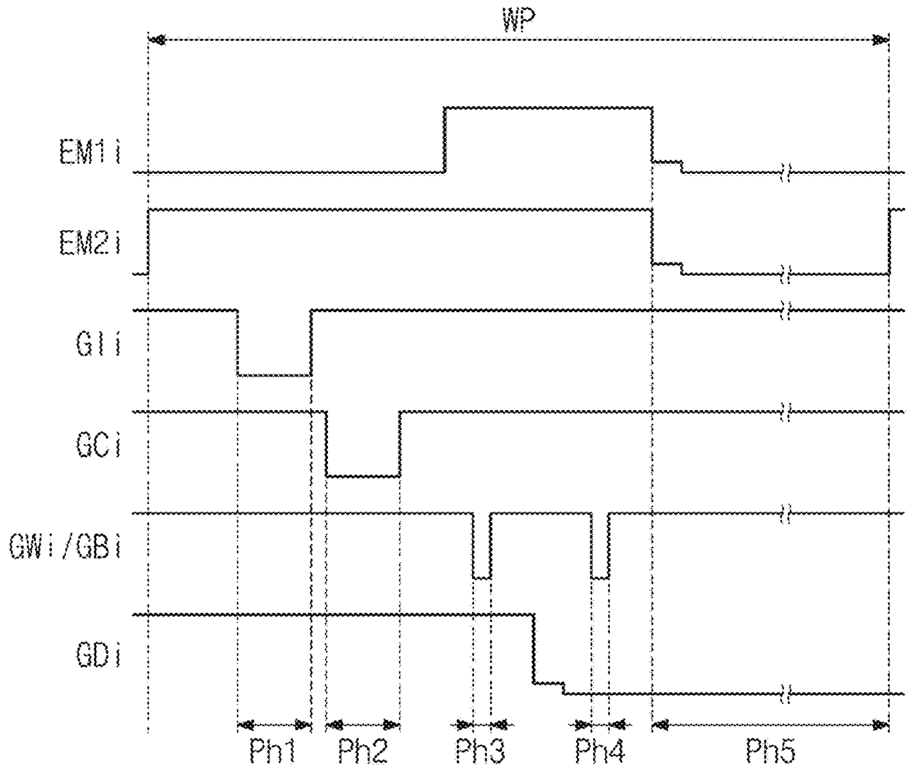
FIGS. 31A and 31B are timing diagrams for describing an operation of a pixel during a write period.

FIG. 31A is a timing diagram for describing an operation of the pixel PXhij during the write period WP.

First to fifth periods Ph1 to Ph5 illustrated in FIG. 31A may be substantially the same as the first to fifth periods Pg1 to Pg5 illustrated in FIG. 29A, and thus, additional description will be omitted to avoid redundancy.

Because the fourth transistor T4 of the pixel PXhij illustrated in FIG. is implemented with a P-type transistor, the scan signal GIi is at the low level in the first period Ph1. Because the third transistor T3 is implemented with a P-type transistor, the scan signal GCi is at the low level in the second period Ph2.

Figure 31B:
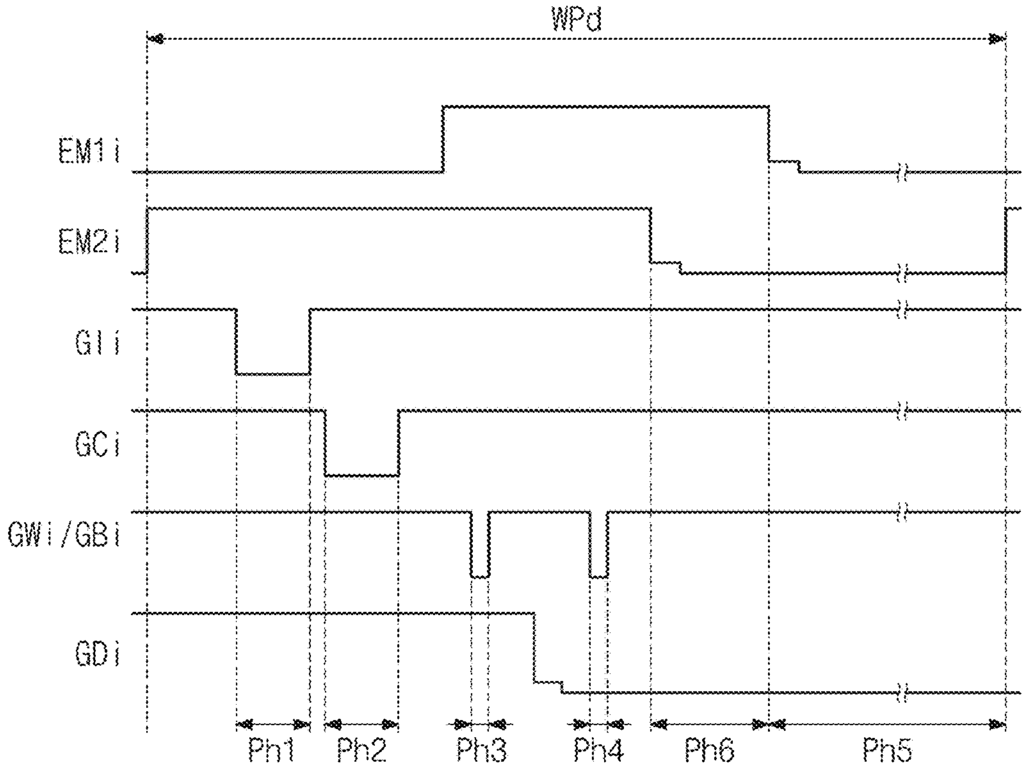

FIG. 31B is a timing diagram for describing an operation of the pixel PXhij during the write period WPd according to an embodiment of the present disclosure.

First to sixth periods Ph1 to Ph6 illustrated in FIG. 31B may be substantially the same as the first to sixth periods Pg1 to Pg6 illustrated in FIG. 29B, and thus, additional description will be omitted to avoid redundancy.

Because the fourth transistor T4 is implemented with a P-type transistor, the scan signal GIi is at the low level in the first period Ph1. Because the third transistor T3 is implemented with a P-type transistor, the scan signal GCi is at the low level in the second period Ph2.

Unlike the timing diagram illustrated in FIG. 31A, the timing diagram illustrated in FIG. 31B further include the sixth period Pg6. In the sixth period Pg6, the second electrode of the first transistor T1 may be initialized with the voltage level of the anode of the light-emitting element ED. Accordingly, a brightness difference due to a difference between the voltage of the second electrode of the first transistor T1 in the write period WP and the voltage of the second electrode of the first transistor T1 in the hold period HP may be minimized.

Figure 32:
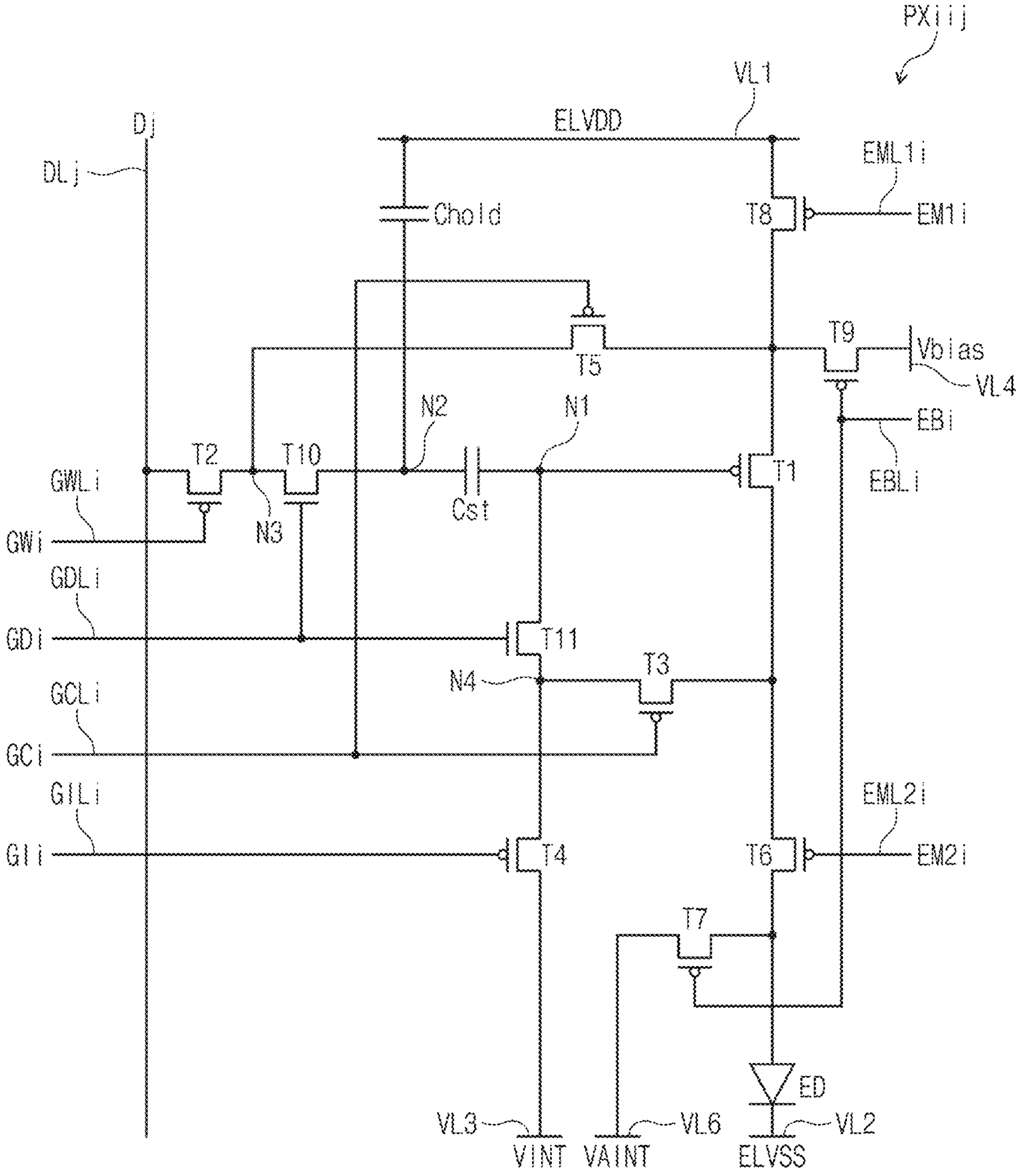
FIG. 32 is a circuit diagram of a pixel according to an embodiment of the present disclosure.

FIG. 32 is a circuit diagram of a pixel PXiij according to an embodiment of the present disclosure.

A configuration of the pixel PXiij illustrated in FIG. 32 is similar to the configuration of the pixel PXdij illustrated in FIG. 22 except that the fifth transistor T5 is included instead of the twenty-fifth transistor T25.

The fifth transistor T5 is connected between the third node N3 and the first electrode of the first transistor T1 and includes a gate electrode connected with the scan line GCLi. The fifth transistor T5 is implemented with a P-type transistor.

Because the tenth and eleventh transistors T10 and T11 directly connected with the first capacitor Cst are implemented with an N-type transistor, the leakage of charges stored in the first capacitor Cst may be minimized.

Figure 33:
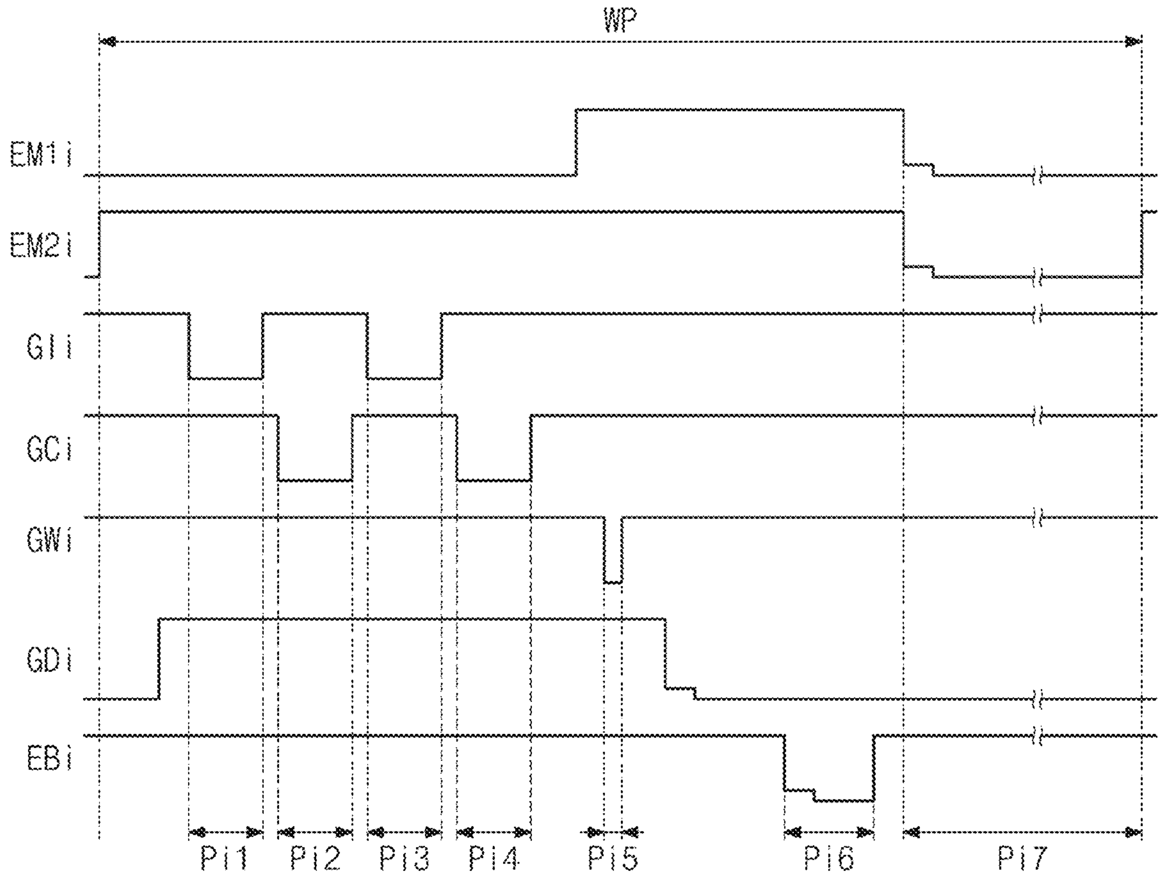
FIG. 33 is a timing diagram for describing an operation of a pixel during a write period.

FIG. 33 is a timing diagram for describing an operation of the pixel PXiij during the write period WP.

First to seventh periods Pi1 to Pi7 illustrated in FIG. 33 may be substantially the same as the first to seventh periods Pd1 to Pd7 illustrated in FIG. 23, and thus, additional description will be omitted to avoid redundancy.

Referring to FIGS. 32 and 33, in each of the second period Pi2 and the fourth period Pi4, in which the emission signal EM1*i* and the scan signal GCi are at the low level, the fifth transistor T5 and the eighth transistor T8 are turned on. As such, in each of the second period Pi2 and the fourth period Pi4, the first driving voltage ELVDD may be transferred to the third node N3 through the eighth transistor T8 and the fifth transistor T5 being in the turn-on state.

Figure 34:
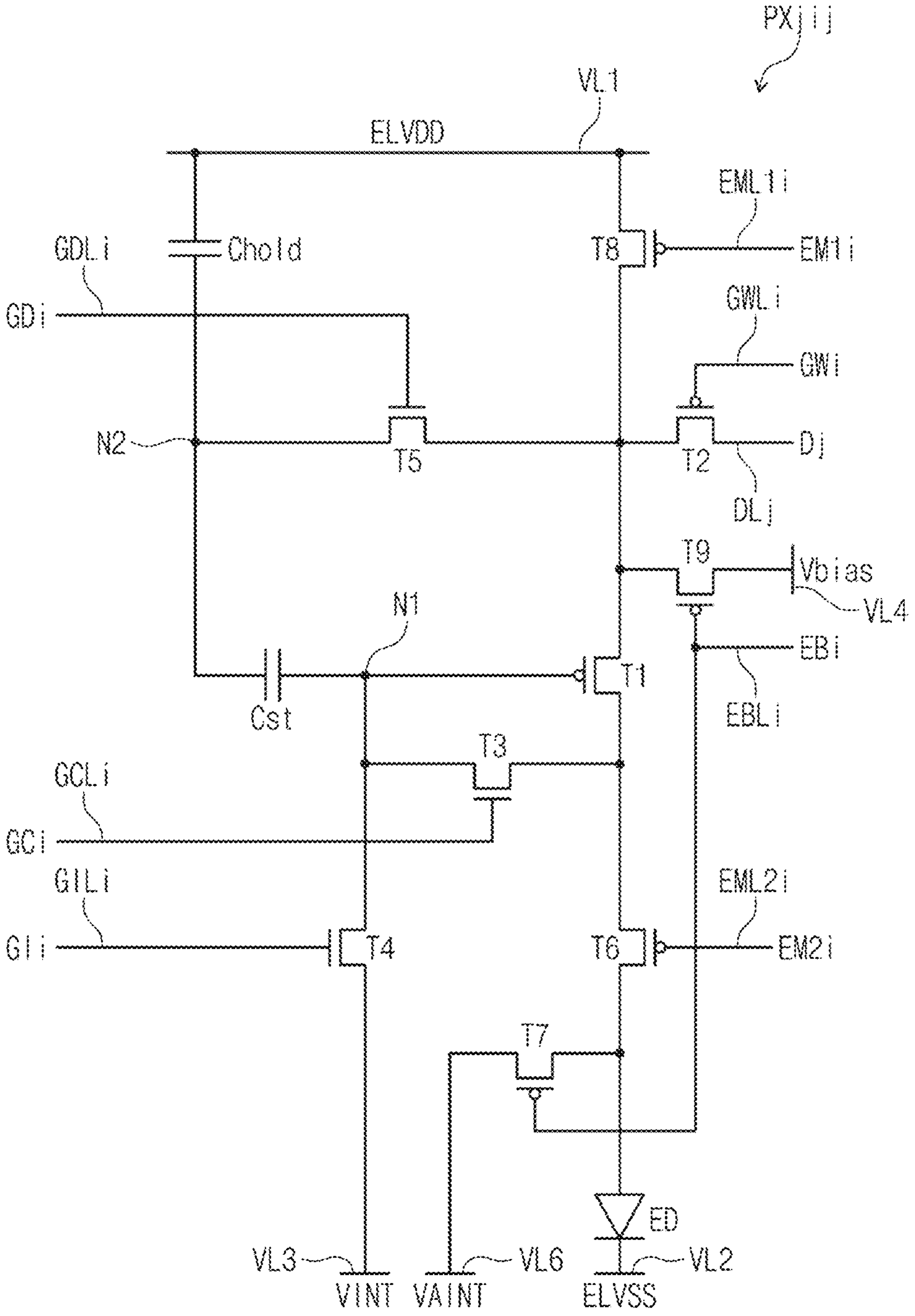
FIG. 34 is a circuit diagram of a pixel according to an embodiment of the present disclosure.

FIG. 34 is a circuit diagram of a pixel PXjij according to an embodiment of the present disclosure.

A configuration of the pixel PXjij illustrated in FIG. 34 is similar to the configuration of the pixel PXgij illustrated in FIG. 28 except that the ninth transistor T9 is further included therein.

The ninth transistor T9 is connected between the fourth driving voltage line VL4 and the first electrode of the first transistor T1 and includes a gate electrode connected with the scan line EBLi.

The seventh transistor T7 is connected between the anode of the light-emitting element ED and the sixth driving voltage line VL6 and includes a gate electrode connected with the scan line EBLi.

Figure 35A:
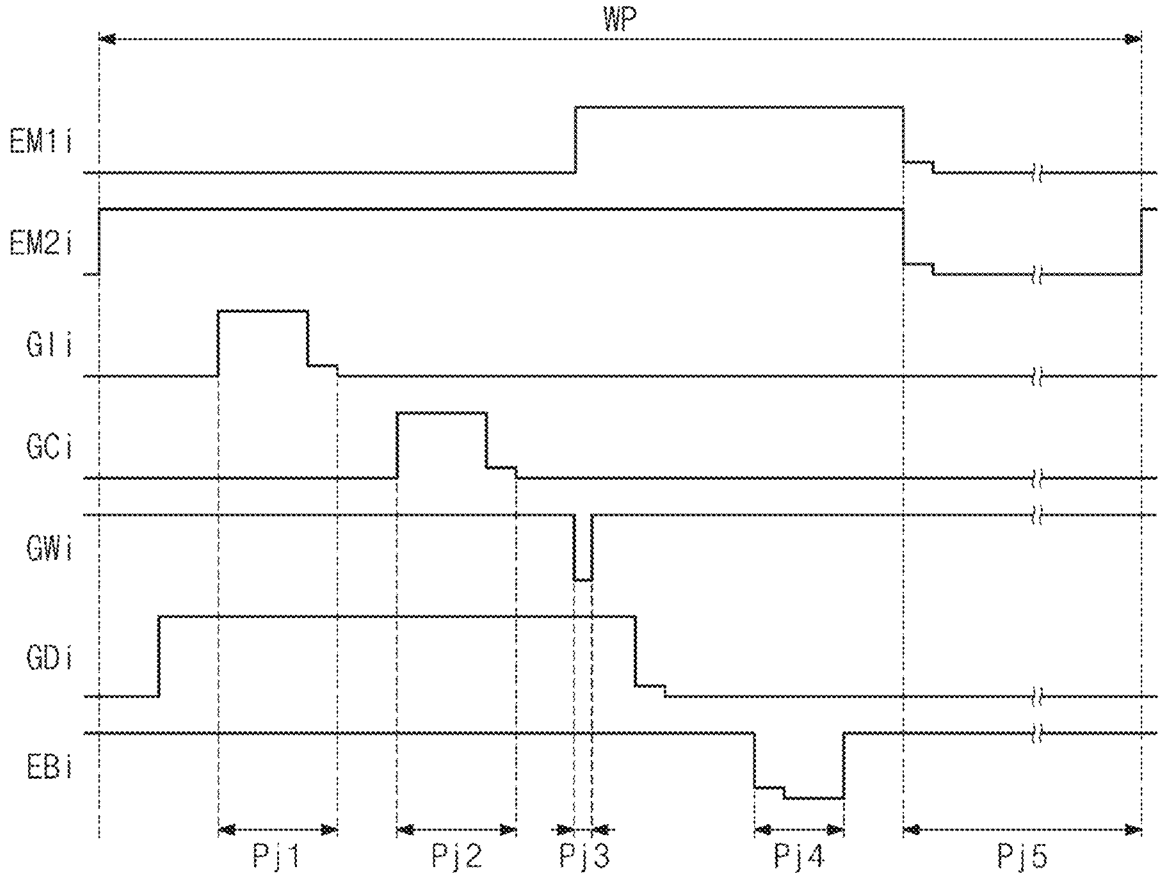
FIGS. 35A and 35B are timing diagrams for describing an operation of a pixel during a write period.

FIG. 35A is a timing diagram for describing an operation of the pixel PXjij during the write period WP.

Referring to FIGS. 34 and 35A, in a first period Pj1, the fourth, fifth, and eighth transistors T4, T5, and T8 are turned on by the scan signals GIi and GDi and the emission signal EM1*i*. The first initialization voltage VINT may be transferred to the first node N1 through the fourth transistor T4 being in the turn-on state. Also, the first driving voltage ELVDD may be transferred to the second node N2 through the eighth transistor T8 and the fifth transistor T5 being in the turn-on state.

In a second period Pj2 in which the scan signals GCi and GDi are at the high level and the emission signal EM1*i* is at the low level, the third, fifth, and eighth transistors T3, T5, and T8 are turned on. The first driving voltage ELVDD may be transferred to the second node N2 through the eighth transistor T8 and the fifth transistor T5 being in the turn-on state. Also, the first driving voltage ELVDD may be transferred to the first node N1 through the eighth, first, and third transistors T8, T1, and T3.

In a third period Pj3 in which the scan signal GWi is at the low level and the scan signal GDi is at the high level, the second and fifth transistors T2 and T5 are turned on. The data signal Dj from the data line DLj may be transferred to the second node N2 through the second and fifth transistors T2 and T5.

In a fourth period Pj4 in which the scan signal EBi is at the low level, the bias voltage Vbias may be provided from the fourth driving voltage line VL4 to the first electrode of the first transistor T1. Also, the second initialization voltage VAINT from the sixth driving voltage line VL6 may be provided to the anode of the light-emitting element ED.

During a fifth period Pj5, the emission signals EM1*i* and EM2*i* are at the low level. When the sixth transistor T6 and the eighth transistor T8 are turned on in response to the emission signals EM1*i* and EM2*i* being at the low level, a current path may be formed from the first driving voltage line VL1 to the light-emitting element ED through the eighth transistor T8, the first transistor T1, and the sixth transistor T6. In this case, the amount of current transferred to the light-emitting element ED may be determined depending on a voltage level of the first node N1, that is, the gate electrode of the first transistor T1.

The scan signal GDi is maintained at the high level in the first period Pj1 and the second period Pj2. As such, the first driving voltage ELVDD may be transferred to the second node N2 in the first period Pj1 being the initialization period, and the first driving voltage ELVDD may also be transferred to the second node N2 in the second period Pj2 being the compensation period. That is, because the first driving voltage ELVDD is provided to the second node N2 continuously two times, the voltage change of the second node N2 does not affect the first node N1 after the second period Pj2 is performed. Accordingly, the pixel PXjij illustrated in FIG. 34 performs the initialization period only once (i.e., the first period Pj1) and performs the compensation period only once (i.e., the second Pj2). However, the present disclosure is not limited thereto. For example, the first period Pj1 and the second period Pj2 may be performed in turn plural times.

Figure 35B:
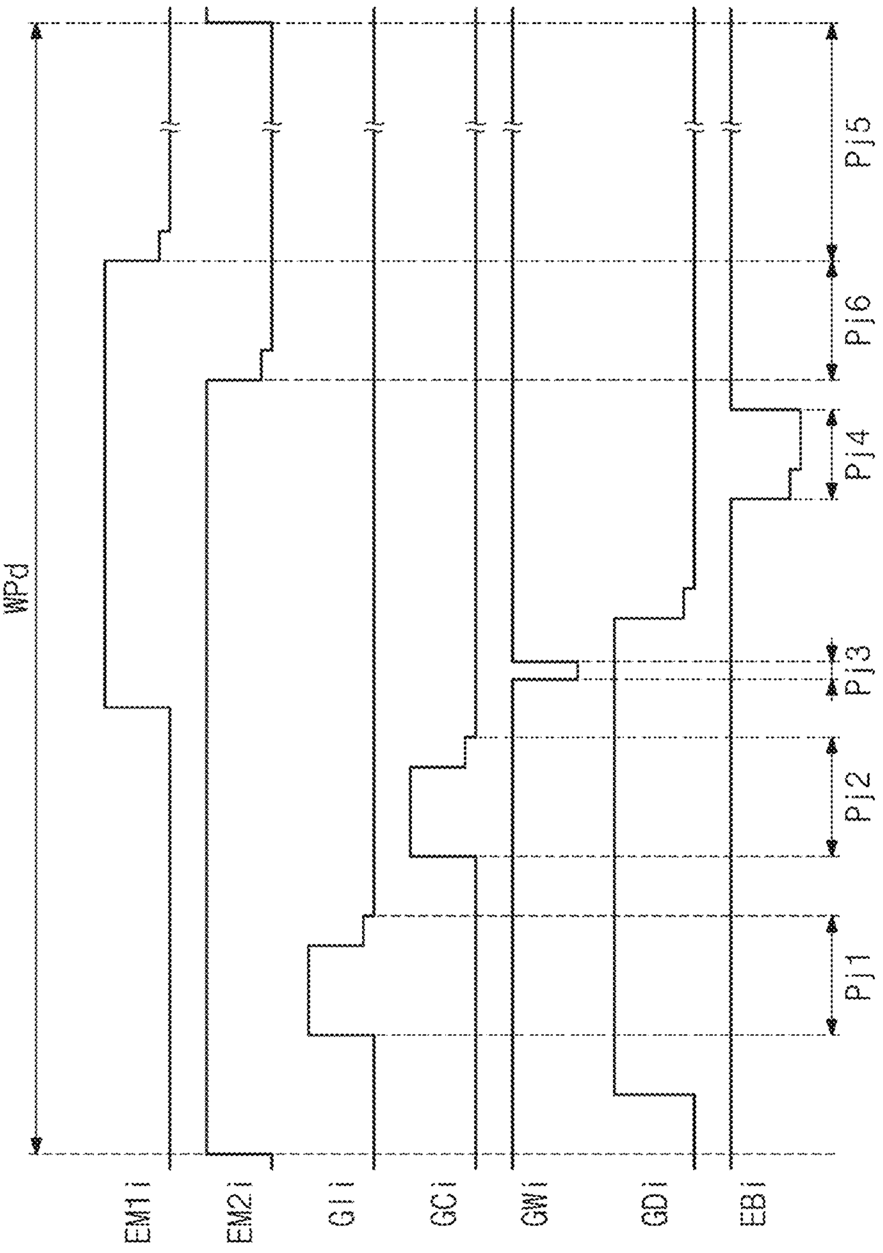

FIG. 35B is a timing diagram for describing an operation of the pixel PXjij during the write period WPd according to an embodiment of the present disclosure.

First to fifth periods Pj1 to Pj5 of the write period WPd illustrated in FIG. 35B are substantially the same as the first to fifth periods Pj1 to Pj5 of the write period WP illustrated in FIG. 35A, and the same reference signs are used for the same periods. Thus, additional description will be omitted to avoid redundancy.

The write period WPd illustrated in FIG. 35B further includes a sixth period Pj6 between the fourth period Pj4 and the fifth period Pj5.

In the third period Pj3 and the fourth period Pj4, the anode of the light-emitting element ED is initialized with the second initialization voltage VAINT. The light-emitting element ED may maintain the anode of the light-emitting element ED at a given voltage level by the capacitance between the anode and the cathode thereof In the sixth period Pj6, the emission signal EM1*i* is at the high level, and the emission signal EM2*i* is at the low level. When the sixth transistor T6 is turned on by the emission signal EM2*i* of the low level, the second electrode of the first transistor T1 may be initialized with the voltage level of the anode of the light-emitting element ED.

In the sixth period Pj6 of each of the write period WPd and the hold period HP, when the second electrode of the first transistor T1 is initialized with the voltage level of the anode of the light-emitting element ED, a brightness difference due to a difference between the voltage level of the second electrode of the first transistor T1 in the write period WPd and the voltage level of the second electrode of the first transistor T1 in the hold period HP may be minimized.

Figure 36:
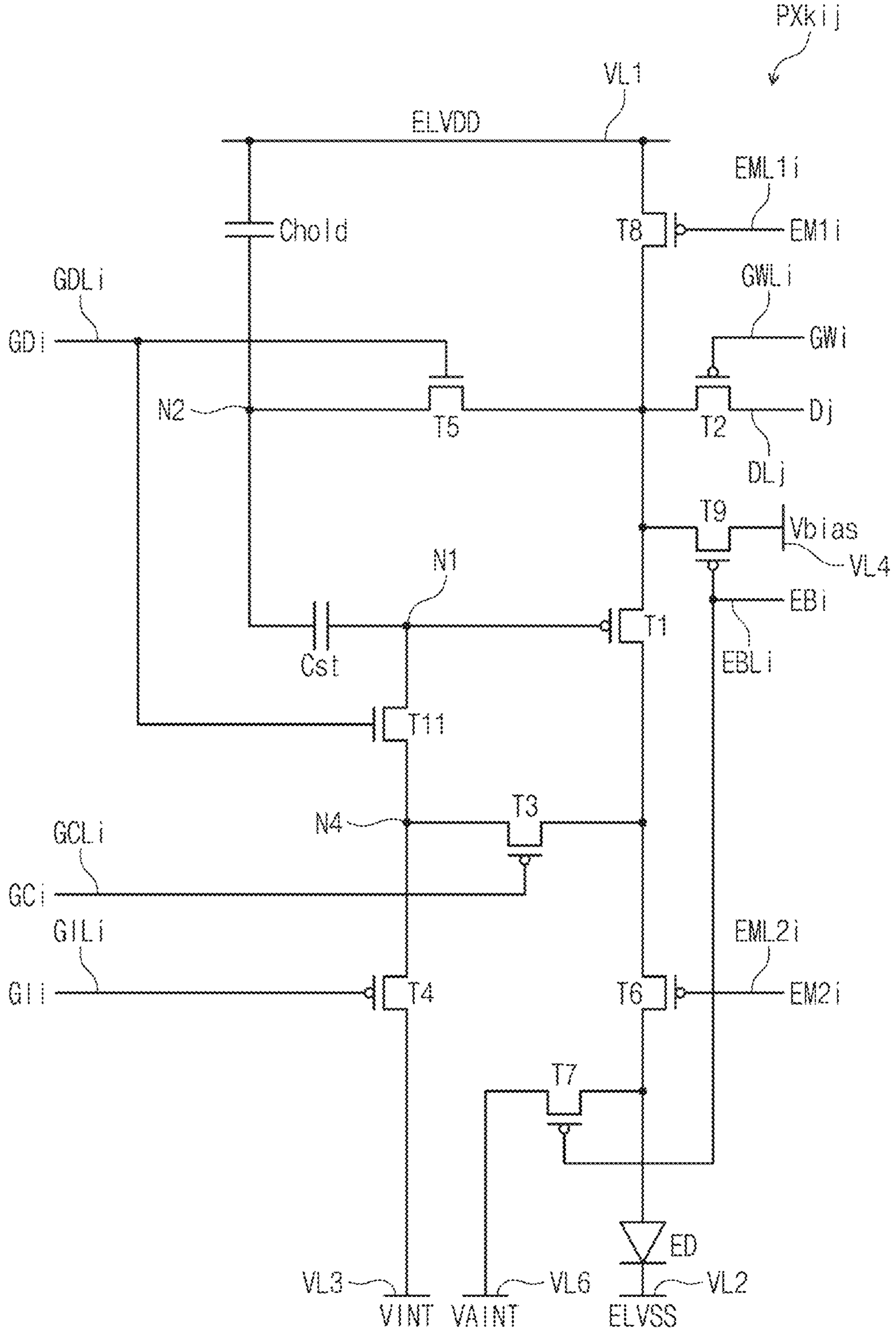
FIG. 36 is a circuit diagram of a pixel according to an embodiment of the present disclosure.

FIG. 36 is a circuit diagram of a pixel PXkij according to an embodiment of the present disclosure.

A configuration of the pixel PXkij illustrated in FIG. 36 is similar to the configuration of the pixel PXjij illustrated in FIG. 34 except that the eleventh transistor T11 is further included therein.

The eleventh transistor T11 is connected between the first node N1 and the fourth node N4 and includes a gate electrode connected with the scan line GDLi.

In an embodiment, the first, second, third, fourth, sixth, seventh, and eighth transistors T1, T2, T3, T4, T6, T7, and T8 of the pixel PXkij are implemented with a P-type transistor, and the fifth and eleventh transistors T5 and T11 are implemented with an N-type transistor.

Because the fifth and eleventh transistors T5 and T11 directly connected with the first capacitor Cst are implemented with an N-type transistor, the leakage of charges stored in the first capacitor Cst may be minimized.

Figure 37A:
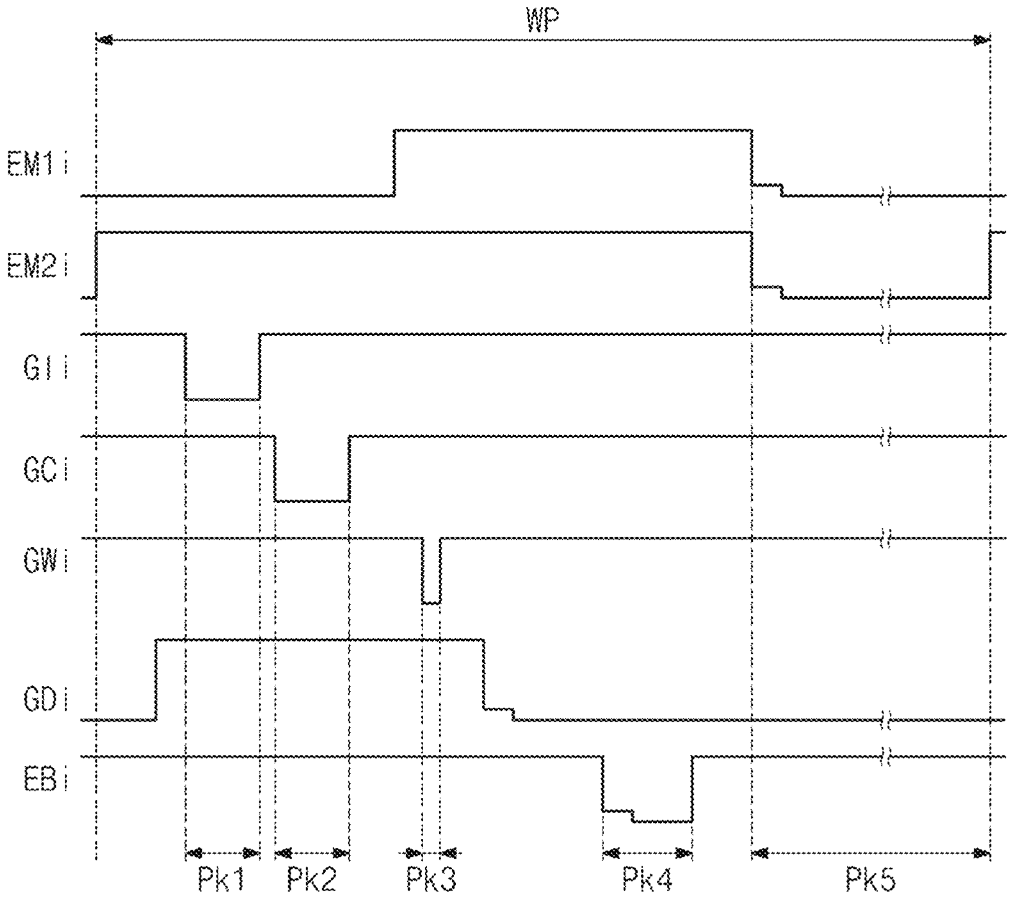
FIGS. 37A and 37B are timing diagrams for describing an operation of a pixel during a write period.

FIG. 37A is a timing diagram for describing an operation of the pixel PXkij during the write period WP.

First to fifth periods Pk1 to Pk5 illustrated in FIG. 37A may be substantially the same as the first to fifth periods Pj1 to Pj5 illustrated in FIG. 35A, and thus, additional description will be omitted to avoid redundancy.

However, because the fourth transistor T4 of the pixel PXkij illustrated in FIG. 36 is implemented with a P-type transistor, the scan signal GIi is at the low level in the first period Pk1. Because the third transistor T3 is implemented with a P-type transistor, the scan signal GCi is at the low level in the second period Pk2.

Figure 37B:
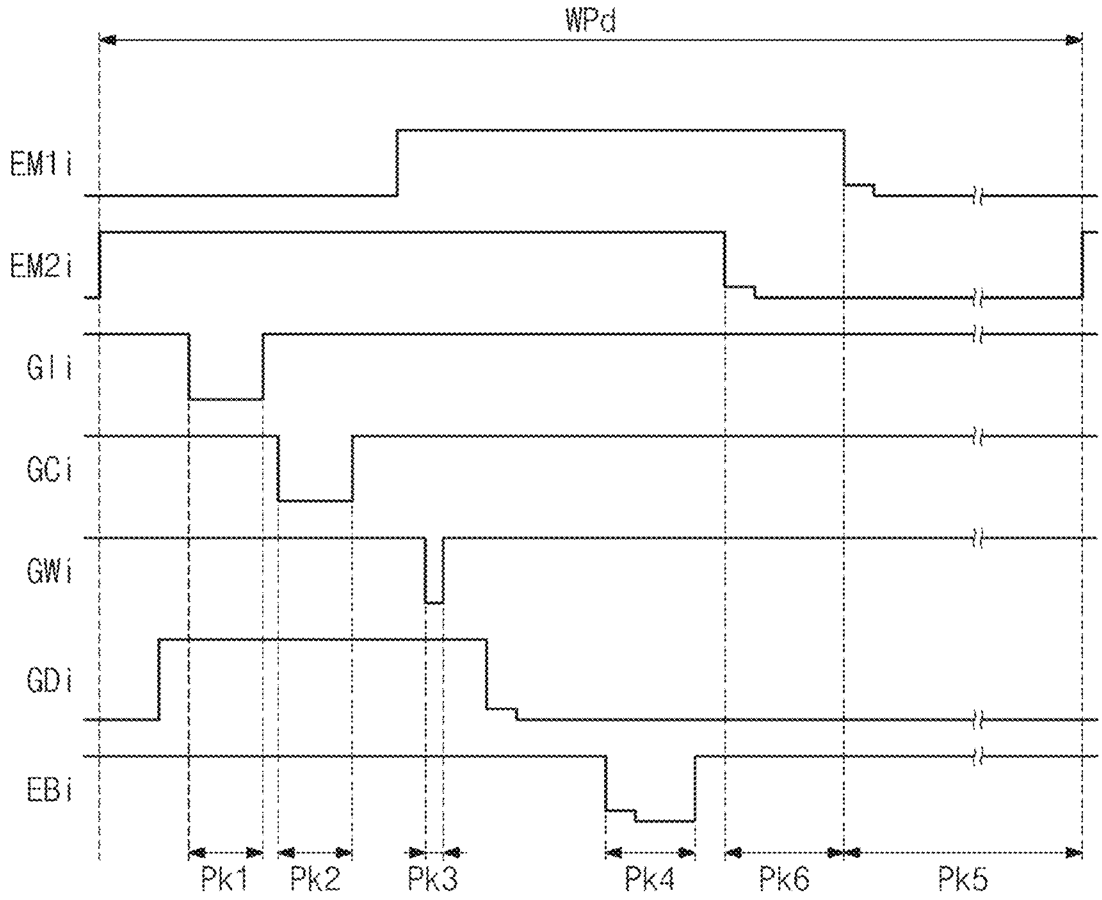

FIG. 37B is a timing diagram for describing an operation of the pixel PXkij during the write period WPd.

First to sixth periods Pk1 to Pk6 illustrated in FIG. 37B may be substantially the same as the first to sixth periods Pj1 to Pj6 illustrated in FIG. 35B, and thus, additional description will be omitted to avoid redundancy.

However, because the fourth transistor T4 of the pixel PXkij illustrated in FIG. 36 is implemented with a P-type transistor, the scan signal GIi is at the low level in the first period Pk1. Because the third transistor T3 is implemented with a P-type transistor, the scan signal GCi is at the low level in the second period Pk2.

In the sixth period Pk6, the emission signal EM1*i* is at the high level, and the emission signal EM2*i* is at the low level. When the sixth transistor T6 is turned on by the emission signal EM2*i* of the low level, the second electrode of the first transistor T1 may be initialized with the voltage level of the anode of the light-emitting element ED.

In the sixth period Pk6 of each of the write period WPd and the hold period HP, when the second electrode of the first transistor T1 is initialized with the voltage level of the anode of the light-emitting element ED, a brightness difference due to a difference between the voltage level of the second electrode of the first transistor T1 in the write period WPd and the voltage level of the second electrode of the first transistor T1 in the hold period HP may be minimized.

Figure 38:
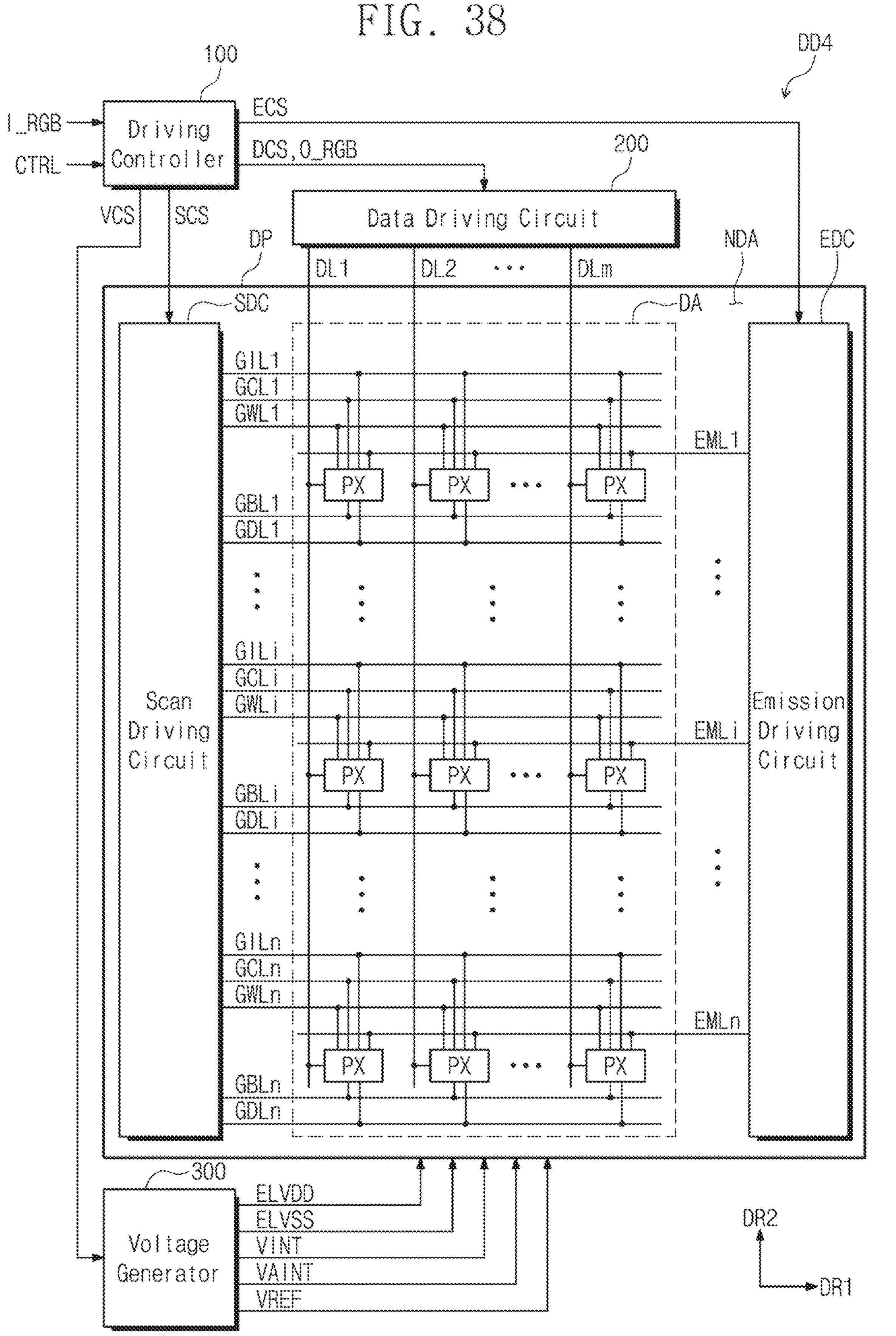
FIG. 38 is a block diagram of a display device according to an embodiment of the present disclosure.

FIG. 38 is a block diagram of a display device DD4 according to an embodiment of the present disclosure.

The display device DD4 illustrated in FIG. 38 includes components similar to those of the display device DD3 illustrated in FIG. 21. Accordingly, similar reference signs are used for similar components, and thus, additional description will be omitted to avoid redundancy.

The display panel DP includes the scan lines GIL1 to GILn, GCL1 to GCLn, GWL1 to GWLn, GBL1 to GBLn, and GDL1 to GDLn, the emission lines EML1 to EMLn, the data lines DL1 to DLm, and the pixels PX.

The scan driving circuit SDC may output scan signals to the scan lines GIL1 to GILn, GCL1 to GCLn, GWL1 to GWLn, GBL1 to GBLn, and GDL1 to GDLn in response to the scan control signal SCS.

The voltage generator 300 generates voltages for an operation of the display panel DP. In an embodiment, the voltage generator 300 generates the first driving voltage ELVDD, the second driving voltage ELVSS, the first initialization voltage VINT, the second initialization voltage VAINT, and the reference voltage VREF. The voltages generated by the voltage generator 300 are not limited to the example illustrated in FIG. 38. The number of voltages, which are generated by the voltage generator 300 depending on a circuit configuration of a pixel included in the display panel DP and a need, and a voltage level of each of the voltages may be variously changed or modified.

Figure 39:
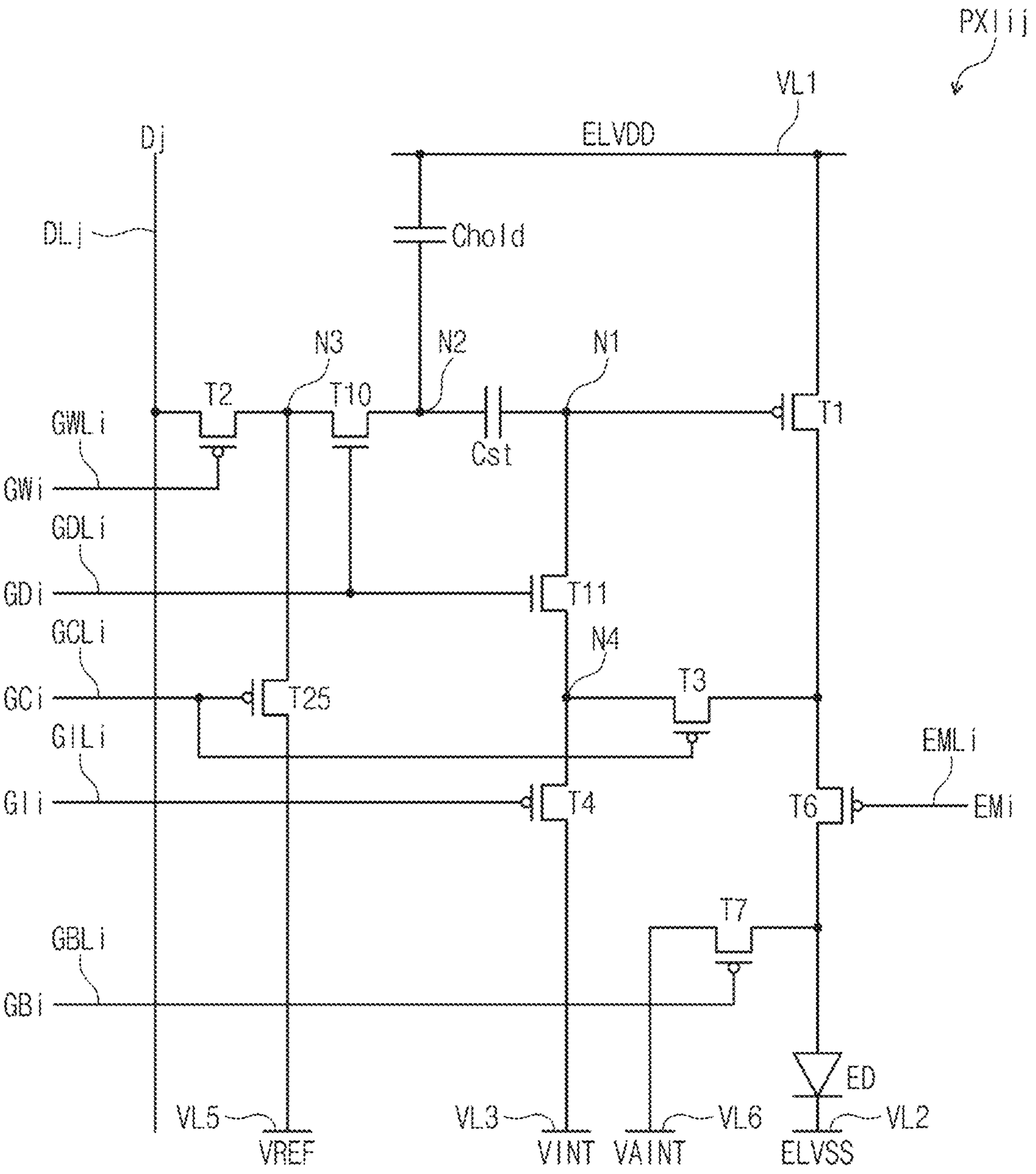
FIG. 39 is a circuit diagram of a pixel according to an embodiment of the present disclosure.

FIG. 39 is a circuit diagram of a pixel PXlij according to an embodiment of the present disclosure.

Referring to FIG. 39, the pixel PXlij includes first, second, third, fourth, fifth, seventh, tenth, eleventh, and twenty-fifth transistors T1, T2, T3, T4, T5, T7, T10, T11, and T25, a first capacitor Cst, a second capacitor Chold, and a light-emitting element ED. In an embodiment, each of the pixels PX illustrated in FIG. 38 may include the same circuit configuration as the pixel PXdij illustrated in FIG. 39.

Also, the pixel PXlij illustrated in FIG. 39 includes components similar to those of the pixel PXdij illustrated in FIG. 22. The same reference signs are used for components similar in characteristic to components of the pixel PXdij of FIG. 22 from among the components of the pixel PXlij of FIG. 39, and thus, additional description will be omitted to avoid redundancy.

A configuration of the pixel PXlij illustrated in FIG. 39 is similar to the configuration of the pixel PXdij illustrated in FIG. 22 except that the eighth and ninth transistors T8 and T9 are not included.

In an embodiment, the first, second, third, fourth, sixth, seventh, and twenty-fifth transistors T1, T2, T3, T4, T6, T7, and T25 of the pixel PXlij are implemented with a P-type transistor, and the tenth and eleventh transistors T10 and T11 are implemented with an N-type transistor.

The seventh transistor T7 is connected between the anode of the light-emitting element ED and the sixth initialization voltage line VL6 and includes a gate electrode connected with the scan line GBLi.

Figure 40:
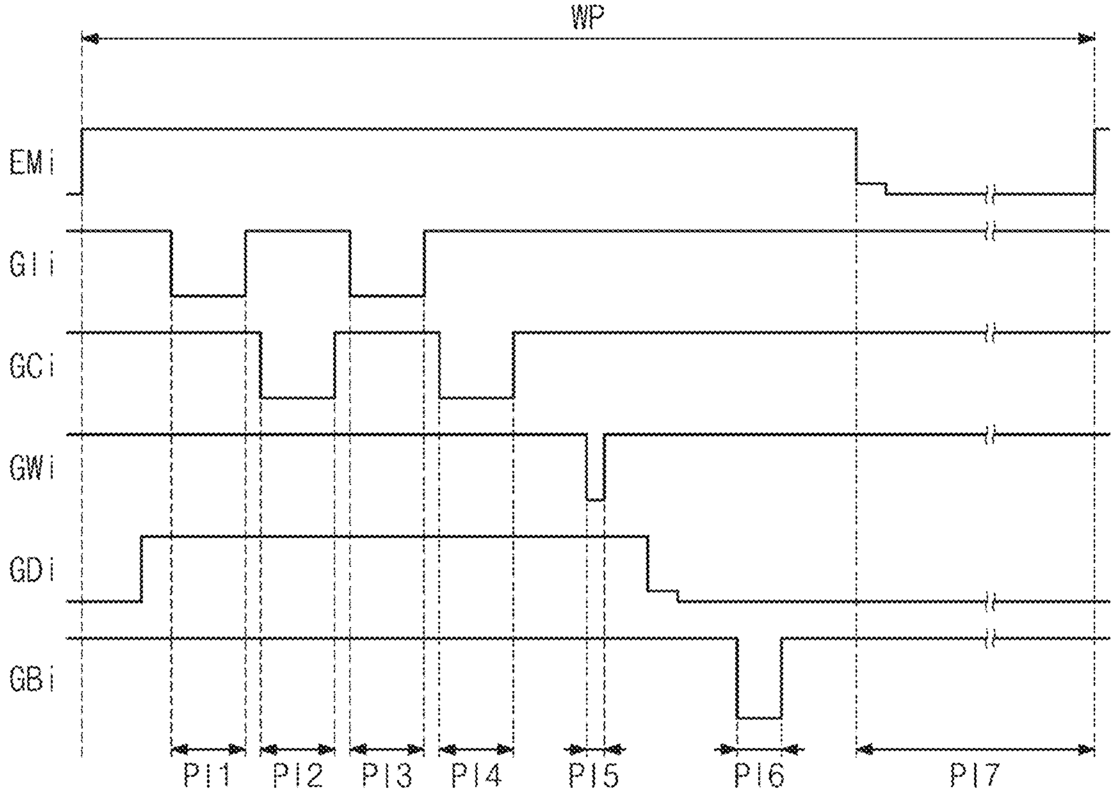
FIG. 40 is a timing diagram for describing an operation of a pixel during a write period.

FIG. 40 is a timing diagram for describing an operation of the pixel PXlij during the write period WP.

Referring to FIGS. 39 and 40, in a first period P11, the fourth and eleventh transistors T4 and T11 are turned on by the scan signal GIi of the low level and the scan signal GDi of the high level. The first initialization voltage VINT may be transferred to the first node N1 through the fourth and eleventh transistors T4 and T11 being in the turn-on state.

In a second period P12, the third, eleventh, and twenty-fifth transistors T3, T11, and T25 are turned on by the scan signal GCi of the low level and the scan signal GDi of the high level. The first driving voltage ELVDD may be transferred to the first node N1 through the first, third, and eleventh transistors T1, T3, and T11. Also, the reference voltage VREF may be transferred to the third node N3 through the twenty-fifth transistor T25.

An operation of the pixel PXlij in the third period P13 may be identical to that in the first period P11.

An operation of the pixel PXlij in the fourth period P14 may be identical to that in the second period P12.

In a fifth period P15, the second and tenth transistors T2 and T10 are turned on by the scan signal GWi of the low level and the scan signal GDi of the high level. The data signal Dj from the data line DLj is transferred to the second node N2 through the second and tenth transistors T2 and T10.

In a sixth period P16 in which the scan signal GBi is at the low level, the seventh transistor T7 is turned on. As the seventh transistor T7 is turned on, the anode of the light-emitting element ED may be initialized with the second initialization voltage VAINT.

In a seventh period P17 in which the emission signal EMi is at the low level, the sixth transistor T6 is turned on. As the sixth transistor T6 is turned on, a current path may be formed from the first driving voltage line VL1 to the light-emitting element ED through the first and sixth transistors T1 and T6. In this case, the amount of current transferred to the light-emitting element ED may be determined depending on a voltage level of the first node N1, that is, the gate electrode of the first transistor T1.

Although not illustrated in drawing, during the hold period HP, the scan signals GIi, GCi, and GWi may be maintained at the high level being the inactive level, and the scan signal GDi may be maintained at the low level being inactive level.

In the hold period HP, when the scan signal GBi transitions from the high level to the low level, the seventh transistor T7 may be turned on; in this case, the anode of the light-emitting element ED may be initialized with the second initialization voltage VAINT.

Figure 41:
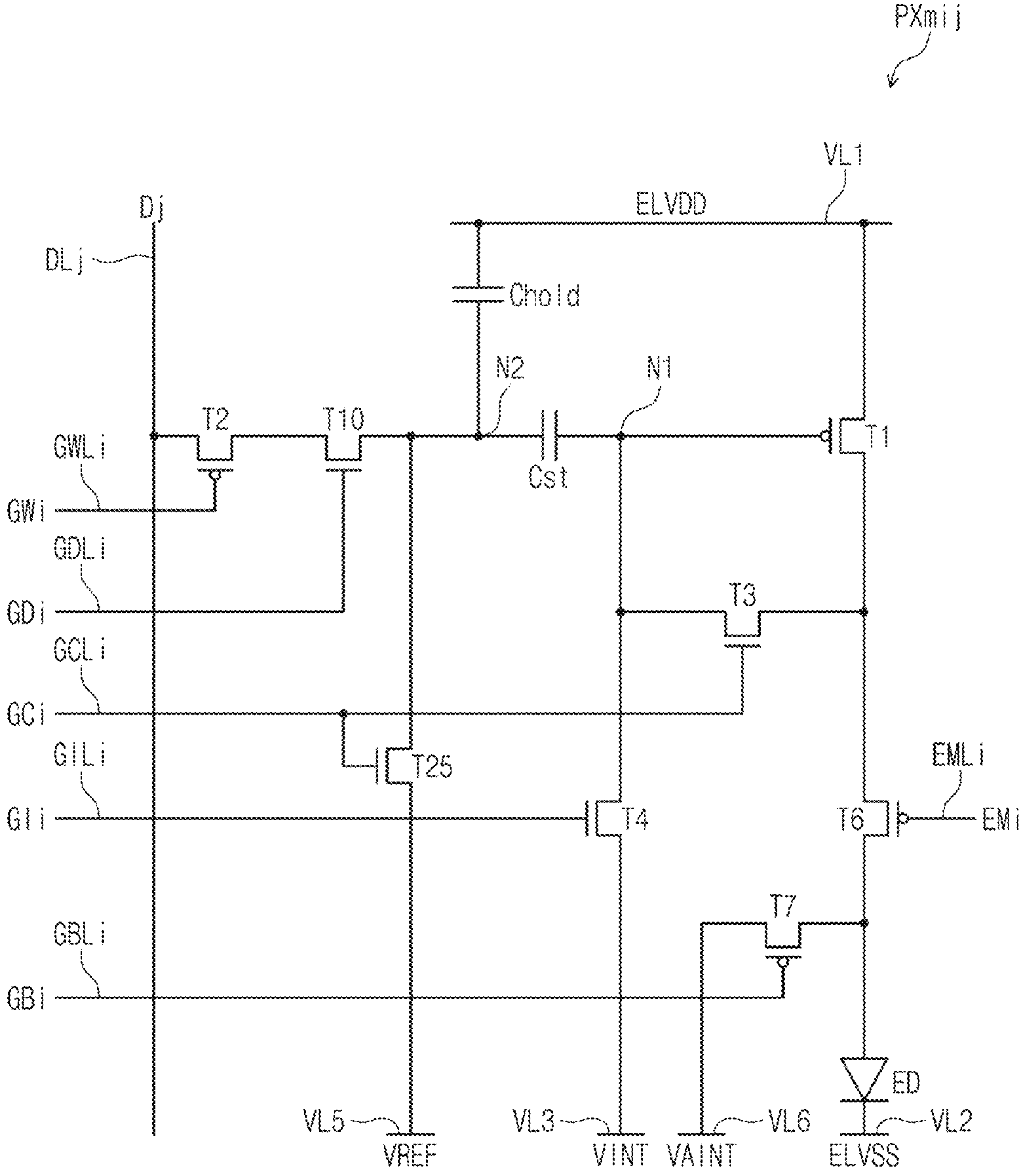
FIG. 41 is a circuit diagram of a pixel according to an embodiment of the present disclosure.

FIG. 41 is a circuit diagram of a pixel PXmij according to an embodiment of the present disclosure.

Referring to FIG. 41, the pixel PXmij includes first, second, third, fourth, sixth, seventh, tenth, and twenty-fifth transistors T1, T2, T3, T4, T6, T7, T10, and T25, a first capacitor Cst, a second capacitor Chold, and a light-emitting element ED.

The pixel PXmij illustrated in FIG. 41 includes components similar to those of the pixel PXlij illustrated in FIG. 39. The same reference signs are used for components similar in characteristic to components of the pixel PXlij of FIG. 39 from among the components of the pixel PXmij of FIG. 41, and thus, additional description will be omitted to avoid redundancy.

A configuration of the pixel PXmij illustrated in FIG. 41 is similar to the configuration of the pixel PXlij illustrated in FIG. 39 except that the eleventh transistor T11 is not included.

In an embodiment, the first, second, sixth, and seventh transistors T1, T2, T6, and T7 of the pixel PXmij are implemented with a P-type transistor, and the third, fourth, tenth, and twenty-fifth transistors T3, T4, T10, and T25 are implemented with an N-type transistor.

Figure 42:
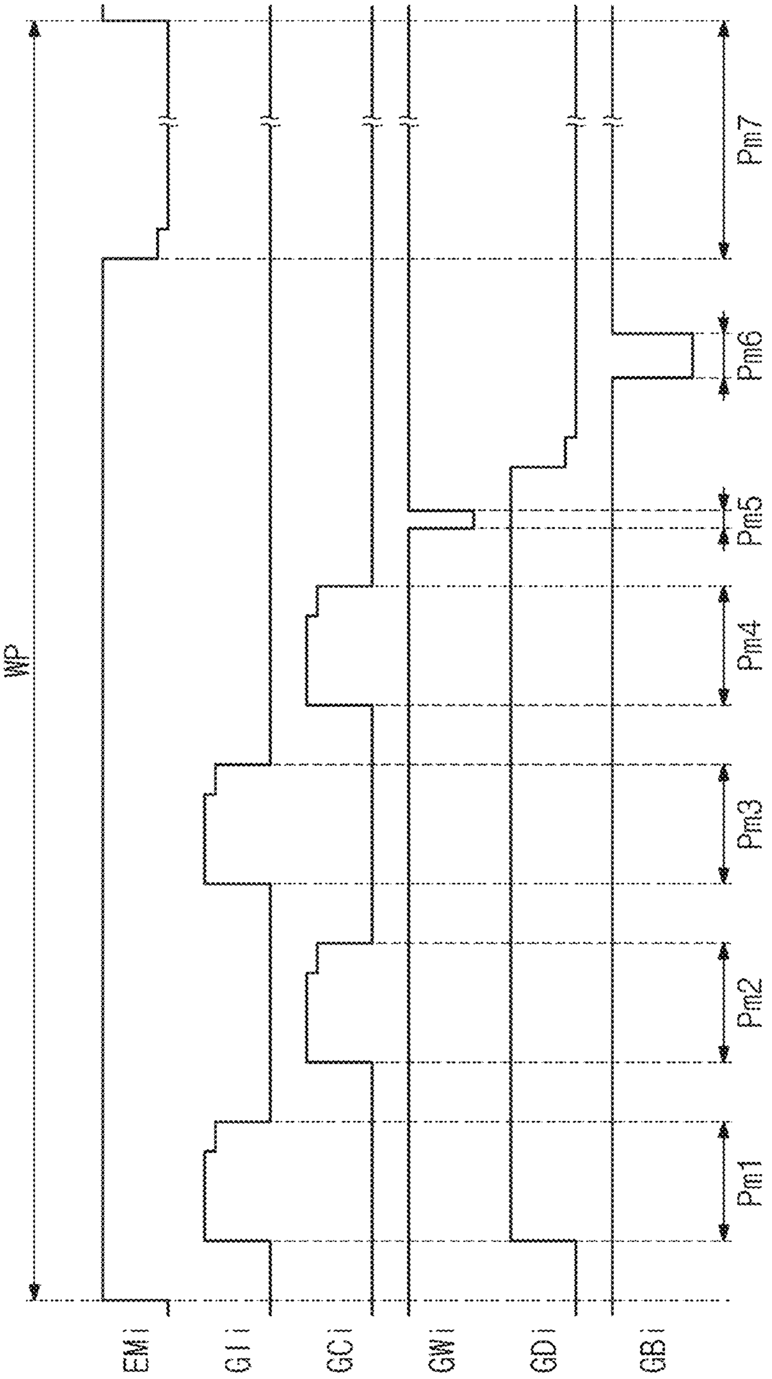
FIG. 42 is a timing diagram for describing an operation of a pixel during a write period.

FIG. 42 is a timing diagram for describing an operation of the pixel PXmij during the write period WP.

Referring to FIGS. 41 and 42, in a first period Pm1, the fourth transistor T4 is turned on by the scan signal GIi of the high level. The first initialization voltage VINT may be transferred to the first node N1 through the fourth transistor T4 being in the turn-on state.

In a second period Pm2, the third and twenty-fifth transistors T3 and T25 are turned on by the scan signal GCi of the high level. The first driving voltage ELVDD may be transferred to the first node N1 through the first and third transistors T1 and T3. Also, the reference voltage VREF may be transferred to the second node N2 through the twenty-fifth transistor T25.

An operation of the pixel PXmij in a third period Pm3 may be identical to that in the first period Pm1.

An operation of the pixel PXmij in a fourth period Pm4 may be identical to that in the second period Pm2.

In a fifth period Pm5, the second and tenth transistors T2 and T10 are turned on by the scan signal GWi of the low level and the scan signal GDi of the high level. The data signal Dj from the data line DLj is transferred to the second node N2 through the second and tenth transistors T2 and T10.

In a sixth period Pm6 in which the scan signal GBi is at the low level, the seventh transistor T7 is turned on. As the seventh transistor T7 is turned on, the anode of the light-emitting element ED may be initialized with the second initialization voltage VAINT.

In a seventh period Pm7 in which the emission signal EMi is at the low level, the sixth transistor T6 is turned on. As the sixth transistor T6 is turned on, a current path may be formed from the first driving voltage line VL1 to the light-emitting element ED through the first and sixth transistors T1 and T6. In this case, the amount of current transferred to the light-emitting element ED may be determined depending on a voltage level of the first node N1, that is, the gate electrode of the first transistor T1.

In an embodiment, the scan signal GDi may be at the high level only in the fifth period Pm5. Also, a high-level period of the scan signal GDi may overlap the fifth period Pm5 in which the scan signal GWi is at the low level, but a pulse width of the scan signal GDi may be greater than or equal to a pulse width of the scan signal GWi.

Figure 43:
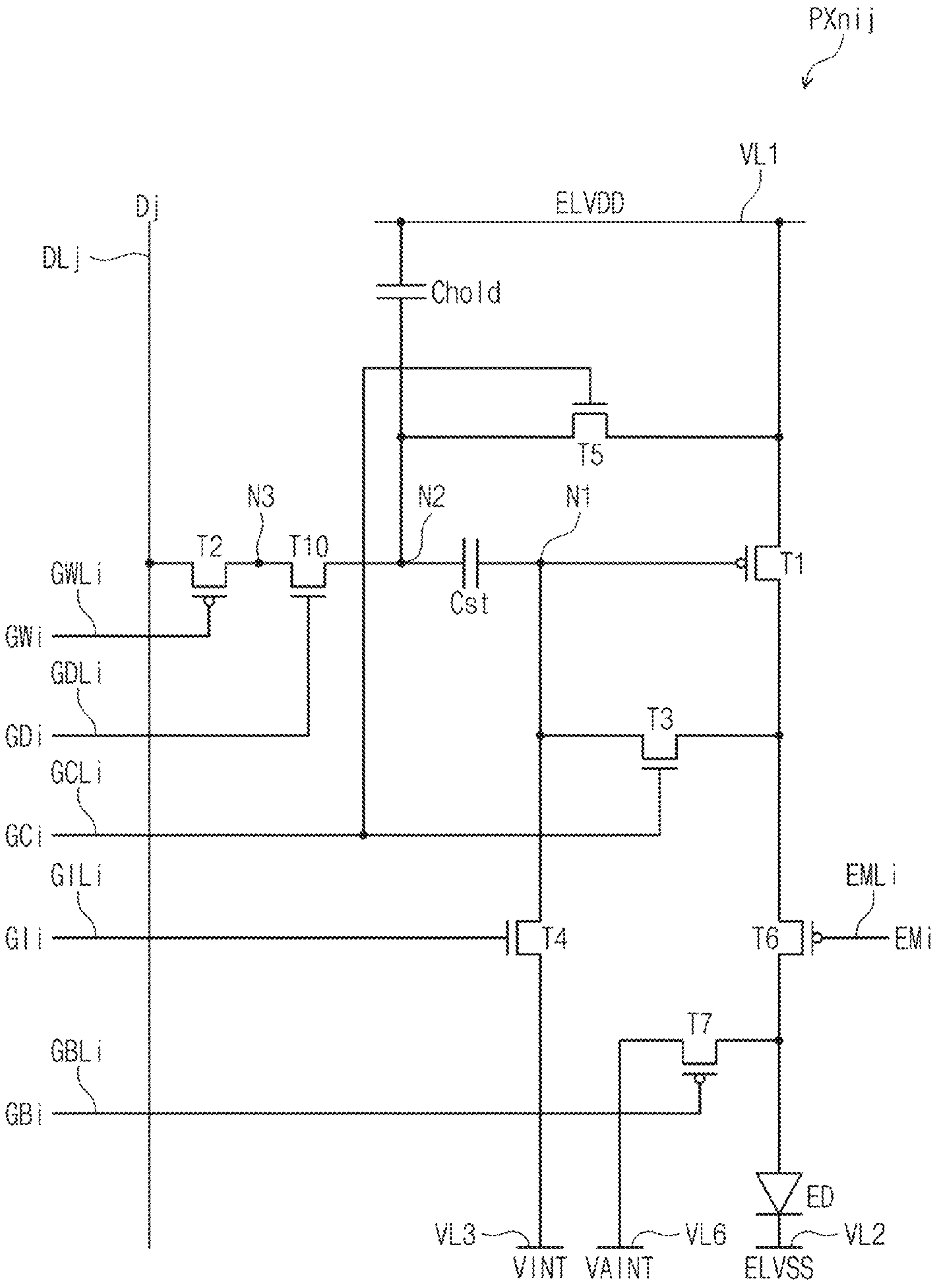
FIG. 43 is a circuit diagram of a pixel according to an embodiment of the present disclosure.

FIG. 43 is a circuit diagram of a pixel PXnij according to an embodiment of the present disclosure.

Referring to FIG. 43, the pixel PXnij includes first to seventh and tenth transistors T1 to T7 and T10, a first capacitor Cst, a second capacitor Chold, and a light-emitting element ED.

The pixel PXnij illustrated in FIG. 43 includes components similar to those of the pixel PXmij illustrated in FIG. 41. The same reference signs are used for components similar in characteristic to components of the pixel PXmij of FIG. 41 from among the components of the pixel PXnij of FIG. 43, and thus, additional description will be omitted to avoid redundancy.

A configuration of the pixel PXnij illustrated in FIG. 43 is similar to the configuration of the pixel PXmij illustrated in FIG. 41 except that the twenty-fifth transistor T25 is not included and the fifth transistor T5 is included.

The fifth transistor T5 is connected between the second node N2 and the first electrode of the first transistor T1 and includes a gate electrode connected with the scan line GCLi.

In an embodiment, the first, second, sixth, and seventh transistors T1, T2, T6, and T7 of the pixel PXnij are implemented with a P-type transistor, and the third, fourth, fifth, and tenth transistors T3, T4, T5, and T10 are implemented with an N-type transistor.

Figure 44:
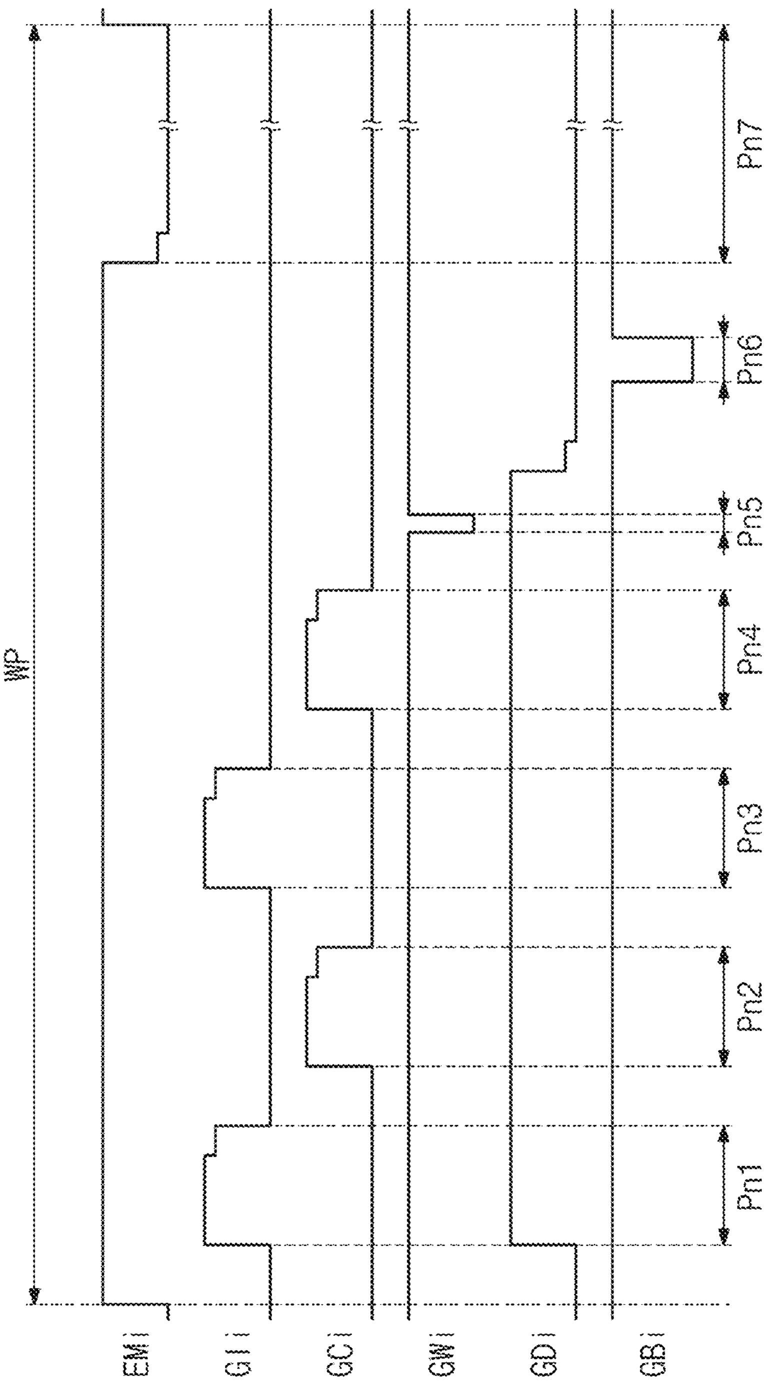
FIG. 44 is a timing diagram for describing an operation of a pixel during a write period.

FIG. 44 is a timing diagram for describing an operation of the pixel PXnij during the write period WP.

First to seventh periods Pn1 to Pn7 illustrated in FIG. 44 may be substantially the same as the first to seventh periods Pm1 to Pm7 illustrated in FIG. 42, and thus, additional description will be omitted to avoid redundancy.

In each of the second period Pn2 and the fourth period Pn4 in which the scan signal GCi is at the high level, the first driving voltage ELVDD may be provided to the second node N2 through the fifth transistor T5.

Figure 45:
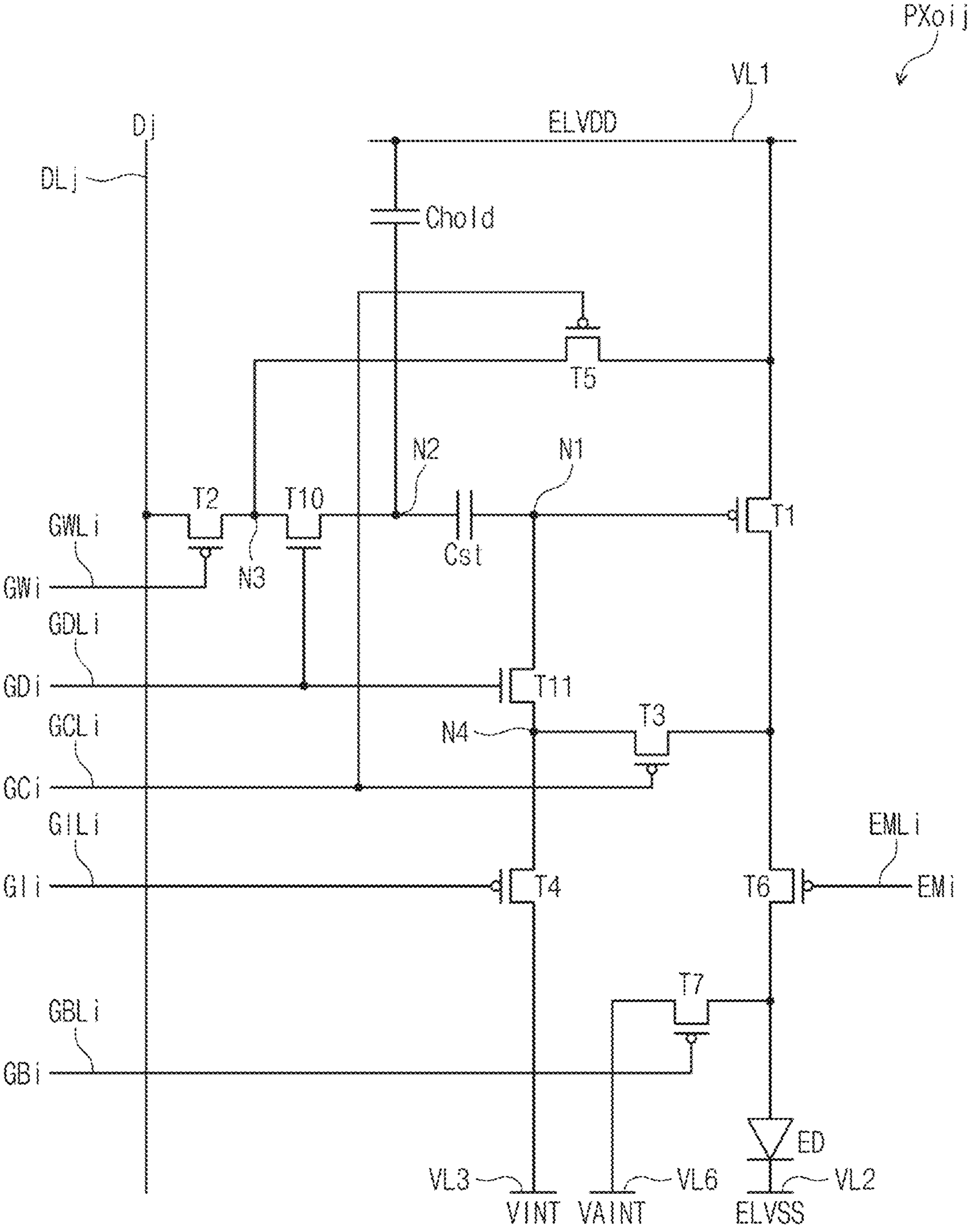
FIG. 45 is a circuit diagram of a pixel according to an embodiment of the present disclosure.

FIG. 45 is a circuit diagram of a pixel PXoij according to an embodiment of the present disclosure.

Referring to FIG. 45, the pixel PXoij includes first to seventh, tenth, and eleventh transistors T1 to T7, T10, and T11, a first capacitor Cst, a second capacitor Chold, and the light-emitting element ED.

Also, the pixel PXoij illustrated in FIG. 45 includes components similar to those of the pixel PXnij illustrated in FIG. 43. The same reference signs are used for components similar in characteristic to components of the pixel PXnij of FIG. 43 from among the components of the pixel PXoij of FIG. 45, and thus, additional description will be omitted to avoid redundancy.

A configuration of the pixel PXoij illustrated in FIG. 45 is similar to the configuration of the pixel PXnij illustrated in FIG. 43 except that the eleventh transistor T11 is further included therein.

In an embodiment, the first to seventh transistors T1 to T7 of the pixel PXoij are implemented with a P-type transistor, and the tenth and eleventh transistors T10 and T11 are implemented with an N-type transistor.

Figure 46:
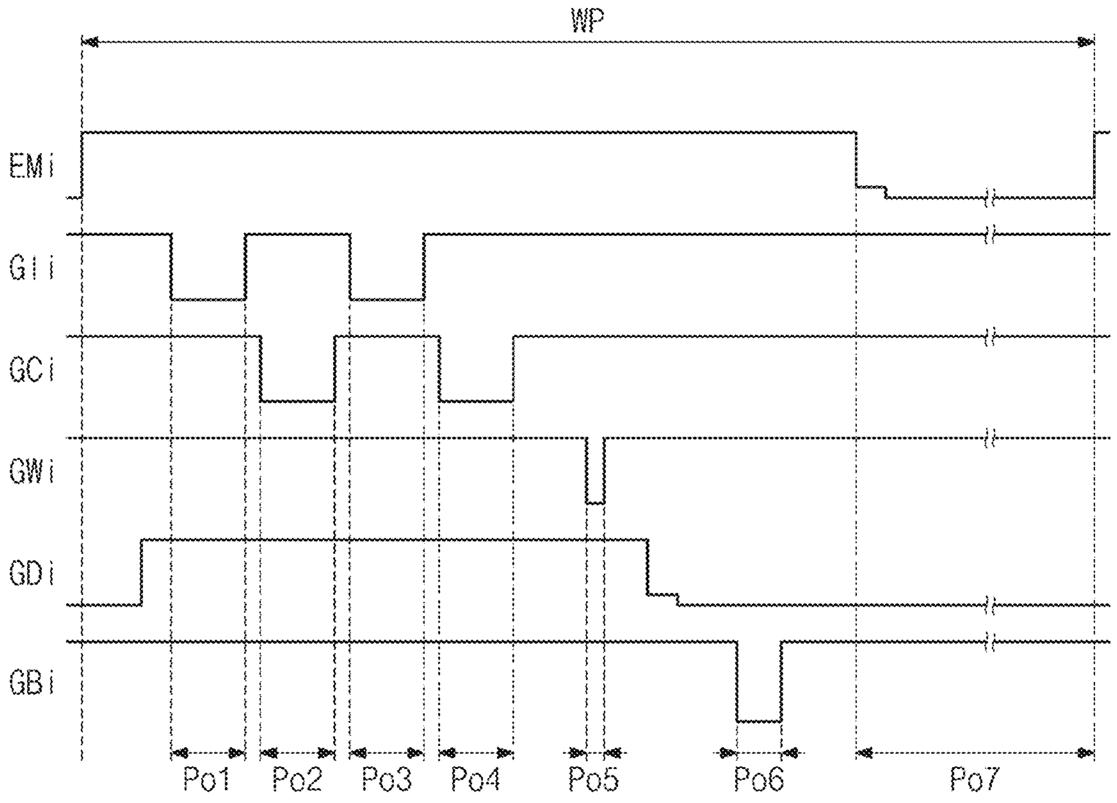
FIG. 46 is a timing diagram for describing an operation of a pixel during a write period.

FIG. 46 is a timing diagram for describing an operation of the pixel PXoij during the write period WP.

Referring to FIGS. 45 and 46, in an operation of the pixel PXoij, the write period WP may include a first period Pol to a seventh period Po7.

In each of the first period P01 and the third period Po3 in which the scan signals GIi and GDi are at the high level, the fourth and eleventh transistors T4 and T11 are turned on. In this case, the first initialization voltage VINT may be provided to the first node N1 through the fourth and eleventh transistors T4 and T11 being in the turn-on state.

Figure 47:
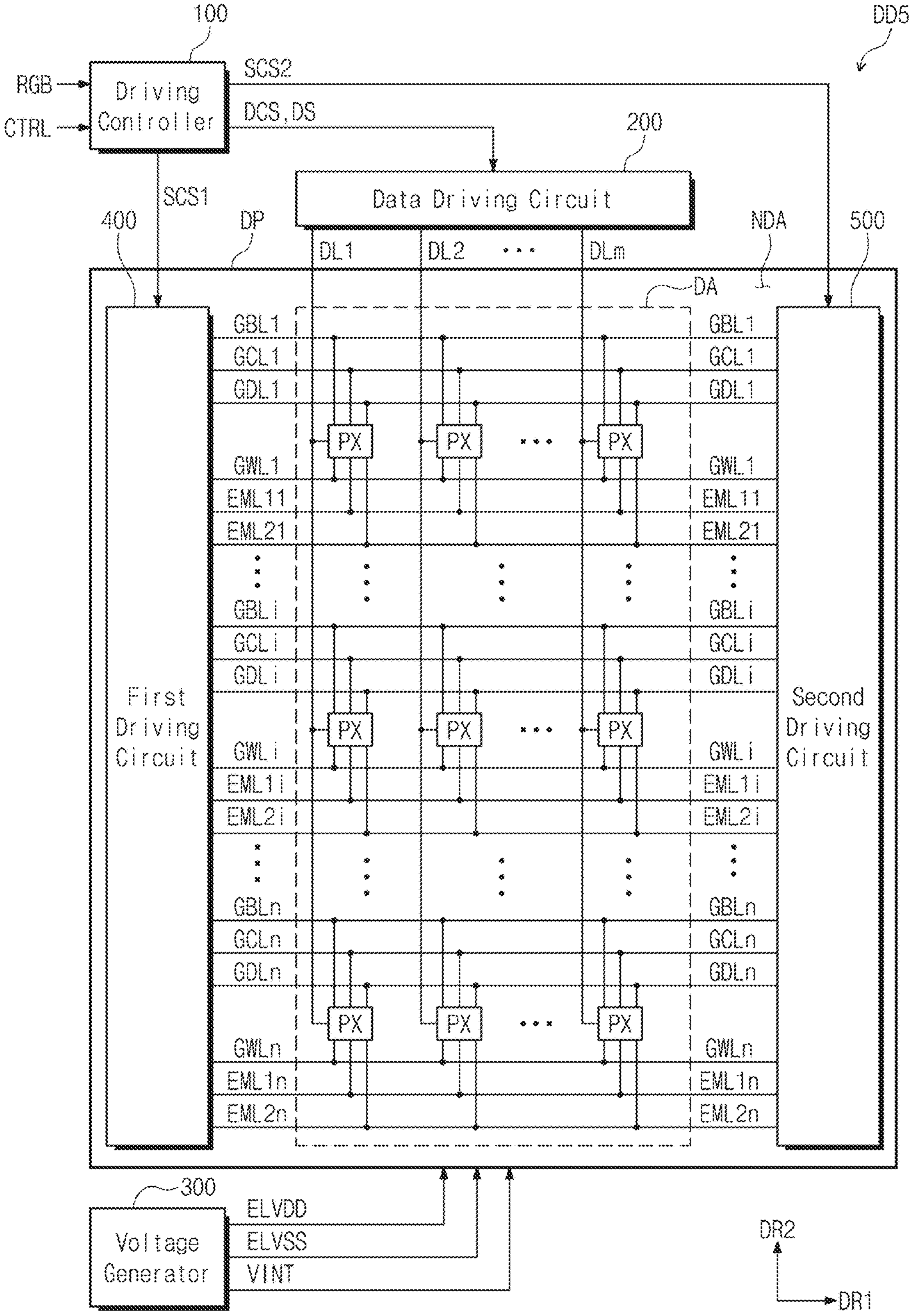
FIG. 47 is a block diagram of a display device according to an embodiment of the present disclosure.

FIG. 47 is a block diagram of a display device DD5 according to an embodiment of the present disclosure.

The display device DD5 illustrated in FIG. 47 includes components similar to those of the display device DD2 illustrated in FIG. 15. Accordingly, similar reference signs are used for similar components, and thus, additional description will be omitted to avoid redundancy.

The display panel DP may include a first driving circuit 400 and a second driving circuit 500. In an embodiment, the first driving circuit 400 is disposed on a first side of the display panel DP, and the second driving circuit 500 is disposed on a second side of the display panel DP. The scan lines GIL1 to GILn, GBL1 to GBLn, GWL1 to GWLn, and GCL1 to GCLn and the emission lines EML11 to EML**1*n* and EML21 to EML2*n* may be electrically connected with the first driving circuit 400 and the second driving circuit 500**.

The scan lines GIL1 to GILn, GBL1 to GBLn, GWL1 to GWLn, and GCL1 to GCLn and the emission lines EML11 to EML**1*n* and EML21 to EML2*n* are arranged to be spaced from each other in the second direction DR2. The data lines DL1 to DLm extend from the data driving circuit 200 in a direction facing away from the second direction DR2 and are arranged to be spaced from each other in the first direction DR1**.

In the example illustrated in FIG. 47, the first driving circuit 400 and the second driving circuit 500 are disposed to face each other, with the pixels PX interposed therebetween. However, the present disclosure is not limited thereto. In another embodiment, the display panel DP may include only one of the first driving circuit 400 and the second driving circuit 500.

An example where the scan lines GIL1 to GILn, GBL1 to GBLn, GWL1 to GWLn, and GCL1 to GCLn and the emission lines EML11 to EML**1*n* and EML21 to EML2*n* are connected with the first driving circuit 400 and the second driving circuit 500 is illustrated in FIG. 47, but the present disclosure is not limited thereto. For example, the scan lines EBL1 to EBLn and/or the scan lines GIL1 to GILn may be further connected with the first driving circuit 400 and the second driving circuit 500. Also, instead of the emission lines EML11 to EML1*n* and EML21 to EML2*n*, the emission lines EML1 to EMLn may be connected with the first driving circuit 400 and the second driving circuit 500**.

In an embodiment, each of the pixels PX illustrated in FIG. 47 may include the same circuit configuration as one of the pixel PXbij illustrated in FIG. 16 and the pixel PXcij illustrated in FIG. 19.

Figure 48:
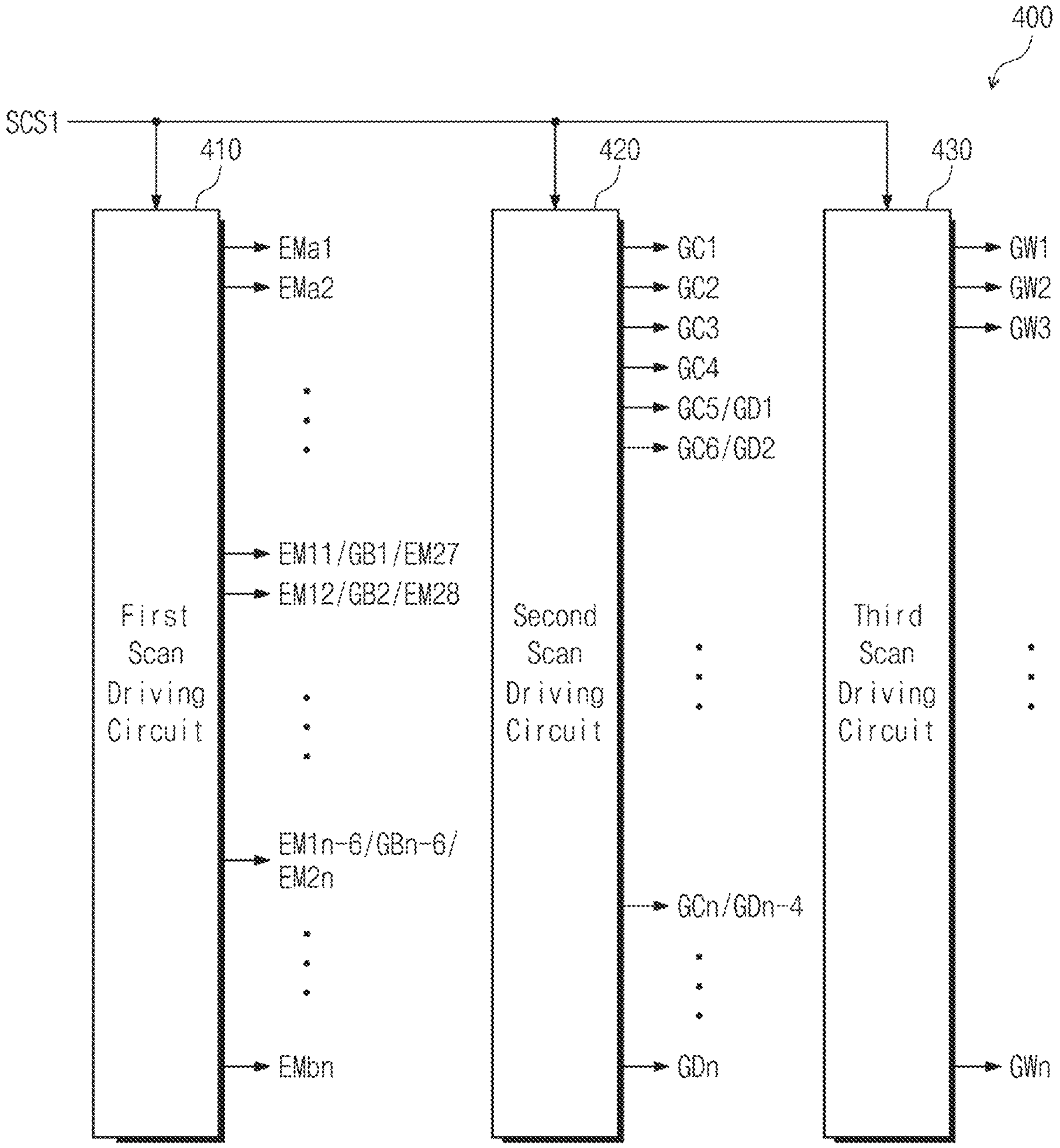
FIG. 48 is a block diagram illustrating a first driving circuit illustrated in FIG. 47.

FIG. 48 is a block diagram illustrating the first driving circuit 400 illustrated in FIG. 47.

Referring to FIG. 48, the first driving circuit 400 includes a first scan driving circuit 410, a second scan driving circuit 420, and a third scan driving circuit 430.

The first scan driving circuit 410 outputs emission signals EM11 to EM**1*n* and EM21 to EM2*n* and scan signals GB1 to GBn to be provided to the emission lines EML11 to EML1*n* and EML21 to EML2*n* illustrated in FIG. 47 in response to a first scan control signal SCS1**.

In an embodiment, the emission signals EM11 to EM**1*n* and EM21 to EM2*n* and the scan signals GB1 to GBn may be the same signals. In an embodiment, some of the emission signals EM11 to EM1*n* and EM21 to EM2*n* may be the same signals. For example, the emission signals EM11 and EM27 and the scan signal GB1 may be the same signals. Also, the emission signals EM12 and EM28 and the scan signal GB2** may be the same signals.

As the first scan driving circuit 410 is designed to output some of the emission signals EM11 to EM**1*n* and EM21 to EM2*n* and the scan signals GB1 to GBn in common, the circuit area of the first scan driving circuit 410** may be minimized.

In response to the first scan control signal SCS1, the second scan driving circuit 420 outputs scan signals GC1 to GCn to be provided to the scan lines GCL1 to GCLn (refer to FIG. 47) and scan signals GD1 to GDn to be provided to the scan lines GDL1 to GDLn (refer to FIG. 47).

In an embodiment, some of the scan signals GC1 to GCn and some of the scan signals GD1 to GDn may be the same signals. For example, the scan signals GC5 and GD1 may be the same signals, the scan signals GC6 and GD2 may be the same signals, and the scan signals GCn and GDn−4 may be the same signals.

As the second scan driving circuit 420 is designed to output some of the scan signals GC1 to GCn and some of the scan signals GD1 to GDn in common, the circuit area of the second scan driving circuit 420 may be minimized.

In response to the first scan control signal SCS1, the third scan driving circuit 430 outputs scan signals GW 1 to GWn to be provided to the scan lines GWL1 to GWLn illustrated in FIG. 47.

Figure 49:
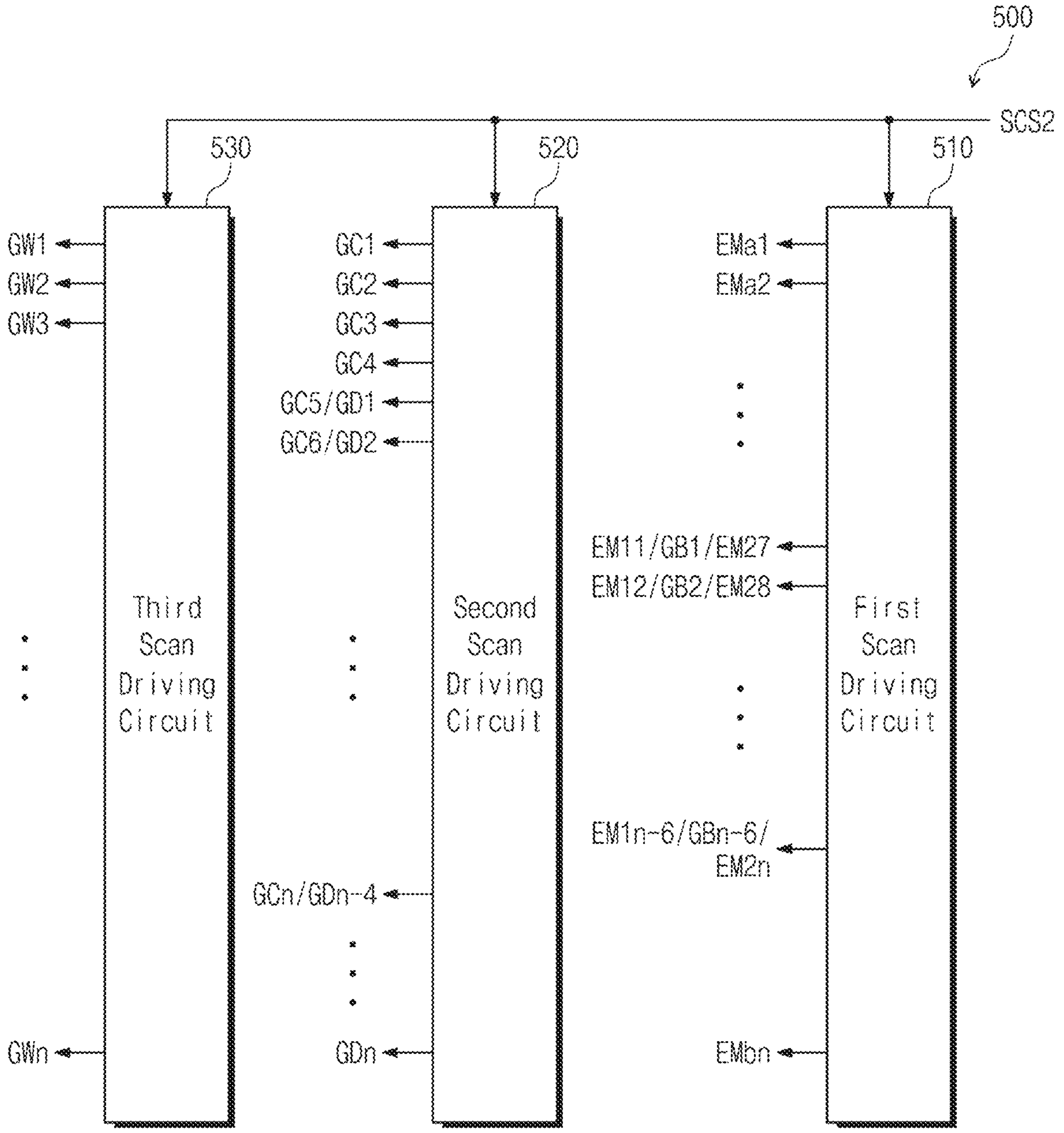
FIG. 49 is a block diagram illustrating a second driving circuit illustrated in FIG. 47.

FIG. 49 is a block diagram illustrating the second driving circuit 500 illustrated in FIG. 47.

Referring to FIG. 49, the second driving circuit 500 includes a first scan driving circuit 510, a second scan driving circuit 520, and a third scan driving circuit 530.

The first scan driving circuit 510 outputs the emission signals EM11 to EM1*n* and EM21 to EM2*n* and the scan signals GB1 to GBn to be provided to the emission lines EML11 to EML1*n* and EML21 to EML2*n* illustrated in FIG. 47 in response to a second scan control signal SCS2.

In an embodiment, the emission signals EM11 to EM1*n* and EM21 to EM2*n* and the scan signals GB1 to GBn may be the same signals. In an embodiment, some of the emission signals EM11 to EM1*n* and EM21 to EM2*n* may be the same signals. For example, the emission signals EM11 and EM27 and the scan signal GB1 may be the same signals. Also, the emission signals EM12 and EM28 and the scan signal GB2 may be the same signals.

As the first scan driving circuit 410 is designed to output some of the emission signals EM11 to EM1*n* and EM21 to EM2*n* and the scan signals GB1 to GBn in common, the circuit area of the first scan driving circuit 510 may be minimized.

In response to the second scan control signal SCS2, the second scan driving circuit 520 outputs the scan signals GC1 to GCn to be provided to the scan lines GCL1 to GCLn (refer to FIG. 47) and the scan signals GD1 to GDn to be provided to the scan lines GDL1 to GDLn (refer to FIG. 47).

In an embodiment, some of the scan signals GC1 to GCn and some of the scan signals GD1 to GDn may be the same signals. For example, the scan signals GC5 and GD1 may be the same signals, the scan signals GC6 and GD2 may be the same signals, and the scan signals GCn and GDn−4 may be the same signals.

As the second scan driving circuit 520 is designed to output some of the scan signals GC1 to GCn and some of the scan signals GD1 to GDn in common, the circuit area of the second scan driving circuit 520 may be minimized.

In response to the second scan control signal SCS2, the third scan driving circuit 530 outputs scan signals GW 1 to GWn to be provided to the scan lines GWL1 to GWLn illustrated in FIG. 47.

Figure 50:
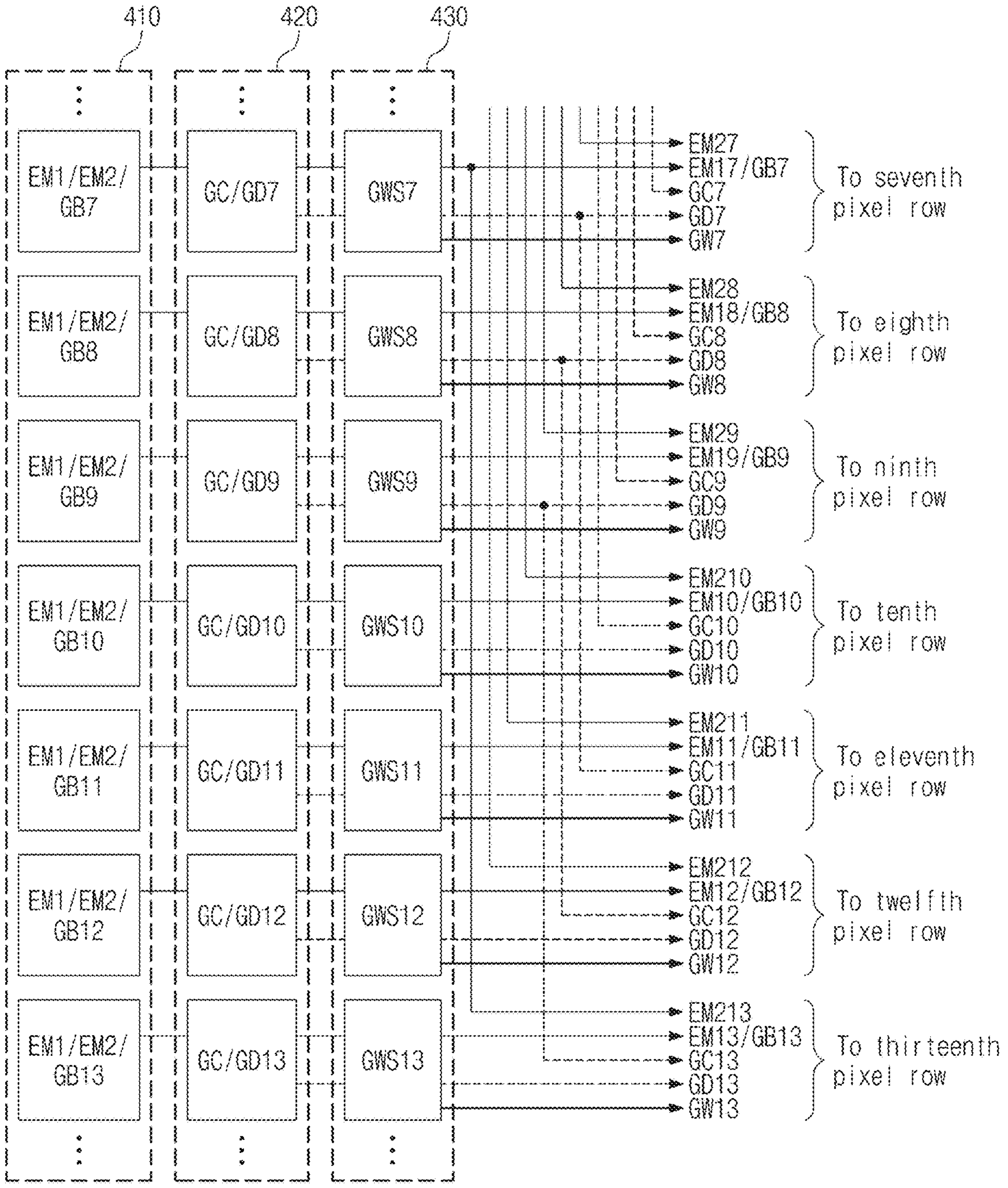
FIG. 50 is a block diagram illustrating a first scan driving circuit, a second scan driving circuit, and a third scan driving circuit illustrated in FIG. 48.

FIG. 50 is a block diagram illustrating the first scan driving circuit 410, the second scan driving circuit 420, and the third scan driving circuit 430 illustrated in FIG. 48.

Referring to FIGS. 47, 48, and 50, the first scan driving circuit 410 includes scan stages EM1/EM2/GB7 to EM1/EM2/GB13. The scan stages EM1/EM2/GB7 to EM1/EM2/GB13 may correspond to seventh to thirteenth pixel rows among pixel rows of a plurality of pixels PX illustrated in FIG. 47, respectively. Each of the seventh to thirteenth pixel rows may include pixels disposed in the same row in the first direction DR1 from among the plurality of pixels PX. For example, the seventh pixel row may include pixels disposed in the seventh row from among the plurality of pixels PX, and the thirteenth pixel row may include pixels disposed in the thirteenth row from among the plurality of pixels PX.

In an embodiment, the emission signal EM17, the emission signal EM213, and the scan signal GB7 that are output from the scan stage EM1/EM2/GB7 may be the same signals. In an embodiment, the emission signal EM18, the emission signal EM214 (not illustrated), and the scan signal GB8 that are output from the scan stage EM1/EM2/GB8 may be the same signals. In an embodiment, the emission signal EM19, the emission signal EM215 (not illustrated), and the scan signal GB9 that are output from the scan stage EM1/EM2/GB9 may be the same signals. In an embodiment, the emission signal EM110, the emission signal EM216 (not illustrated), and the scan signal GB10 that are output from the scan stage EM1/EM2/GB10 may be the same signals. In an embodiment, the emission signal EM111, the emission signal EM217 (not illustrated), and the scan signal GB11 that are output from the scan stage EM1/EM2/GB11 may be the same signals. In an embodiment, the emission signal EM112, the emission signal EM218 (not illustrated), and the scan signal GB12 that are output from the scan stage EM1/EM2/GB12 may be the same signals. In an embodiment, the emission signal EM113, the emission signal EM219 (not illustrated), and the scan signal GB13 that are output from the scan stage EM1/EM2/GB13 may be the same signals.

Only the scan stages EM1/EM2/GB7 to EM1/EM2/GB13 of the first scan driving circuit 410 are illustrated in FIG. 50. The first scan driving circuit 410 may include scan stages corresponding to the first to n-th pixel rows illustrated in FIG. 47, respectively.

The second scan driving circuit 420 includes scan stages GC/GD7 to GC/GDC13. The scan stages GC/GD7 to GC/GDC13 may correspond to the seventh to thirteenth pixel rows among the pixel rows of the plurality of pixels PX illustrated in FIG. 47, respectively.

In an embodiment, the scan signal GD7 and the scan signal GC11 that are output from the scan stage GC/GD7 may be the same signals. In an embodiment, the scan signal GD8 and the scan signal GC12 that are output from the scan stage GC/GD8 may be the same signals. In an embodiment, the scan signal GD9 and the scan signal GC13 that are output from the scan stage GC/GD9 may be the same signals. In an embodiment, the scan signal GD10 and the scan signal GC14 (not illustrated) that are output from the scan stage GC/GD10 may be the same signals. In an embodiment, the scan signal GD11 and the scan signal GC15 (not illustrated) that are output from the scan stage GC/GD11 may be the same signals. In an embodiment, the scan signal GD12 and the scan signal GC16 (not illustrated) that are output from the scan stage GC/GD12 may be the same signals. In an embodiment, the scan signal GD13 and the scan signal GC17 (not illustrated) that are output from the scan stage GC/GD13 may be the same signals.

Only the scan stages GC/GD7 to GC/GDC13 of the second scan driving circuit 420 are illustrated in FIG. 50. The second scan driving circuit 420 may include scan stages corresponding to the first to n-th pixel rows illustrated in FIG. 47, respectively.

The third scan driving circuit 430 includes scan stages GWS7 to GWS13. The scan stages GWS7 to GWS13 may correspond to the seventh to thirteenth pixel rows among the pixel rows of the plurality of pixels PX illustrated in FIG. 47, respectively. In an embodiment, the scan stages GWS7 to GWS13 may output the scan signals GW7 to GW13, respectively.

Only the scan stages GWS7 to GWS13 of the third scan driving circuit 430 are illustrated in FIG. 50. The third scan driving circuit 430 may include scan stages corresponding to the first to n-th pixel rows illustrated in FIG. 47, respectively.

Because a pixel having the above configuration sufficiently secures a compensation time for a first transistor, the pixel may operate at a higher driving frequency. Also, the circuit area of the pixel may be minimized by minimizing the number of transistors in the pixel.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel comprising:

a light-emitting element including an anode and a cathode;

a first transistor including a first electrode, a second electrode, and a gate electrode connected with a first node;

a third transistor connected between the second electrode of the first transistor and the first node and including a gate electrode connected with a first scan line;

a sixth transistor connected between the second electrode of the first transistor and the anode of the light-emitting element and including a gate electrode connected with a first emission line; and a seventh transistor connected between the anode of the light-emitting element and an initialization voltage line and including a gate electrode connected with a second scan line, wherein, during an initialization period, the third, sixth, and seventh transistors are turned on such that an initialization voltage from the initialization voltage line is transferred to the gate electrode of the first transistor.

2. The pixel of claim 1, wherein, during the initialization period, a first scan signal provided to the first scan line, a second scan signal provided to the second scan line, and a first emission signal provided to the first emission line are at an active level.

3. The pixel of claim 1, further comprising:

an eighth transistor connected between a driving voltage line and the first electrode of the first transistor and including a gate electrode connected with a second emission line;

a fifth transistor connected between the first electrode of the first transistor and a second node and including a gate electrode connected with the first scan line; and a capacitor connected between the first node and the second node.

4. The pixel of claim 3, wherein, during a compensation period, the eighth transistor and the fifth transistor are turned on such that a driving voltage is transferred from the driving voltage line to the second node.

5. The pixel of claim 4, wherein, during the compensation period, the third transistor and the eighth transistor are turned on such that the driving voltage is transferred to the first node through the eighth transistor, the first transistor, and the third transistor.

6. The pixel of claim 4, wherein, during the compensation period, a first scan signal provided to the first scan line and a second emission signal provided to the second emission line are at an active level.

7. The pixel of claim 4, wherein the initialization period and the compensation period are repeated in turn plural times.

8. The pixel of claim 3, further comprising:

a second transistor connected between a data line and the second node and including a gate electrode connected with a third scan line.

9. The pixel of claim 1, further comprising:

a fourth transistor connected between the first electrode of the first transistor and a bias voltage line and including a gate electrode connected with a fourth scan line.

10. The pixel of claim 1, further comprising:

an eighth transistor connected between a driving voltage line and the first electrode of the first transistor and including a gate electrode connected with a second emission line;

a fifteenth transistor connected between the driving voltage line and a second node and including a gate electrode connected with the first scan line; and a capacitor connected between the first node and the second node.

11. The pixel of claim 10, wherein, during a compensation period, the fifteenth transistor is turned on such that a driving voltage from the driving voltage line is transferred to the second node.

12. The pixel of claim 1, further comprising:

an eighth transistor connected between a driving voltage line and the first electrode of the first transistor and including a gate electrode connected with a second emission line; and a capacitor connected between the first node and a second node.

13. The pixel of claim 12, further comprising:

a fifth transistor connected between the first electrode of the first transistor and the second node and including a gate electrode connected with a fifth scan line, wherein the first transistor is an P-type transistor, and the fifth transistor is an N-type transistor.

14. The pixel of claim 13, further comprising:

a second transistor connected between a data line and the first electrode of the first transistor and including a gate electrode connected with a third scan line; and a ninth transistor connected between a bias voltage line and the first electrode of the first transistor and including a gate electrode connected with a fourth scan line.

15. The pixel of claim 12, further comprising:

a fifth transistor connected between the first electrode of the first transistor and the second node and including a gate electrode connected with the first scan line.

16. The pixel of claim 12, further comprising:

a second transistor connected between a data line and a third node and including a gate electrode connected with a third scan line; and a tenth transistor connected between the second node and the third node and including a gate electrode connected with a fifth scan line, wherein the second transistor is a P-type transistor, and the tenth transistor is an N-type transistor.

17. The pixel of claim 12, further comprising:

an eleventh transistor connected between the first node and a fourth node and including a gate electrode connected with a fifth scan line; and a fourth transistor connected between the fourth node and an initialization voltage line and including a gate electrode connected with a sixth scan line, wherein the eleventh transistor is an N-type transistor, and the fourth transistor is a P-type transistor.

18. The pixel of claim 12, further comprising:

a fourth transistor connected between the first node and an initialization voltage line and including a gate electrode connected with a sixth scan line, wherein the third transistor is an N-type transistor, and the fourth transistor is an N-type transistor.

19. The pixel of claim 16, further comprising:

a twenty-fifth transistor connected between the third node and a reference voltage line and including a gate electrode connected with the first scan line, wherein each of the first transistor and the sixth transistor is a P-type transistor, and each of the third transistor and the twenty-fifth transistor is an N-type transistor.

20. The pixel of claim 1, further comprising:

a capacitor connected between the first node and a second node;

a second transistor connected between a data line and a third node and including a gate electrode connected with a third scan line;

a tenth transistor connected between the second node and the third node and including a gate electrode connected with a fifth scan line; and a twenty-fifth transistor connected between the third node and a reference voltage line and including a gate electrode connected with the first scan line, wherein each of the first transistor and the second transistor is a P-type transistor, and each of the tenth transistor and the twenty-fifth transistor is an N-type transistor.

21. The pixel of claim 1, further comprising:

a second transistor connected between a data line and the first electrode of the first transistor and including a gate electrode connected with a third scan line.

22. The pixel of claim 3, further comprising:

a second transistor connected between a data line and a third node and including a gate electrode connected with a third scan line;

a tenth transistor connected between the second node and the third node and including a gate electrode connected with a fifth scan line;

a fifth transistor connected between the first electrode of the first transistor and the third node and including a gate electrode connected with the first scan line;

an eleventh transistor connected between the first node and a fourth node and including a gate electrode connected with the fifth scan line; and a fourth transistor connected between the fourth node and an initialization voltage line and including a gate electrode connected with a sixth scan line, wherein each of the second transistor and the fourth transistor is P-type transistor, and each of the tenth transistor and the eleventh transistor is an N-type transistor.

23. A display device comprising:

a display panel including a pixel connected with a plurality of scan lines, a plurality of emission lines, and a data line;

a scan driving circuit configured to drive the plurality of scan lines in response to a scan control signal;

a driving controller configured to output the scan control signal; and a voltage generator configured to generate a driving voltage and an initialization voltage, wherein the pixel includes:

a light-emitting element including an anode and a cathode;

a first transistor including a first electrode, a second electrode, and a gate electrode connected with a first node;

a third transistor connected between the second electrode of the first transistor and the first node and including a gate electrode connected with a first scan line;

a sixth transistor connected between the second electrode of the first transistor and the anode of the light-emitting element and including a gate electrode connected with a first emission line; and a seventh transistor connected between the anode of the light-emitting element and an initialization voltage line and including a gate electrode connected with a second scan line, wherein, during an initialization period, the third, sixth, and seventh transistors are turned on such that the initialization voltage from the initialization voltage line is transferred to the gate electrode of the first transistor.

24. The display device of claim 23, further comprising:

a fifth transistor connected between the first electrode of the first transistor and a second node and including a gate electrode connected with the first scan line; and a capacitor connected between the first node and the second node.

25. The display device of claim 24, wherein the first transistor is a P-type transistor, and each of the third transistor and the fifth transistor is an N-type transistor.

26. A method of driving a pixel which includes a first transistor including a first electrode, a second electrode, and a gate electrode and a capacitor connected between a first node and a second node, the method comprising:

an initialization step in which a third transistor, a seventh transistor, and a sixth transistor are turned on by a first scan signal, a second scan signal, and a first emission signal being at an active level, respectively, such that an initialization voltage is transferred to the gate electrode of the first transistor; and a compensation step in which a fifth transistor is turned on by a certain scan signal of the active level such that a driving voltage is transferred to the second node.

27. The method of claim 26, wherein the third transistor, the sixth transistor, and the seventh transistor are connected sequentially in series between the gate electrode of the first transistor and an initialization voltage line through which the initialization voltage is transferred, and wherein the initialization step includes:

providing the first scan signal of the active level to a gate electrode of the third transistor;

providing the first emission signal of the active level to a gate electrode of the sixth transistor; and providing the second scan signal of the active level to a gate electrode of the seventh transistor.

28. The method of claim 26, wherein the certain scan signal includes the first scan signal, and wherein the compensation step includes:

providing the first scan signal of the active level to a gate electrode of the fifth transistor.

29. The method of claim 26, wherein the certain scan signal includes a fifth scan signal, and wherein the compensation step includes:

providing the fifth scan signal of the active level to a gate electrode of the fifth transistor.

* * * * *